US009390117B2

(12) United States Patent
Iwama et al.

(10) Patent No.: US 9,390,117 B2
(45) Date of Patent: Jul. 12, 2016

(54) METHOD OF TRANSFORMING SETS OF INPUT STRINGS INTO AT LEAST ONE PATTERN EXPRESSION THAT IS STRING EXPRESSING SETS OF INPUT STRINGS, METHOD OF EXTRACTING TRANSFORMATION PATTERN AS APPROXIMATE PATTERN EXPRESSION, AND COMPUTER AND COMPUTER PROGRAM FOR THE METHODS

(71) Applicant: International Business Machines Corporation, Armonk, NY (US)

(72) Inventors: Futoshi Iwama, Kanagawa-ken (JP); Taiga Nakamura, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 13/904,127

(22) Filed: May 29, 2013

(65) Prior Publication Data
US 2013/0339377 A1 Dec. 19, 2013

(30) Foreign Application Priority Data
May 31, 2012 (JP) ................................. 2012-124964

(51) Int. Cl.
*G06F 7/00* (2006.01)
*G06F 17/30* (2006.01)
*G06F 17/27* (2006.01)

(52) U.S. Cl.
CPC ...... *G06F 17/30345* (2013.01); *G06F 17/2705* (2013.01)

(58) Field of Classification Search
CPC ..... G06F 19/20; G06F 19/24; G06F 17/2705; G06F 17/30345; G06F 19/18; G06F 19/28
See application file for complete search history.

(56) References Cited

U.S. PATENT DOCUMENTS

2003/0010937 A1* 1/2003 Jolley et al. .............. 250/492.22

FOREIGN PATENT DOCUMENTS

| JP | 01-180046 A | 7/1989 |
| JP | 08-305722 A | 11/1996 |
| JP | 2002-229981 A | 8/2002 |
| JP | 2004-513458 A | 4/2004 |

(Continued)

OTHER PUBLICATIONS

Biermann and J. Feldman, "On the synthesis of finite-state machines from samples of their behavior", IEEE Transactions on Computers, 21: 591-597, 1972.

*Primary Examiner* — Truong Vo
(74) *Attorney, Agent, or Firm* — Jeff Tang

(57) ABSTRACT

The present invention provides a method of extracting a transformation pattern as an approximate pattern expression. In the process of transforming the sets of input strings to at least one pattern expression, the transformation pattern transforming the sets of input strings to the pattern expression. The method includes: 1) preparing one structure including multiple nodes each representing a state and multiple edges each representing a transition; 2) generating a first reduced structure by removing at least one state in one structure from one structure and by merging at least two edges including an edge associated with the removed state in the one structure; 3) generating a first approximate pattern expression based on the first reduced structure; and 4) presenting the first approximate pattern expression.

20 Claims, 72 Drawing Sheets

(56) References Cited

FOREIGN PATENT DOCUMENTS

| | | |
|---|---|---|
| JP | 2004-139446 A | 5/2004 |
| JP | 2004-354787 A | 12/2004 |
| JP | 2005-3017802 A | 10/2005 |
| JP | 2010-079723 A | 4/2010 |
| JP | 2011-123794 A | 2/2011 |
| JP | 2011-141627 A | 7/2011 |

* cited by examiner

VARIATION PATTERN ⋯⋯ 931

[Var-Pattern] Sc<1>>.xls  921
<1>=Set(11_InSc<EF30,
        12_ItlpSc<EG43,
        A0_LiDiSc<AA)

APPROXIMATE PATTERN EXPRESSION STORE

922

| | |
|---|---|
| 922-1 | \<prim\> |
| 922-2 | \<choice\> |
| 922-3 | Sc1<prim>>.xls |
| 922-4 | Rp <prim>>.ppt |

FIG. 9B

VARIATION PATTERN

··--- 951

941

[Var-Pattern] ga-men<1>>.xls
<1>=Set(11_sho-ki-ga-men<EF30,
       12_koh-moku-nyu-ryoku-ga-men<EG43,
       A0_ichi-ran-hyo-ji-ga-men<AA)

APPROXIMATE PATTERN EXPRESSION STORE

942

| | |
|---|---|
| 942-1 | <prim> |
| 942-2 | <choice> |
| 942-3 | ga-men1<prim>>.xls |
| 942-4 | cho-hyo <prim>>.ppt |

FIG. 9C

VARIATION PATTERN  ⟶ FOCUS

1041

[Var-Pattern] Sc<1>>.xls
<1> = Set(11_InSc<EF30, 12_ItlpSc<EG43)

APPROXIMATE PATTERN EXPRESSION STORE  1042

| | |
|---|---|
| 1042−1 | <prim> |
| 1042−2 | <choice> |

FIG. 10E

VARIATION PATTERN

[Var-Pattern] Sc<1>>.xls
<1> = Set(11_InSc<EF30, 12_ItIpSc<EG43, A0_LiDiSc<AA)   1043

APPROXIMATE PATTERN EXPRESSION STORE   1044

| |
|---|
| 1044-1     <prim> |
| 1044-2     <choice> |
| 1044-3     Sc1<prim>>.xls |
| 1044-4     Rp<prim>>.ppt |

VARIATION PATTERN

[Var-Pattern] <1>
<1> = Set(Sc11_InSc<EF30>.xls, Sc12_ItIpSc<EG43>.xls, ScA0_LiDiSc<AA>.xls, Rp801_NwClForm<FA03>.ppt, Rp9d3_OrForm<FP51>.ppt)

APPROXIMATE PATTERN EXPRESSION STORE

1046

| | |
|---|---|
| 1046—1 | \<prim\> |
| 1046—2 | \<choice\> |
| 1046—3 | Sc1\<prim\>>.xls |
| 1046—4 | Rp<prim>>.ppt |
| 1046—5 | Sc(1\<prim\> \| \<choice\>).xls |

FIG. 10R

APPROXIMATE PATTERN EXPRESSION SELECTION SCREEN

1037

<1>
<1> = Set(Sc11_InSc<EF30>.xls, Sc12_ItlpSc<EG43>.xls,
      ScA0_LiDiS<AA>.xls, Rp801_NwClForm<FA03>.ppt,
      Rp9d3_OrForm<FP51>.ppt)

1038

DESIGNATE APPROXIMATE PATTERN EXPRESSION FOR APPROXIMATING PART <1>

1039

| SELECT | APPROXIMATE PATTERN EXPRESSION | REGULAR EXPRESSION (APPROXIMATION RESULT) |
|---|---|---|
| ☐ | <prim> | [a-zA-Z][a-zA-Z] ¥p(Alnum)¥d (.+)¥p(Alnum)>.[a-z][a-z][a-z] |
| ☐ | <choice> | Sc11_InSc<EF30>.xls \| Sc12_ItlpSc<EG43>.xls \| ScA0_LiDiS<AA>.xls \| Rp801_NwClForm<FA03>.ppt \| Rp9d3_OrForm<FP51>.ppt |
| ☐ | Rp<prim>>.ppt \| <choice> | Rp¥d¥p(Alnum)¥d_ ([a-zA-z])+<[A-Z][A-Z]¥d¥d>.ppt \| Sc12_ItlpSc<EG43>.xls \| ScA0_LiDiS<AA>.xls |
| ☐ | Sc1<prim>>.xls \| <choice> | Sc1¥d ([a-zA-z])+<[A-Z][A-Z]¥d¥d>.xls \| Sc12_ItlpSc<EG43>.xls \| Rp801_NwClForm<FA03>.ppt \| Rp9d3_OrForm<FP51>.ppt |
| ☐ | Sc(1<prim> \| <choice>)>.xls \| <choice> | Sc(1¥d ([a-zA-z])+<[A-Z][A-Z]¥d¥d \| A0_LiDiSc<AA>.xls \| Rp801_NwClForm<FA03>.ppt \| Rp9d3_OrForm<FP51>.ppt |
| ■ | Sc(1<prim> \| <choice>)>.xls \| <prim> | Sc(1¥d_([a-zA-z])+<[A-Z][A-Z]¥d¥d \| A0_LiDiSc<AA>.xls \| Rp¥d¥p(Alnum)¥d¥d>.ppt |

SELECT APPROXIMATE PATTERN EXPRESSION

CLICK OK

[OK]  [CANCEL]

FIG. 10T

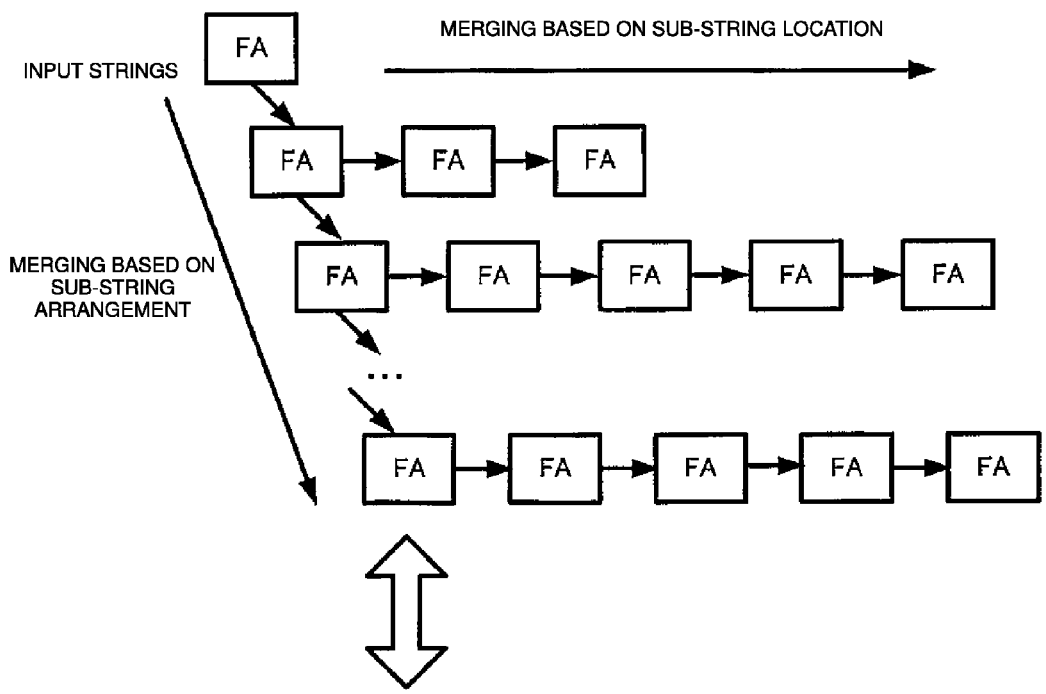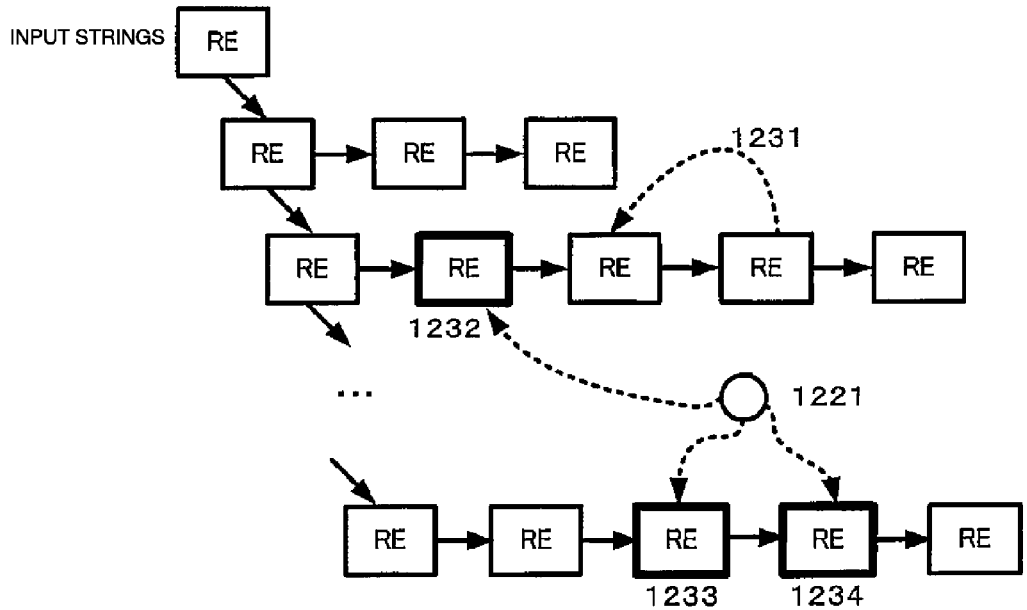
FIG. 12B

1301

```
Sc11_InSc<EF30>.xls
Sc12_ItlpSc<EG43>.xls
ScA0_LiDiSc<AA>.xls
Rp801_NwClForm<FA03>.ppt
Rp9d3_OrForm<FP51>.ppt
```

1302

```
<Pattern1>
[RegExp] Sc1¥d_([a-zA-Z])+<[A-Z][A-Z]¥d¥d>¥.xls
[Var-Pattern] Sc1<1>>.xls
    <1> = Set(1_InSc<EF30, 2_ItlpSc<EG43)

<Pattern 2>
[RegExp] ScA0_LiDiSc<AA>.xls

<Pattern3>
[RegExp] Rp¥d¥p{Alnum}¥d_([a-zA-Z])+<[A-Z][A-Z]¥d¥d>.ppt
[Var-Pattern] Rp<2>>.ppt
    <2> = Set(801_NwClForm<FA03, 9d3_OrForm<FP51)
```

1303

```
<Pattern1> :
[RegExp] Sc(.¥d_([a-zA-Z])+<¥p{Alnum}+>¥.xls
[Var-Pattern] Sc<1>>.xls
    <1> = Set(11_InSc<EF30, 12_ItlpSc<EG43,
            A0_LiDiSc<AA)

<Pattern2> :
[RegExp] Rp¥d¥p{Alnum}¥d_([a-zA-Z])+<[A-Z][A-Z]¥d¥d>.ppt
[Var-Pattern] Rp<2>.ppt
        <2> = Set(801_NwClForm<FA03, 9d3_OrForm<FP51)
```

1304

| APPROXIMATE PATTERN EXPRESSION <<Sc<prim><<prim>>.xls // Rp<prim>>.xls>> |
|---|

1401
```
Maturity Schedule Report_Data comparison_PDF
Maturity Schedule Report_Data comparison_SC_XLS
Maturity Schedule Report_Report Validation_PDF
Maturity Schedule Report_Data comparison_XLS
Maturity Schedule Report_Data comparison_TC_XLS
Maturity Schedule Report_Report Validation_CSV
Maturity Schedule Report_Report Validation_TC_XLS
Maturity Schedule Report_Report Validation_XLS
Maturity Schedule Report_Data comparison_CSV
Maturity Schedule Report_Report Validation_SC_XLS
o o o
```

1402
```
<Pattern1>
 [RegExp]  Maturity Schedule Report_(.*)_([A-Z][A-Z][A-Z])
 [Var-Pattern]  Maturity Schedule Report_<1>_<2>
        <2> = Set(XLS, PDF, CSV)
        <1> = Set(Data comparison, Report Validation)

<Pattern2> :
 [RegExp]  Maturity Schedule Report_(.*)_([A-Z][A-Z])_XLS
 [Var-Pattern] : Maturity Schedule Report_<1>_<2>_XLS
        <2> = Set(TC, SC)
        <1> = Set(Data comparison, Report Validation)
```

1403
```
<Pattern1> :
 [RegExp] Maturity Schedule Report_(.*)(_([A-Z][A-Z]_)?)([A-Z][A-Z][A-Z])
 [Var-Pattern]  Maturity Schedule Report_<1><2><3>
        <3> = Set(XLS, PDF, CSV)
        <2> = Set(_SC_, _, _TC_)
        <1> = Set(Data comparison, Report Validation)
```

1404
```
APPROXIMATE PATTERN EXPRESSION<<Maturity Schedule Report_<prim><prim><prim>>>
```

INPUT STRINGS (5)

ga-men11_sho-ki-ga-men<EF30>.xls ga-men12_koh-moku-nyu-ryoku-ga-men<EG43>.xls ga-menA0_ichi-ran-hyo-ji-ga-men<AA>.xls cho-hyo801_shin-ki-ko-kyaku-fu-o-h-mu<FA03>.ppt cho-hyo9d3_chu-mon-fu-o-h-mu<FP51>.ppt

VARIATION PATTERN:

ga-men1<1>>.xls
  <1> = Set(1_sho-ki-ga-men<EF30, 2_koh-moku-nyu-ryoku-ga-men<EG43)

ga-menA0_ichi-ran-hyo-ji-ga-men<AA>.xls cho-hyo<2>>.ppt
  <2> = Set(801_shin-ki-ko-kyaku-fu-o-h-mu<FA03, 9d3_chu-mon-fu-o-h-mu<FP51>)

STATES

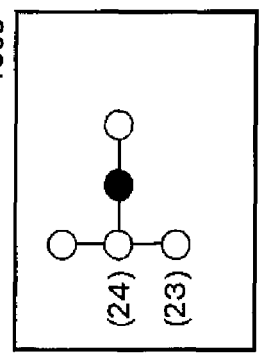

(24)
(23)

APPROXIMATE PATTERN EXPRESSION:

<1>  [ <prim> ]  SELECT   [STORE]

<2>  [ <prim> ]  SELECT   [STORE]

START PROCESSING OF DETERMINING APPLICABLE APPROXIMATE PATTERN EXPRESSION WHEN PART <1> IS FOCUSED

START PROCESSING OF DETERMINING APPLICABLE APPROXIMATE PATTERN EXPRESSION WHEN PART <2> IS FOCUSED

REGULAR EXPRESSION CANDIDATE:

ga-men1¥d¥_(¥kanji)+<[A-Z][A-Z]¥d¥d>.xls ga-menA0_ichi-ran-hyo-ji-ga-men<AA>.xls cho-hyo¥d¥p{Alnum}¥d_(¥kanji)+<[A-Z][A-Z]¥d¥d>.ppt    [STORE]

FIG. 15D

VARIATION PATTERN  FOCUS

1541

[Var-Pattern] ga-men1<1>>.xls
<1> = Set(11_sho-ki-ga-men<EF30, 12_koh-moku-nyu-ryoku-ga-men<EG43)

APPROXIMATE PATTERN EXPRESSION STORE   1542

| | |
|---|---|
| 1542-1 | <prim> |
| 1542-2 | <choice> |

VARIATION PATTERN

[Var-Pattern] ga-men<1>>.xls
<1> = Set(11_sho-ki-ga-men<EF30, 12_koh-moku-nyu-ryoku-ga-men<EG43, A0_ichi-ran-hyo-ji-ga-men<AA) 1543

APPROXIMATE PATTERN EXPRESSION STORE 1544

| | |
|---|---|
| 1544-1 | <prim> |
| 1544-2 | <choice> |
| 1544-3 | ga-men1<prim>>.xls |
| 1544-4 | cho-hyo<prim>>.ppt |

INPUT STRINGS (5) — 1501

- ga-men11_sho-ki-ga-men<EF30>.xls
- ga-men12_koh-moku-nyu-ryoku-ga-men<EG43>.xls
- ga-menA0_ichi-ran-hyo-ji-ga-men<AA>.xls
- cho-hyo801_shin-ki-ko-kyaku-fu-o-h-mu<FA03>.ppt
- cho-hyo9d3_chu-mon-fu-o-h-mu<FP51>.ppt

VARIATION PATTERN: — 1502, 1505

```
ga-men1<1>>.xls
    <1> = Set(11_sho-ki-ga-men<EF30,
    12_koh-moku-nyu-ryoku-ga-men<EG43,
    A0_ichi-ran-hyo-ji-ga-men<AA)

<2>
<2> = Set(cho-hyo801_shin-ki-ko-kyaku-fu-o-h-mu<FA03>.ppt,
    cho-hyo9d3_chu-mon-fu-o-h-mu<FP51>.ppt)
```

STORE

STORE

STATES — 1503
START POINT

(24)
(23)

SELECT RE-APPLICATION OF OPERATION T

APPROXIMATE PATTERN EXPRESSION: — 1506

<1>  {<prim> | <choice>}   SELECT
<2>  <prim>                SELECT

REGULAR EXPRESSION CANDIDATE: — 1504

- ga-men(1¥d_(¥kanji)+-<[A-Z]|[A-Z]¥d | A0_ichi-ran-hyo-ji-ga-men<AA00)>.xls
- cho-hyo¥d¥d¥p(Alnum)¥d_(¥kanji)+-<[A-Z]|[A-Z]¥d¥d>.ppt

VARIATION PATTERN

[Var-Pattern] <1>
    <1> = Set(ga-men11_sho-ki-ga-men<EF30>.xls, ga-men12_koh-moku-nyu-ryoku-ga-men<EG43>.xls, ga-menA0_ichi-ran-hyo-ji-ga-men<AA>.xls, cho-hyo801_shin-ki-ko-kyaku-fu-o-h-mu<FA03>.ppt, cho-hyo9d3_chu-mon-fu-o-h-mu<FP51>.ppt

1545

APPROXIMATE PATTERN EXPRESSION STORE

1546

| | |
|---|---|
| 1546-1 | <prim> |
| 1546-2 | <choice> |
| 1546-3 | ga-men1<prim>>.xls |
| 1546-4 | cho-hyo< prim>>.ppt |
| 1546-5 | ga-men(1<prim> \| <choice>).xls |

FIG. 15R

APPROXIMATE PATTERN EXPRESSION SELECTION SCREEN

<1>
<1> = Set(ga-men11_sho-ki-ga-men<EF30>.xls, ga-men12_koh-moku-nyu-ryoku-ga-men<EG43>.xls,
ga-menA0_ichi-ran-hyo-ji-ga-men<AA>.xls, cho-hyo801_shin-ki-ko-kyaku-fu-o-h-mu<FA03>.ppt,
cho-hyo9d3_chu-mon-fu-o-h-mu<FP51>.ppt)

1537

1538

DESIGNATE APPROXIMATE PATTERN EXPRESSION FOR APPROXIMATING PART <1>

1539

| SELECT | APPROXIMATE PATTERN EXPRESSION | REGULAR EXPRESSION (APPROXIMATION RESULT) |
|---|---|---|
| ☐ | <prim> | ¥kanji¥kanji¥p{Alnum}¥d(.+)¥p{Alnum}>.[a-z][a-z][a-z] |
| ☐ | <choice> | ga-men11_sho-ki-ga-men<EF30>.xls \| ga-men12_koh-moku-nyu-ryoku-ga-men<EG43>.xls \| ga-menA0_ichi-ran-hyo-ji-ga-men<AA>.xls \| cho-hyo801_shin-ki-ko-kyaku-fu-o-h-mu<FA03>.ppt \| cho-hyo9d3_chu-mon-fu-o-h-mu<FP51>.ppt |
| ☐ | cho-hyo<prim>>.ppt \| <choice> | cho-hyo¥d¥p{Alnum}¥d_(¥kanji)+<[A-Z][A-Z]¥d¥d>.ppt \| ga-men11_sho-ki-ga-men<EF30>.xls \| ga-men12_koh-moku-nyu-ryoku-ga-men<EG43>.xls \| ga-menA0_ichi-ran-hyo-ji-ga-men<AA>.xls |
| ☐ | ga-men1<prim>>.xls \| <choice> | ga-men1¥d_(¥kanji)+<[A-Z][A-Z]¥d¥d>.xls \| ga-men12_koh-moku-nyu-ryoku-ga-men<EG43>.xls \| cho-hyo801_shin-ki-ko-kyaku-fu-o-h-mu<FA03>.ppt \| cho-hyo9d3_chu-mon-fu-o-h-mu<FP51>.ppt |
| ☐ | ga-men(1<prim> \| <choice>)>.xls \| <choice> | ga-men(1¥d_(¥kanji)+<[A-Z][A-Z]¥d¥d \| A0_ichi-ran-hyo-ji-ga-men<AA>.xls \| cho-hyo801_shin-ki-ko-kyaku-fu-o-h-mu<FA03>.ppt \| cho-hyo9d3_chu-mon-fu-o-h-mu<AA>.ppt |
| ■ | ga-men(1<prim> \| <choice>)>.xls | ga-men(1¥d¥d¥p{Alnum}¥d_(¥kanji)+<[A-Z][A-Z]¥d¥d \| A0_ichi-ran-hyo-ji-ga-men<AA>.xls \| cho-hyo¥d¥d¥p{Alnum}¥d_(¥kanji)+<[A-Z][A-Z]¥d¥d>.ppt |

SELECT APPROXIMATE PATTERN EXPRESSION

CLICK OK

[ OK ]   [ CANCEL ]

```
ga-men11_sho-ki-ga-men<EF30>.xls
ga-men12_koh-moku-nyu-ryoku-ga-men<EG43>.xls
ga-menA0_ichi-ran-hyo-ji-ga-men<AA>.xls
cho-hyo801_shin-ki-ko-kyaku-fu-o-h-mu<FA03>.ppt
cho-hyo9d3_chu-mon-fu-o-h-mu<FP51>.ppt
```

1702

```
<Pattern1>
[RegExp] ga-men1¥d_(¥kanji)+<[A-Z][A-Z]¥d¥d>¥.xls
[Var-Pattern] ga-men1<1>>.xls
    <1> = Set(1_sho-ki-ga-men<EF30, 2_koh-moku-nyu-ryoku-ga-men<EG43)

<Pattern 2>
[RegExp] ga-menA0_ichi-ran-hyo-ji-ga-men<AA>.xls

<Pattern3>
[RegExp] cho-hyo¥d¥p{Alnum}¥d_(¥kanji)+<[A-Z][A-Z]¥d¥d>.ppt
[Var-Pattern] cho-hyo<2>>.ppt
    <2> = Set(801_shin-ki-ko-kyaku-fu-o-h-mu<FA03, 9d3_chu-mon-fu-o-h-mu<FP51)
```

1703

```
<Pattern1> :
[RegExp] ga-men(.¥d_(¥kanji)+<¥p{Alnum}+>¥.xls
[Var-Pattern] ga-men<1>>.xls
    <1> = Set(11_sho-ki-ga-men<EF30, 12_koh-moku-nyu-ryoku-ga-men<EG43,
              A0_ichi-ran-hyo-ji-ga-men<AA)

<Pattern2> :
[RegExp] cho-hyo¥d¥p{Alnum}¥d_(¥kanji)+<[A-Z][A-Z]¥d¥d>.ppt
[Var-Pattern] cho-hyo<2>.ppt
        <2> = Set(801_shin-ki-ko-kyaku-fu-o-h-mu<FA03, 9d3_chu-mon-fu-o-h-mu<FP51)
```

1704

```
APPROXIMATE PATTERN EXPRESSION <<gamen<prim><<prim>>.xls // cho-hyo<prim>>.xls>>
```

METHOD OF TRANSFORMING SETS OF INPUT STRINGS INTO AT LEAST ONE PATTERN EXPRESSION THAT IS STRING EXPRESSING SETS OF INPUT STRINGS, METHOD OF EXTRACTING TRANSFORMATION PATTERN AS APPROXIMATE PATTERN EXPRESSION, AND COMPUTER AND COMPUTER PROGRAM FOR THE METHODS

CROSS-REFERENCE TO RELATED APPLICATION

This application claims priority under 35 U.S.C. §119 from Japan Patent Application No. 2012-124964 filed May 31, 2012, the entire contents of which are incorporated herein by reference.

BACKGROUND OF THE INVENTION

1. Field of the Invention

The present invention relates to a method for transforming sets of input strings into at least one pattern expression that is a string expressing the sets of the input strings. The present invention particularly relates to a method for extracting a transformation pattern as an approximate pattern expression in the process of transforming the sets of input strings to at least one pattern expression, the transformation pattern being for transforming the sets of input strings to the pattern expression.

2. Description of Related Art

In setting a document parsing tool used in software development, a regular expression is often utilized to extract a sub-string of a processing target in a document. The extraction target can be a large number of similar sets of strings described according to a particular rule specific to a project. However, in an existing tool, a pattern expressing the rule needs to be manually acquired as an appropriate regular expression. This considerably restricts automation of processing of extracting a sub-string or accessibility of the aforementioned tool.

The regular expression in tools for upstream documents can be utilized for the purposes of, for example: utilizing a particular part of a document by extracting the part by use of the regular expression; designating a file to be subjected to certain processing by use of the regular expression; performing appropriate processing to a subset of files in a folder by sorting the files by using the regular expression; and extracting and utilizing semantic information by extracting a common part or a variable part from a text group.

In addition to the parsing of an upstream document, the regular expression can be used for, for example, lexical analysis in a compiler, keyword searching for text on a web or the like, and in the following scene. Specifically, when different kinds of processing are desired among files in a folder, a particular file is extracted by file name matching using the regular expression and is processed by particular processing.

Japanese Patent Application No. 2004-354787 describes an interactive method executed in an interactive device having a user-interactive feature; the interactive device; an interactive program; and a recording medium in which the interactive program is recorded. Every time a user inputs an information request, the interactive device identifies the content of the information request of the user by using a history of communications with the user, and responds to the user according to the content.

Japanese Patent Application No. 2004-139446 describes a secretary agent system, a secretary agent program and a dialogue planning method which are used in an everyday language computer system configured to process language text based on a semiotic base which is a structured collection of meaning resources in everyday language, the secretary agent system and the secretary agent program assisting interactive exchange of language text between the user and the everyday language computer system.

Japanese Application No. 2004-513458 describes: a method for allowing a user to view and modify a weighting for translation of a source language string; a machine translation system for allowing a user to view and modify a weighting for translation of a source language; and a product having computer-readable program means for allowing a user to view and modify a weighting for translation.

Japanese Application 2010-79723 describes an information processing apparatus comprising: a state classifying unit that generates state sets from states included in a deterministic finite state automaton by classifying the states into the state sets according to input symbols associated with outgoing transitions and finality indicating whether a state is a final state, in such a way that states in each set have the same input symbol and the same finality; a calculating unit that calculates an intersection of each state set and a set of transition destination states to which the states in the state set are transitioned, and iterates the calculation of the intersection, until the number of states in the intersection reaches one, by targeting, as a new state set, a set of transition destination states to which states included in the intersection are transitioned with the same symbol; and a state merging unit that merges plural indistinguishable states into one state by tracing the transition arrows in a reverse direction to the transition direction that the calculating unit follows, when the number of states in the intersection reaches one.

Japanese Application No. 2008-305722 describes search using indeterminate strings as a search string. The indeterminate strings can be expressed as regular expressions which include candidate characters selected for and united to each input character, and which are each formed by concanating the candidate characters for the input characters. Thus, search using a finite state automaton including the regular expressions can be performed instead of the above search using the indeterminate strings. The search using the finite state automaton, however, requires the following processing. Specifically, the finite state automaton needs to be provided with accept states accepting all the characters other than the candidate characters, in addition to the states of the candidate characters for each character. Moreover, each of the states of the candidate characters is associated with a certainty degree. Every time the acceptance of a character in a sub-string makes the state transition to the following state, the certainty degrees of the state and the following state are added up.

Japanese Application No. 2011-123794 describes provision of a technique for extracting information structured from a natural sentence, without using a parsing technique.

Japanese Application No. 2002-229981 describes a method for normalizing input strings.

Japanese Application No. 01-180046 describes a knowledge-based system and a method for understanding a natural language.

Japanese Application No. 2005-301780 describes an information processing apparatus performing dialogue processing and an information processing method for the same.

Japanese Application No. 2011-141627 describes a device and a generation method by which configuration data of a predetermined reconfigurable finite state automaton circuit is generated based on any regular expression.

SUMMARY OF THE INVENTION

Many of the existing methods are general-purpose techniques for inferring regular expressions in accordance with particular bases. For this reason, the existing regular expression inference techniques have difficulty in inferring a regular expression desired by users in a mechanical manner through processing on description patterns having peculiar notation, e.g., description patterns specific to a project which are necessary to parse upstream documents on the project. In addition, the inferred expressions are not reusable for part of sets of strings targeted for a specific inference based on particular knowledge. For this reason, the regular expressions are currently obtained by a general inference method with poor accuracy.

To address this situation, the present invention aims to provide a technique with which a specific inference on a particular type of description set on the basis of knowledge is made reusable in the process of transforming sets of input strings into at least one pattern expression, such for example as a regular expression, which is a string expressing the sets of the input strings. Moreover, the present invention also aims to provide a technique of enabling the inference of pattern expressions stepwise from transformation to a specific pattern expression to transformation to an abstract pattern expression. Here, the particular type of description set is, for example, a set of program names, a set of specification names, or a set of descriptions of value setting methods for parameters.

Specifically, in the process of transforming sets of input strings to at least one pattern expression that is a string expressing the sets of input strings, the present invention firstly aims to offer a feature of inferring pattern expressions from the sets of input strings stepwise and the following features for reusing a transformation pattern for the inference: feature of extracting, acquiring and storing an inference, which is once obtained, in a reusable form; feature of enabling application of a specific inference function to a particular part in the process of the stepwise inference of pattern expressions; and feature of describing a transformation pattern for transforming sets of input strings to a pattern expression in order to store a finding in the way of inferring the pattern expression from particular set of input strings.

Specifically, in the process of transforming sets of input strings to at least one pattern expression that is a string expressing the sets of input strings, the present invention secondly aims to offer a feature of inferring pattern expressions in such a manner that variations of pattern expressions for the sets of input strings change from a concrete pattern expression to an abstract pattern expression step by step, in other words, the level of abstraction becomes higher and higher stepwise, and a feature of presenting the pattern expressions to a user.

The present invention provides: a technique of transforming sets of input strings to at least one pattern expression that is a string expressing the sets of input strings; and a technique of extracting, as an approximate pattern expression, a transformation pattern for transforming the sets of input strings to the pattern expression in the process of the transformation. The present invention particularly provides a technique of inferring the pattern expression in such a manner that the sets of input strings are transformed from the specific pattern expression to an abstract pattern expression step by step. The techniques can include a method, a computer, a computer program, and a computer program product.

The present invention provides a method for extracting a transformation pattern as an approximate pattern expression in the process of transforming sets of input strings to at least one pattern expression that is a string expressing the sets of input strings, the transformation pattern being for transforming the sets of input strings to the pattern expression. The method includes the steps of: (1) preparing one structure including multiple nodes each representing a state and multiple edges each representing a transition; (2) generating a first degenerated structure by removing at least one state in the one structure from the one structure and by merging at least two edges including an edge associated with the removed state in the one structure; (3) generating a first approximate pattern expression based on the first degenerated structure; and (4) presenting the first approximate pattern expression. In the step (2) above, the at least one state in the one structure is removed from the one structure and the at least two edges including the edge associated with the removed state in the one structure are merged: (A) based on a state removal score indicating an evaluated value of a change level of a sub-structure in the one structure, the sub-structure associated with at least two edges which are to be merged with a removal of at least one state in the one structure; (B) based on an inclusion relationship between the sub-structure and another sub-structure or the one structure; or (C) based on a combination of the state removal score and the inclusion relationship.

The one structure prepared in the step (1) above can be, for example, one structure generated from the input strings, that is, for example, a finite state automaton. Hence, the step (1) above can include a step of generating the one structure from the input strings.

The one structure prepared in the step (1) above can be, for example, a structure acquired by reducing the one structure generated from the input strings. The step (1) above can include a step of generating the one structure from the input strings and then performing abstraction processing on the generated structure. The step of performing the abstraction processing can be, for example, abstraction processing performed in an operation S or an operation T to be mentioned below.

The presenting step in the step (4) above can include a step of displaying the first approximate pattern expression on a screen.

The present invention provides a method for transforming sets of input strings into at least one pattern expression. The method can include the steps of: performing at least once the step of generating the first approximate pattern expression; presenting the generated first approximate pattern expression every time the first approximate pattern expression is generated; and presenting a pattern expression matching the generated first approximate pattern expression.

The step of presenting the first approximate pattern expression can include a step of displaying the first approximate pattern expression on the screen. The step of presenting the pattern expression can include a step of displaying the pattern expression on the screen.

The method for transforming sets of input strings into at least one pattern expression also includes executing the steps of: performing at least once the step of generating the second approximate pattern expression; presenting the generated second approximate pattern expression every time the second approximate pattern expression is generated; and presenting a pattern expression matching the second approximate pattern expression.

The step of presenting the second approximate pattern expression can include a step of displaying the second approximate pattern expression on the screen. The step of presenting the pattern expression can include a step of displaying the pattern expression on the screen.

The present invention also provides a computer configured to extract a transformation pattern as an approximate pattern expression in the process of transforming sets of input strings to at least one pattern expression that is a string expressing the sets of input strings, the transformation pattern being for transforming the sets of input strings to the pattern expression. The computer includes: a first generation unit configured to prepare one structure including multiple nodes each representing a state and multiple edges each representing a transition, the edges each having as a label a set of sub-strings (hereinafter, referred to as an "edge-owned string set") in the sets of input strings; a second generation unit configured to generate a first degenerated structure by removing at least one state in the one structure from the one structure and by merging at least two edges, in a structure acquired by degenerating the one structure, including an edge associated with the removed state; an expression generation unit configured to generate a first approximate pattern expression based on the degenerated first structure; and a presentation unit configured to present the first approximate pattern expression.

In one embodiment of the present invention, the computer can further include a third generation unit configured to generate a second reduced structure having merged states either by, in a case where paths within k transition steps (k is an integer of 1 or larger) after at least any two states in the one structure have the same sets of label strings, merging sets of transitions having the same sets of label strings and sets of states included in the sets of transitions, or by, in a case where sets of label strings of a path within m transition steps (m is an integer of 1 or larger) after one of at least any two states in the one structure include sets of label strings of a path within n transition steps (n is an integer of 1 or larger) after the other one of the two states, merging sets of transitions having the included sets of label strings and sets of states included in the sets of transitions. The aforementioned expression generation unit can generate the second approximate pattern expression based on the second degenerated structure. The presentation unit can present the second approximate pattern expression.

The present invention also provides a computer configured to transform sets of input strings into at least one pattern expression that is a string expressing the sets of input strings. In the computer, the second generation unit generates the first approximate pattern expression at least once, the presentation unit presents the generated first approximate pattern expression every time the first approximate pattern expression is generated, and the presentation unit further presents the pattern expression matching the generated first approximate pattern expression.

In the computer configured to transform sets of input strings into at least one pattern expression, the third generation unit can further generate the second approximate pattern expression at least once, the presentation unit can further present the generated second approximate pattern expression every time the second approximate pattern expression is generated, and the presentation unit can further present the pattern expression matching the generated second approximate pattern expression.

The present invention also provides a computer program of extracting a transformation pattern as an approximate pattern expression in the process of transforming sets of input strings to at least one pattern expression that is a string expressing the sets of input strings, the transformation pattern being for transforming the sets of input strings to the pattern expression. The computer program causes the computer to execute the steps of the method, according to the present invention, of extracting a transformation pattern for transforming sets of input strings to at least one pattern expression, as an approximate pattern expression.

The present invention also provides a computer program of transforming sets of input strings into at least one pattern expression that is a string expressing the sets of input strings. The computer program causes the computer to execute the steps of the method for transforming sets of input strings into at least one pattern expression according to the present invention.

The present invention also provides: a computer program product that extracts a transformation pattern as an approximate pattern expression in the process of transforming the sets of input strings to the at least one pattern expression, the transformation pattern being for transforming the sets of input strings to the pattern expression; and a computer program product that transforms the sets of input strings into the pattern expression.

The computer programs for implementing functions of the present invention can be stored in any computer-readable recording medium such as a flexible disk, an MO, a CD-ROM, a DVD, a BD, a hard disk device, a USB-connectable memory, a ROM, an MRAM, or a RAM. To store the computer programs in a recording medium, the computer programs can be downloaded from another data processing system connected through a communication line or can be copied from another recording medium. The computer programs can also be stored in a single or multiple recording media after being compressed or divided into multiple sub-programs. Note that the computer program products for implementing the present invention can also be provided in various modes. The computer program products can include, for example, a recording medium having the computer programs recorded therein or a transmission medium for transmitting the computer programs.

It should be noted that the foregoing outline of the present invention dose not list all the features necessary for the present invention, and that combinations or subcombinations of these elements can also be included in the present invention.

It goes without saying that those skilled in the art can easily conceive various modifications made, for example, by combining hardware components of the computer used in the embodiment of the present invention with multiple machines and by assigning the functions to the machines. The modifications are based on concepts naturally included in the spirit of the present invention. However, these components are provided for merely illustrative purposes, and not all of the components are indispensable to the present invention.

The present invention can be implemented by hardware, software, or a combination of both. Execution of the computer programs in an apparatus having these programs installed therein is a typical example of the implementation by a combination of hardware and software. In such a case, each computer program is loaded on the memory of the apparatus and executed, thereby controlling and causing the apparatus to perform processing according to the present invention. The program can include a command set which can be expressed in any selected language, codes, or expressions. Such a command set enables the apparatus to directly execute a particular feature, or to execute the particular feature after 1) being converted into any other language, codes, or expressions, and/or 2) being copied to another medium.

According to the embodiment of the present invention, a desirable pattern expression can be inferred on the basis of a finding in transformation to the pattern expression. Thus, quality improvement in document analysis can be achieved.

According to the embodiment of the present invention, inference for achieving a necessary pattern expression is automatically made and does not necessarily have to be made by an expert. Thus, costs, for example, labor costs or development costs can be reduced.

According to the embodiment of the present invention, when the present invention is implemented, for example, in document analysis tools, user-friendliness of the tools can be enhanced. Due to the enhancement of the user-friendliness of the tools, the tools are expected to be widely used.

According to the embodiment of the present invention, the present invention can be applied to automation tools for upstream documents. Upstream process automation tools are less full-fledged than downstream process automation tools are. When the present invention is applied to the automation tools for upstream documents, the tools are expected to be widely used.

BRIEF DESCRIPTION OF THE DRAWINGS

FIG. 9B shows an example of determining an approximate pattern expression applicable to an approximation target part in the variation pattern by using the flowchart in FIG. 9A, according to the embodiment of the present invention.

FIG. 9C shows an example of determining an approximate pattern expression applicable to an approximation target part in the variation pattern by using the flowchart in FIG. 9A, according to the embodiment of the present invention.

FIG. 10E shows Embodiment 1 which is the embodiment of the present invention, and shows one of the variation patterns shown in FIG. 10D. FIG. 10E shows: the variation pattern in the case of focusing an approximation target part among the variation patterns shown in FIG. 10D; and approximate pattern expressions currently existing in the approximate pattern expression store.

FIG. 10L shows Embodiment 1 which is the embodiment of the present invention, and shows: one of the variation patterns shown in FIG. 10K in the case of focusing an approximation target part in the variation pattern; and approximate pattern expressions currently existing in the approximate pattern expression store.

FIG. 10R shows Embodiment 1 which is the embodiment of the present invention, and shows: the variation pattern shown in FIG. 10Q in the case of focusing an approximation target part in the variation pattern; and approximate pattern expressions currently existing in the approximate pattern expression store.

FIG. 10T shows Embodiment 1 which is the embodiment of the present invention, and shows an example of an approximate pattern expression applicable to an approximation target part in the variation pattern shown in FIG. 10R when the approximation target part is focused. The screen shows that an added approximate pattern expression desired by the user is selectable.

FIG. 12B shows the interaction feature for inferring a regular expression in the user-interactive manner according to the embodiment of the present invention, in the regular expression inference processing performed in such a manner that sets of input strings change from a specific regular expression to an abstract regular expression step by step.

FIG. 13 shows regular expression patterns generated according to Embodiment 1 which is the embodiment of the present invention when sets of input strings are processed interactively in such a manner as to be changed from a concrete regular expression to an abstract regular expression step by step.

FIG. 14 shows regular expression patterns generated according to the embodiment of the present invention when sets of input strings are processed interactively in such a manner as to be changed from a concrete regular expression to an abstract regular expression step by step.

FIG. 15D shows Embodiment 2 which is the embodiment of the present invention, and exemplifies a screen showing an operation for determining, to acquire a regular expression candidate from the finite state automaton generated in the operation-T abstraction processing shown in FIG. 15C, approximate pattern expressions applicable to approximation target parts in variation patterns generated from the finite state automaton.

FIG. 15E shows: the variation pattern in the case of focusing an approximation target part among the variation patterns shown in FIG. 15D; and approximate pattern expressions currently existing in the approximate pattern expression store.

FIG. 15L shows Embodiment 2 which is the embodiment of the present invention, and shows: one of the variation patterns shown in FIG. 15K in the case of focusing an approximation target part in the variation pattern; and approximate pattern expressions currently existing in the approximate pattern expression store.

FIG. 15P shows Embodiment 2 which is the embodiment of the present invention, and exemplifies a screen showing an operation for starting the (third) operation-T abstraction processing on the finite state automaton which is generated by the abstraction processing in FIG. 15J and is shown in FIG. 16E to be described below.

FIG. 15R shows Embodiment 2 which is the embodiment of the present invention, and shows: the variation pattern shown in FIG. 15Q in the case of focusing an approximation target part in the variation pattern; and approximate pattern expressions currently existing in the approximate pattern expression store.

FIG. 15T shows Embodiment 2 which is the embodiment of the present invention, and shows an example of an approximate pattern expression applicable to an approximation target part in the variation pattern shown in FIG. 15R when the approximation target part is focused. The screen shows that an added approximate pattern expression desired by the user is selectable.

FIG. 17 shows regular expression patterns generated according to Embodiment 2 which is the embodiment of the present invention when sets of input strings are processed interactively in such a manner as to be changed from a concrete regular expression to an abstract regular expression step by step.

DETAILED DESCRIPTION OF THE PREFERRED EMBODIMENTS

Figure 1:
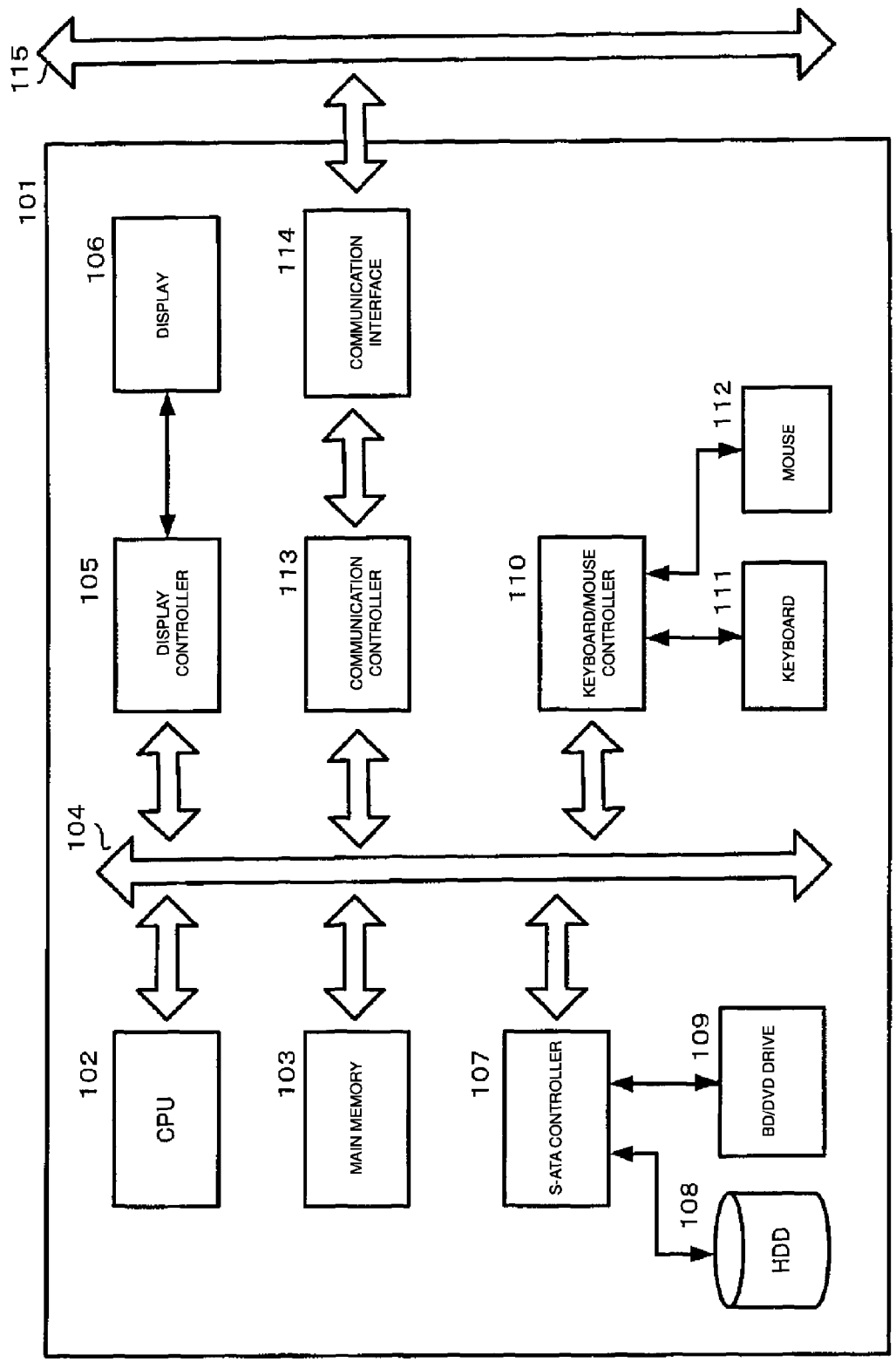
FIG. 1 is a diagram showing an example of a hardware configuration for implementing a computer according to an embodiment of the present invention.

Hereinbelow, a best mode for carrying out the present invention will be described in detail by using the drawings. Note that the following embodiment does not restrict the invention according to the scope of the claims, and not all the combinations of the characteristics described in the embodiment are necessarily indispensable for the solving means of the present invention. The present invention can be implemented in many various modes. It is obvious to those skilled in the art that various modifications and improvements can be additionally provided to the following embodiment.

The same components are denoted by the same reference numerals throughout the description of Description of Embodiments, unless otherwise stated.

FIG. 1 is a diagram showing an example of a hardware configuration for implementing a computer according to the embodiment of the present invention.

A computer (101) includes a CPU (102) and a main memory (103) that are connected to a bus (104). The CPU (102) is preferably based on a 32-bit or 64-bit architecture and, for example, the following can be used as the CPU (102): Intel's Core i (trademark) series, Core 2 (trademark) series, Atom (trademark) series, Xeon (registered trademark) series, Pentium (registered trademark) series, and Celeron (registered trademark) series; and AMD's Opteron (trademark) series, Phenom (trademark) series, Athlon (trademark) series, Turion (trademark) series, Sempron (trademark) series, and A series. A display (106), e.g., a liquid crystal display (LCD) can be connected to the bus (104) via a display controller (105). The display (106) is used to display information on a computer connected to a network through a communication line and on software running on the computer with an appropriate graphic interface, for the management of the computer.

A disk (108), e.g., a silicon disk or a hard disk, as well as an optional drive (109), e.g., a CD drive, a DVD drive, or a BD drive can also be connected to the bus (104) via a SATA/IDE controller (107). Furthermore, a keyboard (111) and a mouse (112) can optionally be connected to the bus (104) via a keyboard/mouse controller (110) or a USB bus (not illustrated).

An operating system, other programs, and data are stored in the disk (108) to be loadable to the main memory (103). Software enabling input or editing of a character string and a front end processor (FEP) being character conversion software are stored in the disk (108) to be loadable to the main memory (103). The operating system can be, for example, LINUX (registered trademark) provided by LINUX (registered trademark) distributers, Windows (registered trademark) Operating System provided by Microsoft Corporation, MacOS (registered trademark) or iOS (registered trademark) provided by Apple Computer Incorporated, or UNIX (registered trademark) System including X Window System (for example, AIX (registered trademark) provided by International Business Machines Corporation (registered trademark)).

The drive (109) can be used to install a program from a CD-ROM, a DVD-ROM, or a BD to the disk (108) as required.

A communication interface (114) conforms to an Ethernet (registered trademark) protocol, for example. The communication interface (114) is connected to the bus (104) via a communication controller (113) and plays a role of physically connecting the computer (101) to a communication line (115). Thus, the communication interface (114) provides a network interface layer for a TCP/IP communication protocol serving a communication function of the operating system of the computer (101). The communication line can be in a wired LAN or wireless LAN environment or based on a Wi-Fi standard such as IEEE802.11a/b/g/n.

It can be understood from the above that the computer used in the embodiment of the present invention is not limited to one in a particular operating system embodiment.

Figure 2:
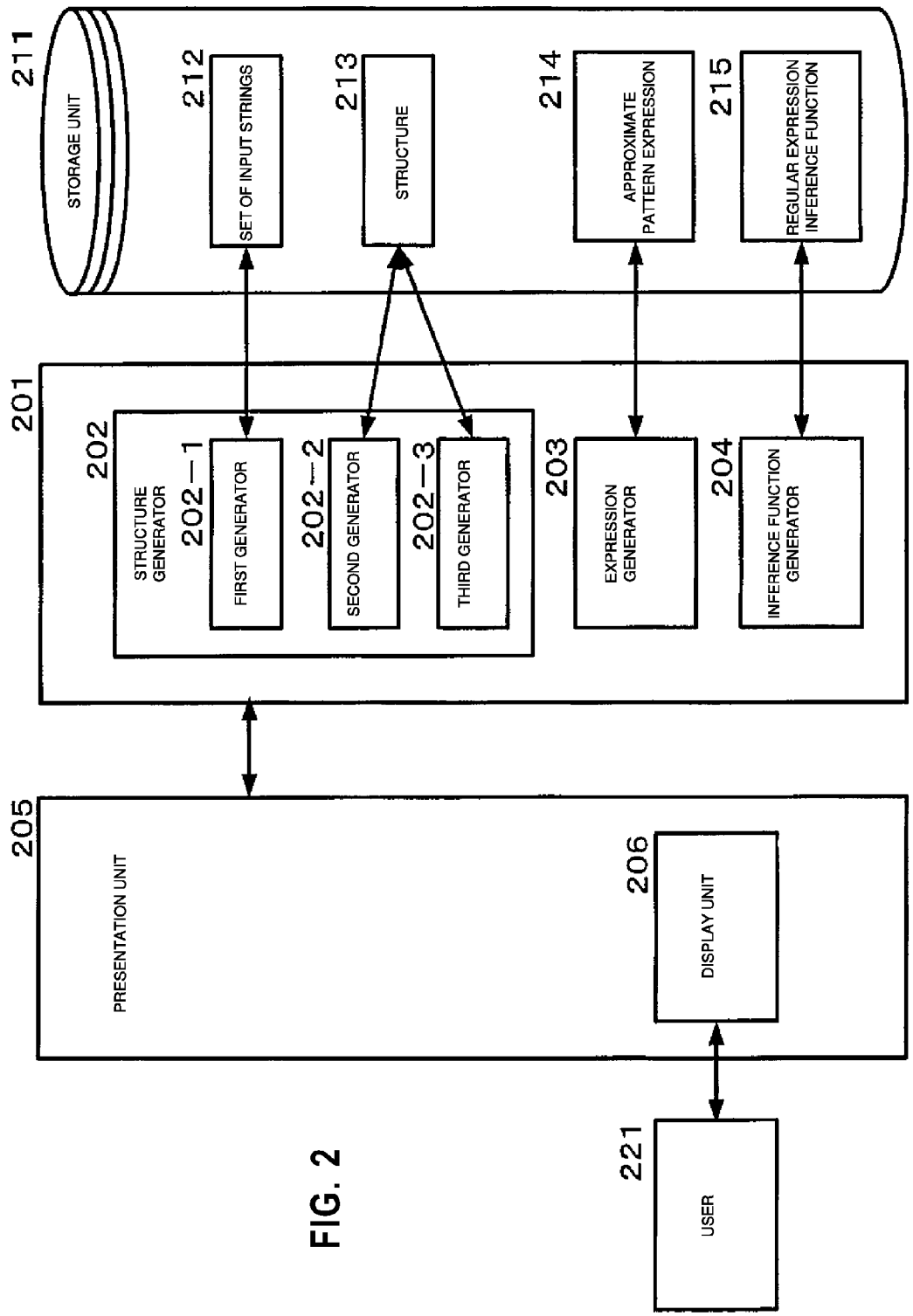
FIG. 2 is a diagram showing an example of a functional block diagram of the computer which preferably has the hardware configuration according to FIG. 1 and which is according to the embodiment of the present invention.

FIG. 2 is a diagram showing an example of a functional block diagram of a computer which preferably has the hardware configuration according to FIG. 1 and which is according to the embodiment of the present invention.

A computer (201) can have the hardware configuration according to FIG. 1. The computer (201) can include a structure generator (202), an approximate pattern expression generator (hereinafter, also referred to as an "expression generator") (203), and a pattern expression inference function generator (hereinafter, also referred to as an "inference function generator") (204). The computer (201) can also incorporate a presentation unit (205) or a display unit (206), or can be connected by wire or wireless to the display unit (206) provided outside the computer (201). The computer (201) can also incorporate a storage unit (211), or can be connected by wire or wireless to the storage unit (211) provided outside the computer (201).

The structure generator (202) can include a first generator (202-1), a second generator (202-2), and a third generator (202-3). In the embodiment of the present invention, each of edges in a structure is labeled with a set of sub-strings (an edge-owned string set) in the corresponding set of input strings. The structure can be a finite state automaton, for example. For an example of the finite state automaton, see FIG. 4 to be described below.

The structure generator (202) can prepare one structure having multiple nodes representing states and multiple edges representing transitions. Each edge is labeled with an edge-owned string set in the corresponding set of input strings.

The first generator (202-1) generates one structure (hereinafter, also referred to as an "initial structure") from the sets of input strings. The first generator (202-1) can read the sets of input strings from the storage unit (211), or can receive sets of strings inputted by a user (221) through an input device such as a keyboard or a speech recognizer (see FIG. 10A to be described below, for example).

The second generator (202-2) can generate a first reduced structure by removing at least one state in the initial structure or a structure resulting from reduction of the initial structure (hereinafter, referred to as an initial-structure-degenerated structure) from the initial structure or the initial-structure-degenerated structure and by merging at least two edges including an edge associated with the removed state in the initial structure or the initial-structure-reduced structure (1) based on a state removal score indicating an evaluated value of a change level of a sub-structure in the initial structure or the initial-structure-degenerated structure, the sub-structure being associated with edges which are to be merged with a removal of at least one state in the initial structure or the initial-structure-reduced structure; (2) based on an inclusion relation between the sub-structure and another sub-structure in the initial structure, or between the sub-structure and either the initial structure or the initial-structure-degenerated structure; or (3) based on a combination of (1) and (2) above.

Suppose a case of at least any two states in the initial structure or the initial-structure-degenerated structure. In a case where paths within k transition steps (k is an integer of 1 or larger) after the at least two states have the same sets of label strings, the third generator (202-3) can merge sets of transitions having the same sets of label strings and sets of states included in the sets of transitions and can thereby generate a second degenerated structure having the merged states (see FIGS. 5A and 5B to be described below).

Suppose another case of at least any two states in the initial structure or the initial-structure-degenerated structure. In a case where sets of label strings of a path within m transition steps (m is an integer of 1 or larger) after one of the at least two states include sets of label strings of a path within n transition steps (n is an integer of 1 or larger) after the other one of the two states, the third generator (202-3) can merge sets of transitions having the included sets of label strings and sets of states included in the sets of transitions and can thereby generate a second degenerated structure having the merged states (see FIG. 5C to be described below).

The expression generator (203) can generate a first approximate pattern expression based on the first degenerated structure generated by the second generator (202-2).

The expression generator (203) can also generate a second approximate pattern expression based on a second degenerated structure generated by the third generator (202-3).

The inference function generator (204) can acquire a first inference function for a pattern expression, for example, a regular expression from a first degenerated structure (213).

The inference function generator (204) can also acquire a second inference function for a pattern expression, for example, a regular expression from a second degenerated structure (213).

The presentation unit (205) can provide an operating system and application software running on, for example, the computer (201) with the approximate pattern expression, and for example, the first approximate pattern expression or the second approximate pattern expression. The presentation unit (205) can have a function of the display unit (206). The display unit (206) can be the display (106), for example.

The display unit (206) can display on a screen a structure generated by the first generator (202-1), the first degenerated structure generated by the second generator (202-2), and the second degenerated structure generated by the third generator (202-3).

The display unit (206) can also display on the screen the pattern expression, for example, the first approximate pattern expression or the second approximate pattern expression.

The display unit (206) can also display sets of input strings (212) and/or a pattern expression inference function (215). The pattern expression inference function (215) includes the regular expression inference function, for example. Hereinafter, the pattern expression inference function (215) is also referred to as a regular expression inference function (215).

The storage unit (211) can store the sets of input strings (hereinafter, also referred to as the "sets of strings") (212), a structure or the degenerated structure (213), an approximate pattern expression (214), and the regular expression inference function (215) in a file format, for example. A storage unit (211) storing the approximate pattern expression (214) is also referred to as an approximate pattern expression store. A storage unit (211) storing the regular expression inference function (215) is also referred to as a regular expression inference function store.

The sets of strings (212) are description sets of a particular type, and specifically can be a large volume of sets of strings having a particular rule. The sets of strings (212) can include, for example, a set of candidate strings extracted from a document, a set of file names in a folder, a set of program names, a set of specification names, and a set of descriptors describing value setting for parameters, but is not limited to these.

The aforementioned one structure or the aforementioned degenerated structure (213) can be, for example, a finite state automaton or a degenerated finite state automaton resulting from degeneration of the finite state automaton. A structure can be one structure generated by the first generator (202-1). The degenerated structure (213) can be the first degenerated structure generated by the second generator (202-2) and the second degenerated structure generated by the third generator (202-3).

The approximate pattern expression (214) can be a pattern having a pattern expression description containing zero or more symbols representing inference functions (or regular expression inference functions). The pattern expression is a method for expressing sets of strings by using one string or in one format. Examples of the method include the regular expression. Although a term of the "regular expression" is hereinafter used, it should be understood that the "pattern expression" is not limited to the "regular expression". Specifically, the approximate pattern expression uses grammar extended by adding <α> and r1//r2 to the grammar of the regular expression (α is a function for transformation from sets of strings to the regular expression, and r1 and r2 are regular expressions). The approximate pattern expression (214) can be the aforementioned first approximate pattern expression and the aforementioned second approximate pattern expression.

The regular expression inference function (215) represents an inference pattern for the transformation from the sets of input strings to the regular expression. The regular expression inference function (215) is acquired as the regular expression inference function in a stepwise inference process of the transformation from the sets of input strings to the regular expression. The regular expression inference function (215) can be the first inference function of the regular expression and the second inference function of the regular expression.

Figure 3A:
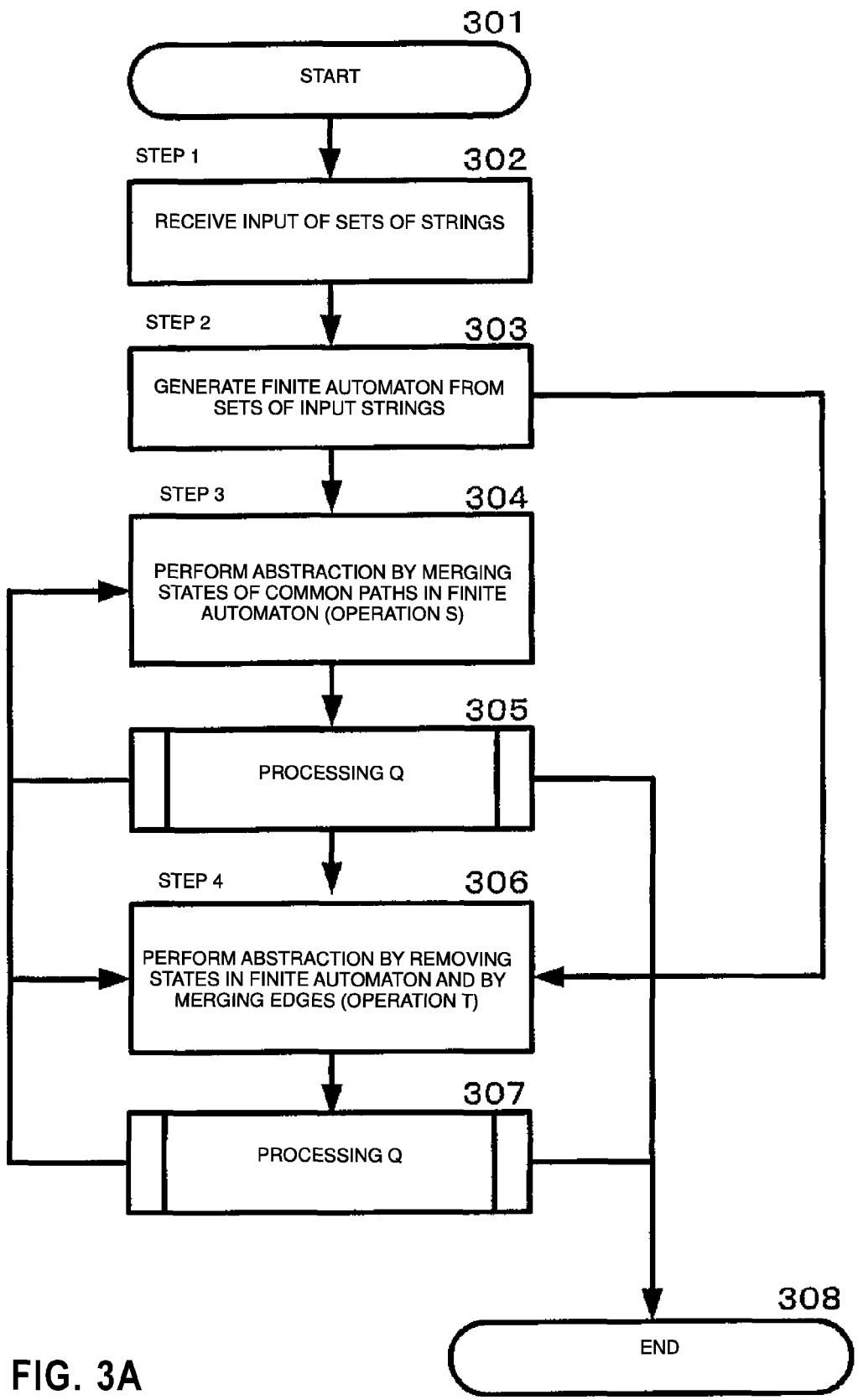
FIG. 3A shows an example of a flowchart for processing of transforming sets of input strings into an approximate pattern expression according to the embodiment of the present invention.
Figure 3B:
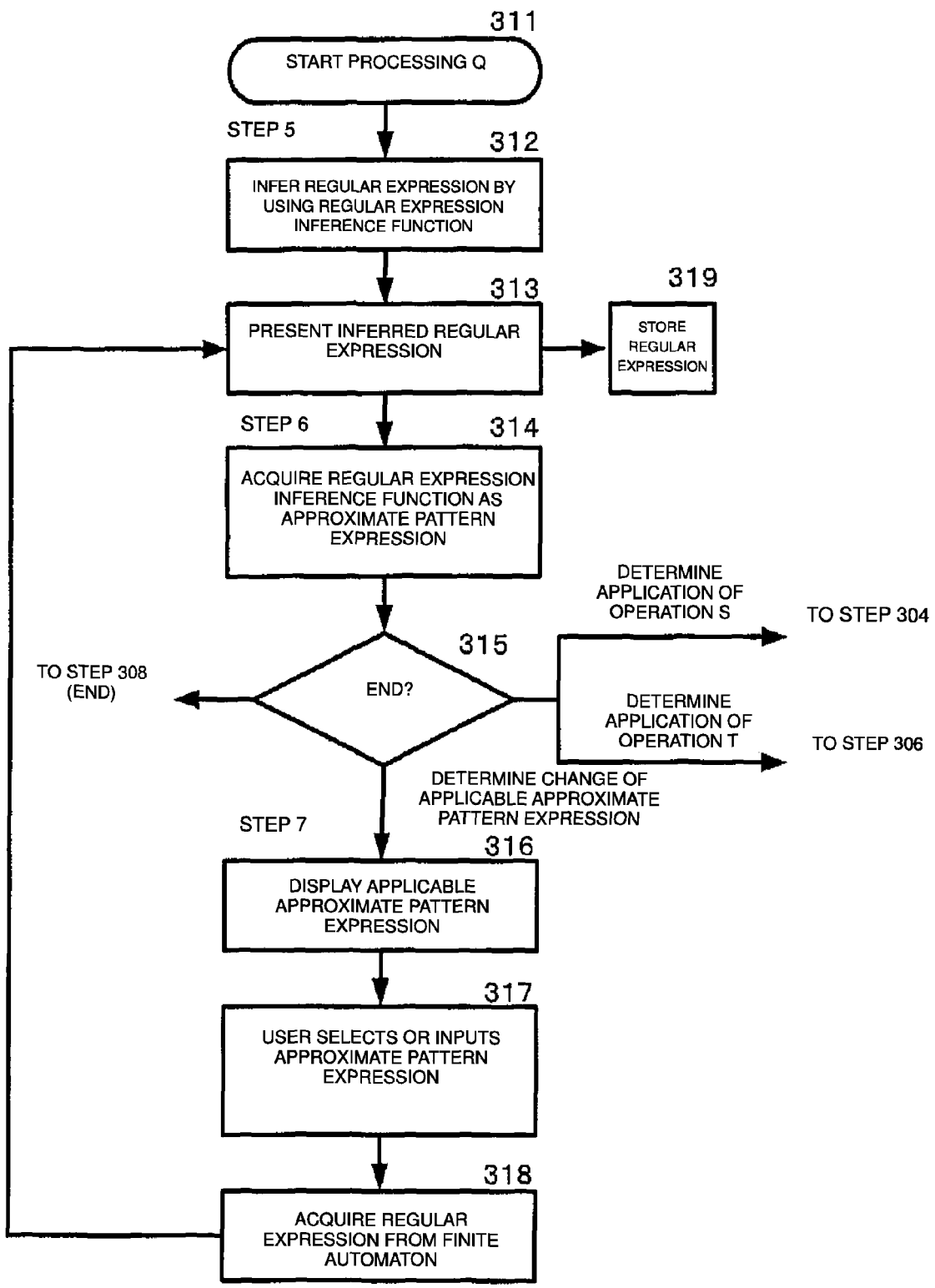
FIG. 3B shows an example of a flowchart for processing of transforming the sets of input strings into the approximate pattern expression according to the embodiment of the present invention.

FIGS. 3A and 3B show examples of flowcharts for processing of transforming sets of input strings to an approximate pattern expression according to the embodiment of the present invention.

In Step 301, the computer (201) starts the processing of transforming sets of input strings to an approximate pattern expression.

In Step 302, the first generator (202-1) reads a file including the sets of strings (212) from the storage unit (211), or receives sets of strings inputted by the user (221) through the keyboard (111), for example, and stores the sets of strings in the memory (103). Hereinafter, the processing in Step 302 is also referred to as "processing in Step 1".

In Step 303, the first generator (202-1) generates one structure, for example, a finite state automaton in the memory (103) from the sets of input strings read or received in Step 302 (see FIG. 4 to be described below). Hereinafter, the processing in Step 303 is also referred to as "processing in Step 2". Upon completion of the processing in Step 303, the computer (201) moves forward the processing to Step 304 or Step 306. Which step to move, Step 304 or Step 306 can be determined, for example, by the user interactively. The first generator (202-1) can store the generated one structure in the storage unit (211) (see the structure (213) in FIG. 2).

In Step 304, the third generator (202-3) generates a degenerated structure (a "second structure" in the scope of claims) (see FIGS. 5A to 5C to be described below) by merging states of common paths in any one of the structure acquired in Step 303, a structure degenerated in Step 306 to be described later, and a structure degenerated by processing the structure acquired in Step 303 with a degeneration technique (not shown) which is commonly used or known to those skilled in the art (hereinafter, such structures are also collectively referred to as a "structure A"). To put it in detail, in a case where paths within k transition steps (k is an integer of 1 or larger) after at least any two states in the structure A have the same sets of label strings, the third generator (202-3) merges the sets of transitions having the same sets of label strings and the sets of states included in the sets of transitions and thereby generates a degenerated structure (a second degenerated structure) having the merged states. Alternatively, in a case where sets of label strings of a path within m transition steps (m is an integer of 1 or larger) after one of at least any two states in the structure A include sets of label strings of a path within n transition steps (n is an integer of 1 or larger) after the other one of the two states, the third generator (202-3) merges sets of transitions having the included sets of label strings and sets of states included in the sets of transitions and thereby generates a degenerated structure (a second degenerated structure) having the merged states. Hereinafter, the processing in Step 304 is also referred to as "processing in Step 3" or an "operation S". The third generator (202-3) can start operation-S abstraction processing in response to designation, by the user, of the operation-S abstraction processing or in accordance with a predetermined automated process. The third generator (202-3) can store the degenerated structure thus generated in the memory (103) or the storage unit (211) (see the structure (213) in FIG. 2).

In response to termination of Step 304, the computer (201) moves forward the processing to processing Q (Step 305) shown in FIG. 3B. Hereinafter, the processing Q will be described in accordance with the flowchart in FIG. 3B.

In Step 311, the computer (201) starts the processing Q.

In Step 312, the expression generator (203) infers a regular expression by applying an approximate pattern expression to a set of sub-strings of each transition in the degenerated structure generated in the operation S. The approximate pattern expression can be a pattern having a regular expression description including zero or more symbols representing inference functions. Hereinafter, the processing in Step 312 is also referred to as "processing in Step 5". A method for inferring the regular expression by applying the approximate pattern expression to the set of sub-strings will be described in detail in explaining FIG. 7A below.

In Step 313, the display unit (206) can present a regular expression candidate as a result of inference in Step 312. The regular expression candidate can be presented, for example, by being displayed on the screen by the display unit (206) or by being provided to the operating system or application software running on the computer (201).

In Step 319, the expression generator (203) stores the approximate pattern expression, which is the result of the inference in Step 312, in the storage unit (211) so as to reuse the approximate pattern expression.

In Step 314, the expression generator (203) acquires a regular expression inference function as an approximate pattern expression from the degenerated structure generated in the operation S and either a default approximate pattern expression <prim> or an approximate pattern expression selected or inputted by the user. Hereinafter, the processing in Step 314 is also referred to as "processing in Step 6". However, when the default approximate pattern expression <prim> is not applied, the computer (201) can execute Step 317 to be described later before Step 314.

In Step 315, the computer (201) determines whether or not to terminate the processing Q. In response to termination of the processing Q, the computer (201) moves forward the processing to End Step 308. In response to the termination of the processing Q, and to further apply the operation S (Step 304) to the degenerated finite state automaton, the computer (201) moves back the processing to Step 304. Alternatively, in response to the termination of the processing Q, and to further apply an operation T (Step 306) to the degenerated finite state automaton, the computer (201) moves forward the processing to Step 306. Still alternatively, in response to an instruction (a change instruction) to change the regular expression inference function, the computer (201) moves forward the processing to Step 316.

In Step 316, the display unit (206) displays approximate pattern expressions applicable to an approximation target part in a variation pattern in the structure generated in Step 304. Hereinafter, the processing in Step 316 is also referred to as "processing in Step 7".

In Step 317, the computer (201) allows the user to select one of the applicable approximate pattern expressions displayed on the screen in Step 316 or to input an approximate pattern expression.

In Step 318, the expression generator (203) acquires a regular expression candidate by applying the approximate pattern expression selected or inputted in Step 317 to the approximation target part in the variation pattern. The approximate pattern expression can be a pattern having a regular expression description containing zero or more symbols representing inference functions. In response to termination of the processing in Step 318, the computer (201) moves back the processing to Step 313. The display unit (206) can present the regular expression candidate acquired in Step 318. The regular expression candidate can be presented, for example, by being displayed on the screen by the display unit (206) or by being provided to the operating system or application software running on the computer (201).

In Step 305, the computer (201) moves forward the processing to Step 304 (the operation S), Step 306 (the operation T), or End Step 308, in accordance with a result of the processing Q in Step 305.

In Step 306, the second generator (202-2) generates a degenerated structure (a "first structure" in the scope of claims) (see FIGS. 6A to 6C to be described below) by removing states in any one of the one structure acquired in Step 303, the degenerated structure acquired in Step 304, and the structure reduced by processing the structure acquired in Step 303 with the reduction technique (not shown) which is commonly used or known to those skilled in the art (hereinafter, such structures are also collectively referred to as a "structure B") and by merging edges associated with the states. To put it in detail, the second generator (202-2) generates a structure (a "first degenerated structure" in the scope of claims) reduced by removing at least one state in the structure B from the structure B and by merging at least two edges including an edge associated with the removed state in the structure B (1) based on the state removal score indicating an evaluated value of a change level of a sub-structure in the structure B, the sub-structure being associated with edges which are to be merged with a removal of at least one state in the structure B; (2) based on an inclusion relation between the sub-structure and either another sub-structure or the structure B; or (3) based on a combination of the state removal score described in (1) above and the inclusion relationship described in (2) above. Hereinafter, the processing in Step 306 is also referred to as "processing in Step 4" or the "operation T". The second generator (202-2) can start operation-T abstraction processing in response to designation, by the user, of the operation-T abstraction processing or in accordance with a predetermined automated process. The second generator (202-2) can store the degenerated structure thus generated in the memory (103) or the storage unit (211) (see the structure (213) in FIG. 2).

In response to termination of Step 306, the computer (201) moves forward the processing to processing Q (Step 307) shown in FIG. 3B.

In Step 311, the computer (201) starts the processing Q.

In Step 312, the expression generator (203) infers a regular expression by applying an approximate pattern expression to a set of sub-strings of each transition in the degenerated structure generated in the operation T.

Steps 313 and 319 are as described above.

In Step 314, the inference function generator (204) acquires a regular expression inference function as an approximate pattern expression from the reduced structure generated in the operation T and either the default approximate pattern expression <prim> or an approximate pattern expression selected or inputted by the user. A method for acquiring the regular expression inference function as the approximate pattern expression will be described in detail in explaining FIGS. 9A and 9B below.

Steps 315, 317, and 318 are as described above.

In Step 307, the computer (201) moves forward the processing to Step 304 (the operation S), Step 306 (the operation T), or End Step 308, in accordance with a result of the processing Q.

In Step 308, the computer (201) terminates the processing of transforming the sets of input strings into the approximate pattern expression.

Figure 4:
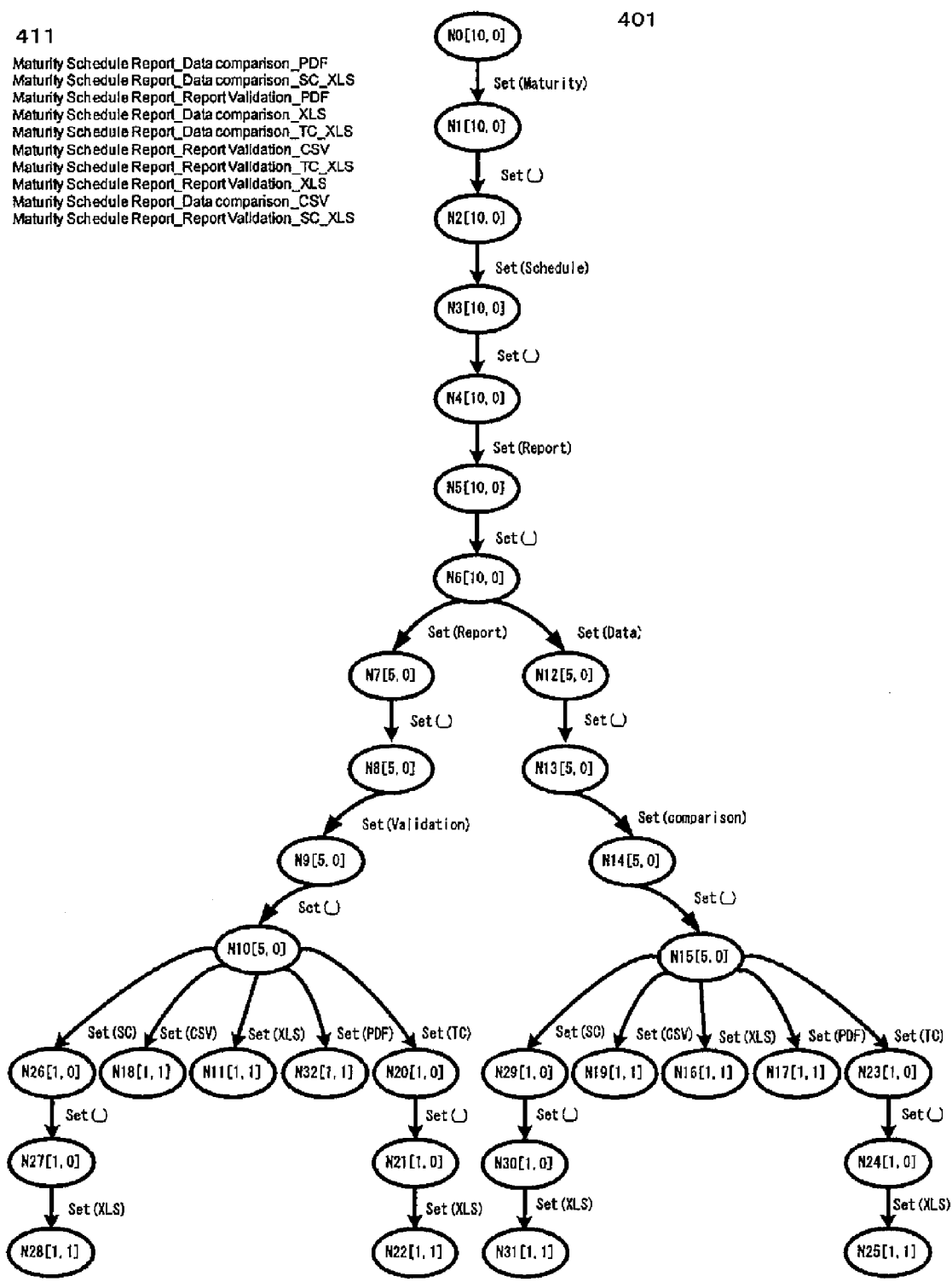
FIG. 4 shows an example of a finite state automaton accepting input strings and usable in the embodiment of the present invention.

FIG. 4 shows an example of a finite state automaton accepting input strings and usable in the embodiment of the present invention.

The first generator (202-1) receives as input sets of input strings (411) read or received in Step 302, generates one finite state automaton (401) as output from the inputted sets of input strings, and stores the finite state automaton (401) in the memory (103). In FIG. 4, file names in a folder are taken as an example of the sets of input strings (411). In the finite state automaton (401), each edge is labeled with an edge-owned string set in the corresponding set of input strings (411). The finite state automaton (401) can be a prefix tree acceptor. The finite state automaton can be generated by generating a prefix tree with any existing method.

Each state in the finite state automaton (401) has [number 1, number 2]. The number 1 is the number of sets of input strings (411) which reach the state. The number 2 is the number of sets of input strings (411) which are accepted by the state.

Each state in the finite state automaton (401) is numbered with a number prefixed with N. The number is useful to identify the state, but does not necessarily have to be provided.

Each edge of the finite state automaton (401) is labeled with a set of sub-strings (an edge-owned string set) in the corresponding set of input strings (411). That is, the edge has a set of strings.

Figure 5A:
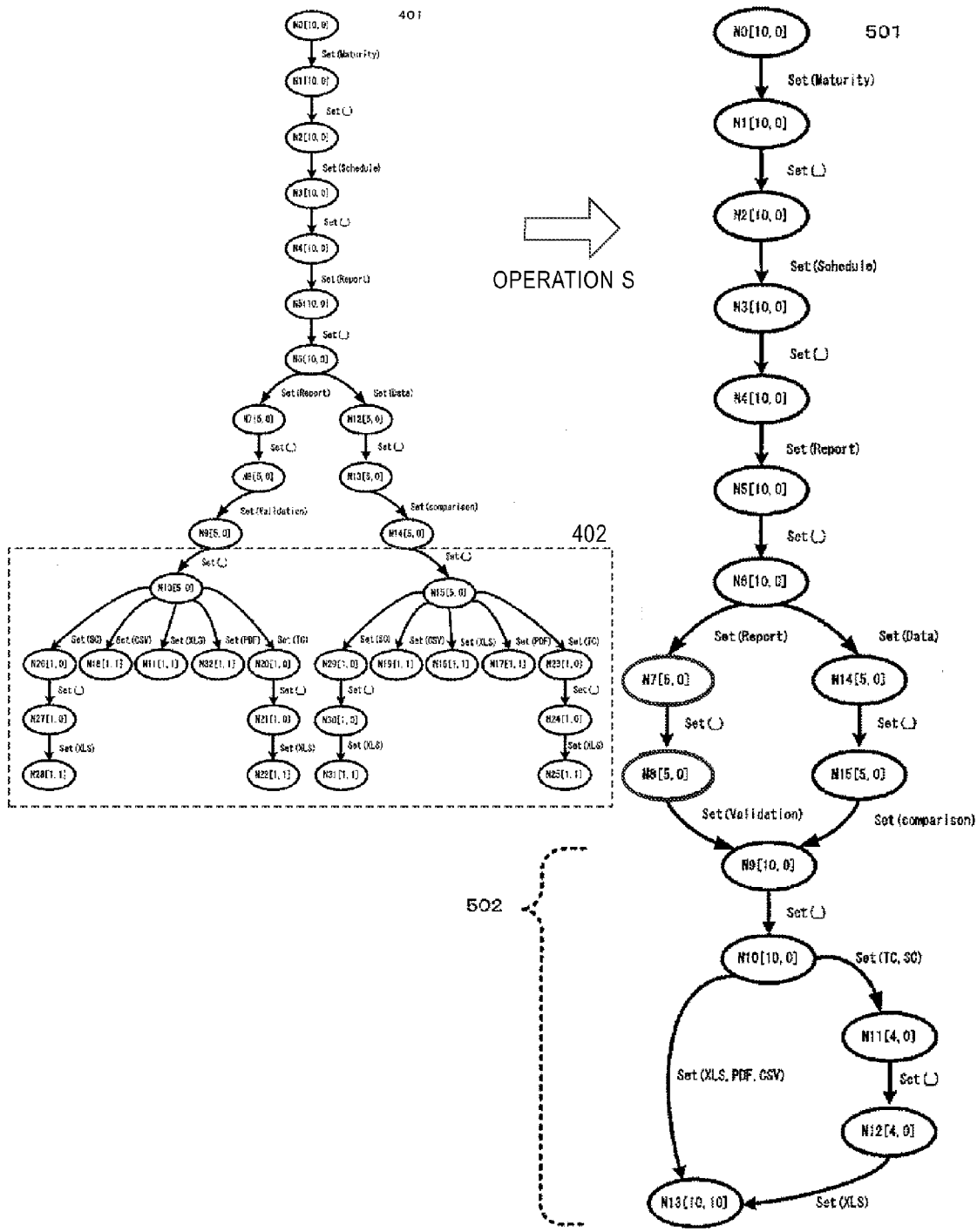
FIG. 5A shows an example in which sets of transitions having the same sets of label strings and sets of states included in the sets of transitions in the finite state automaton shown in FIG. 4 are merged to generate a reduced automaton having the merged transitions and states (an operation S). In the example, a k-bound bi-simulation is used.
Figure 5B:
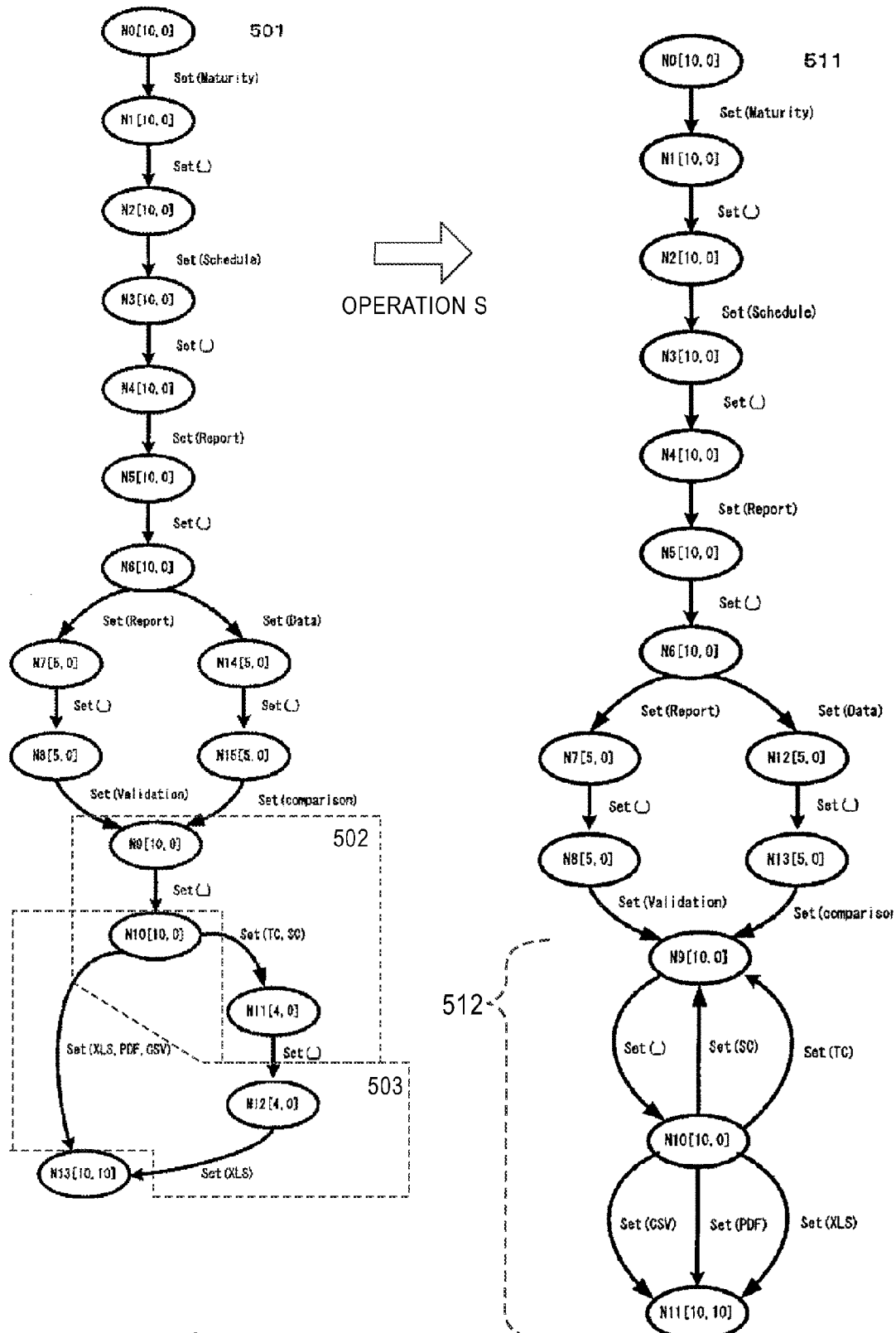
FIG. 5B shows an example in which sets of transitions having the same sets of label strings and sets of states included in the sets of transitions in the finite state automaton shown in FIG. 4 are merged to generate a reduced automaton having the merged transitions and states (the operation S). In the example, a k-bound mutual-simulation is used.
Figure 5C:
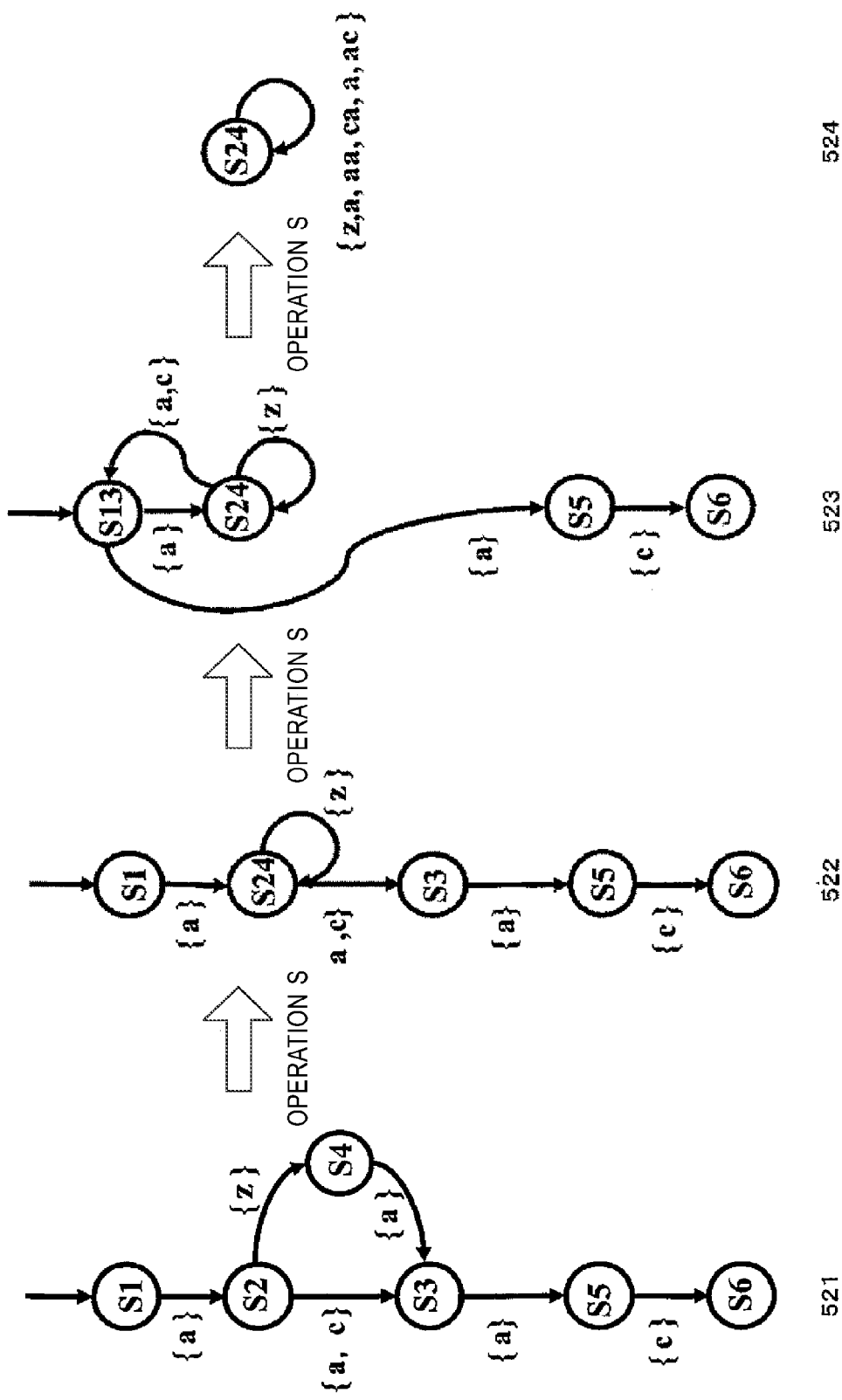
FIG. 5C shows an example in which when a state s simulates a state s' in the at least two states (s, s') in a finite state automaton, any one of the states (s, s') is merged with another state to generate a reduced finite state automaton having the merged state (the Operation S).

FIGS. 5A to 5C each show an example in which according to the embodiment of the present invention, sets of transitions having either the same sets of label strings or included sets of label strings and sets of states included in the sets of transitions in the finite state automaton are merged to generate a reduced automaton having the merged transitions and states (the operation S).

In the operation S, a k-bound (bi-)simulation is used for abstracting states step by step. The k-bound (bi-)simulation will be described below.

The operation S is a procedure of abstracting states in a finite state automaton by merging the states and is also an operation of merging the states in the finite state automaton based on a certain equivalence relation (=k described above).

It is found, as a result of experiments made in consideration of a feature of patterning of sets of input strings (i.e., text strings), that in the operation S, one of Relation 1 and Relation 2 which are particular relations shown below among states in an automaton can be used as a useful equivalence relation (=k described above).

Relation 1: a relation used in abstracting a finite state automaton: A bi-simulation ($\equiv$) is a relation in which when at least two states in a finite state automaton can transition in the same manner in the future, the states are regarded as the same. When the finite state automaton has the total number of states of U, the states have a relation equivalent to a U-bound bi-simulation. Relation 2: a relation created by improving a bi-simulation: A mutual-simulation ($<=>$) is a relation in which when one of at least two states in a finite state automaton can simulate a transition of the other in the future, the two states are regarded as the same. When the finite state automaton has the total number of states of U, the states have a relation equivalent to a U-bound bi-simulation. A k-bound bi-simulation ($\equiv k$) is a relation in which when one of at least two bisimilar states can reach the other within k transition steps, the states are regarded as the same. The k-bound bi-simulation can be expressed in the following expression:

$$s1 \equiv s2 \text{ iff } s1 \rightarrow s2 \text{ and } s2 \rightarrow s1.$$

A concrete example of the k-bound bi-simulation is as follows. A relation of s1 sim s2 is a relation between states to be defined as: "if s11 satisfying s1–L→s11 exists, s21 resulting in s2–L→s21 exists and satisfies s11 bsim s21". The relation of the bi-simulation can be defined as s1 sim s2 and s2 sim s1. For example, "14-bound" to be described below means that what is required is to satisfy the aforementioned relation within a path length of 14. A k-bound mutual-simulation ($<=>k$) is a relation in which when one of at least two mutual-bisimilar states can reach the other within k transition steps, the states are regarded as the same. The k-bound mutual-simulation intuitively represents a relation in which when one of the states can simulate the other, the states are regarded as the same. The k-bound mutual-simulation can be expressed by the following expression:

$$s1 \; n \; s2 \; \textit{iff} \; \forall L.\delta(s2,L)=s'2 \Rightarrow \exists s'1.(\delta(s1,L)=s'1 \text{ and } s'1 \; n \; s'2)$$

$$\text{or } \forall L.\delta(s1,L)=s'1 \Rightarrow \exists s'2.(\delta(s2,L)=s'2 \text{ and } s'1 \; n \; s'2).$$

However, the k-bound bi-simulation and the k-bound mutual-simulation utilize the following relations.

$$s1 \rightarrow s2 \; \textit{iff} \; \forall L.\delta(s2,L)=s'2 \Rightarrow \exists s'1.(\delta(s1,L)=s'1 \text{ and } s'1 \rightarrow s'2) \quad \text{Simulation } (\rightarrow)$$

$$s1 \rightarrow ks2 \; \textit{iff} \; \forall L.\delta(s2,L)=s'2 \Rightarrow \exists s'1.(\delta(s1,L)=s'1 \text{ and } s'1 \rightarrow (k-1)s'2) \text{ if } k>0 \quad \text{K-bound simulation } (\rightarrow k)$$

s1→Os2 hold for any s1 and s2.

s1→s2: A path from the state s1 to the state s2 exists.

δ(s, L)=s': A state s has an edge having a label L, and an end of the edge is a state s'.

The operation S is performed in the following steps. Steps 1 to 3 to be described below are repeated step by step while k is decremented by one from the total number of states. Although the steps of the operation S can be performed in any equivalence relation=between states, the embodiment of the present invention uses one of (≡k) and (⇔k) which are described above, as the equivalence relation (=) also described above.

Step 1: The third generator (202-3) obtains an equivalence class ST/=in an equivalence relation=k for a set of states ST in a finite state automaton sa.

Step 2: The third generator (202-3) generates a new finite state automaton (a finite state automaton degenerated in the operation S) having a state of [s]∈ST/=and a transition relation of δ([s],T)=δ(s,T).

Step 3: The third generator (202-3) returns the degenerated automaton sa. The finite state automaton is necessarily degenerated (abstracted) step by step in the steps. In other words, accepted token strings are increased in the finite state automaton.

FIG. 5A shows an example in which sets of transitions having the same sets of label strings and sets of states included in the sets of transitions in the finite state automaton (401) shown in FIG. 4 are merged to generate a degenerated automaton having the merged transitions and states (the operation S).

FIG. 5A shows an example of abstracting a finite state automaton by using the bound bi-simulation. An expression "a set of transitions having the same set of label strings and a set of states included in the set of transitions in a finite state automaton" is also used as a common path. As for label strings, for example, paths in two steps of S1–L1→S2–L2→S3 have label strings of L1 and L2.

The finite state automaton (401) has a maximum path length (that is, the number of edges) of 13. In consideration of the maximum path length of 13, the third generator (202-3) merges sets of states having the same behavior in a range of the path length of 13 by utilizing a 13-bound bi-simulation relation (i.e., a bound bi-simulation where k=13). In other words, when there are multiple states having the same behavior, the third generator (202-3) merges all the states having the same behavior into one state. In the finite state automaton (401), edges in five transition steps after the two states having labels of N8 and N13 have the same sets of strings. In this case, the third generator (202-3) merges the sets of transitions having the same sets of strings and the sets of states included in the sets of transitions, that is, the sets in a dotted square (402). As the result, a degenerated finite state automaton (501) is generated. As shown in a portion denoted by reference numeral (502) in the finite state automaton (501), the sets in the square (402) in the finite state automaton (401) are merged.

The merging example in FIG. 5A shows the merging of states in the k-bound bi-simulation relation as described above. The k-bound bi-simulation is approximately the same as an existing k-tail method (see Non-patent Literature 1).

By abstracting (reducing) the maximum path in the finite state automaton step by step, an abstracted (degenerated) finite state automaton can be acquired step by step. The abstracting is the merging of states or merging transitions. It can be said that a finite state automaton acquired in a higher level step has a higher level of abstraction.

FIG. 5B shows an example in which sets of transitions having the same sets of label strings and sets of states included in the sets of transitions in the finite state automaton (401) shown in FIG. 4 are merged to generate a degenerated automaton having the merged transitions and states (the operation S). FIG. 5B shows an example of abstracting the finite state automaton by using the bound mutual-simulation.

FIG. 5B shows an example in which sets of transitions having the same sets of label strings and sets of states included in the sets of transitions in the finite state automaton (501) shown in FIG. 5A are merged to generate a degenerated automaton having the merged transitions and states (the second operation S).

The finite state automaton (501) shown on the left side of FIG. 5B is the same as the finite state automaton (501) shown on the right side of FIG. 5A. The finite state automaton (501) has the maximum path length of 13. In consideration of the maximum path length of 13, the third generator (202-3) merges sets of states having the same behavior in the range of the path length of 13 by utilizing the 13-bound mutual-simulation relation (i.e., the bound mutual-simulation where k=13). In the finite state automaton (501), edges in one transition step after two states having the labels of N9 and N11 have the same sets of strings. In this case, the third generator (202-3) merges the sets of transitions having the same set of label strings and the sets of states included in the sets of transitions, that is, the sets in a dotted square (502). In the finite state automaton (501), sets of strings of edges in one transition step after two states having the labels of N10 and N12 in the finite are regarded as the same based on the bound mutual-simulation relation. Thus, the third generator (202-3) also merges the sets of transitions having the sets of label strings equated and the sets of states included in the sets of transitions, that is, the sets in a dotted square (503). As the result, a degenerated finite state automaton (511) is generated. As shown in a portion denoted by reference numeral (512) in the finite state automaton (511), the sets in the squares (502 and 503) in the finite state automaton (501) are merged.

By abstracting (reducing) the maximum path in the finite state automaton step by step, an abstracted (degenerated) finite state automaton can be acquired. It can be said that a finite state automaton acquired in a higher level step has a higher level of abstraction.

FIG. 5C shows an example in which when a state s simulates a state s' in the at least two states (s, s') in a finite state automaton, any one of the states (s, s') is merged with another state and a degenerated finite state automaton having the merged state is generated (the Operation S).

The third generator (202-3) determines whether or not sets of label strings of a path within m transition steps (m is an integer of 1 or larger) after one of at least any two states in a finite state automaton include sets of label strings of a path within n transition steps (n is an integer of 1 or larger) after the other one of the two states.

In a case of m=3 in the finite state automaton (521), a set of label strings (Set 1) on paths in a range of three transition steps from a state S2 and a set of label strings (Set 2) on a path in a range of three transition steps from a state S4 have the following relation:

Set 1={aac,cac,zaac} Set 2={aac}.

Since the state S2 simulates the state S4, the third generator (202-3) merges the state S2 and the state S4 into a state S24 to generate a degenerated finite state automaton (522).

Next, in a case of m=2 in the finite state automaton (522), a set of label strings (Set 3) on paths in a range of two transition steps from a state S1 and a set of label strings (Set 4) on a path in a range of two transition steps from a state S3 have the following relation.

Set 3={aa,ac,az} Set 4={ac}

Since the state S1 simulates the state S3, the third generator (202-3) merges the state S1 and the state S3 into a state S13 to generate a degenerated finite state automaton (523).

Next, in a case of m=1 in the finite state automaton (523), paths in a range of one transition step from the state S24 have a set of strings of {z,a,c}. In addition, states S13, S5, and S6 have sets of strings {a}, {c}, and { }, respectively. This means that all the strings of the state S13, the state S5, and the state S6 are included in the set of strings on the paths in the range of one transition step from the state S24. In other words, the state S24 simulates the other states. Accordingly, the third generator (202-3) removes the states other than the state S24 (in other words, merges all the states into the state S24) to generate a degenerated finite state automaton (524).

Figure 6A:
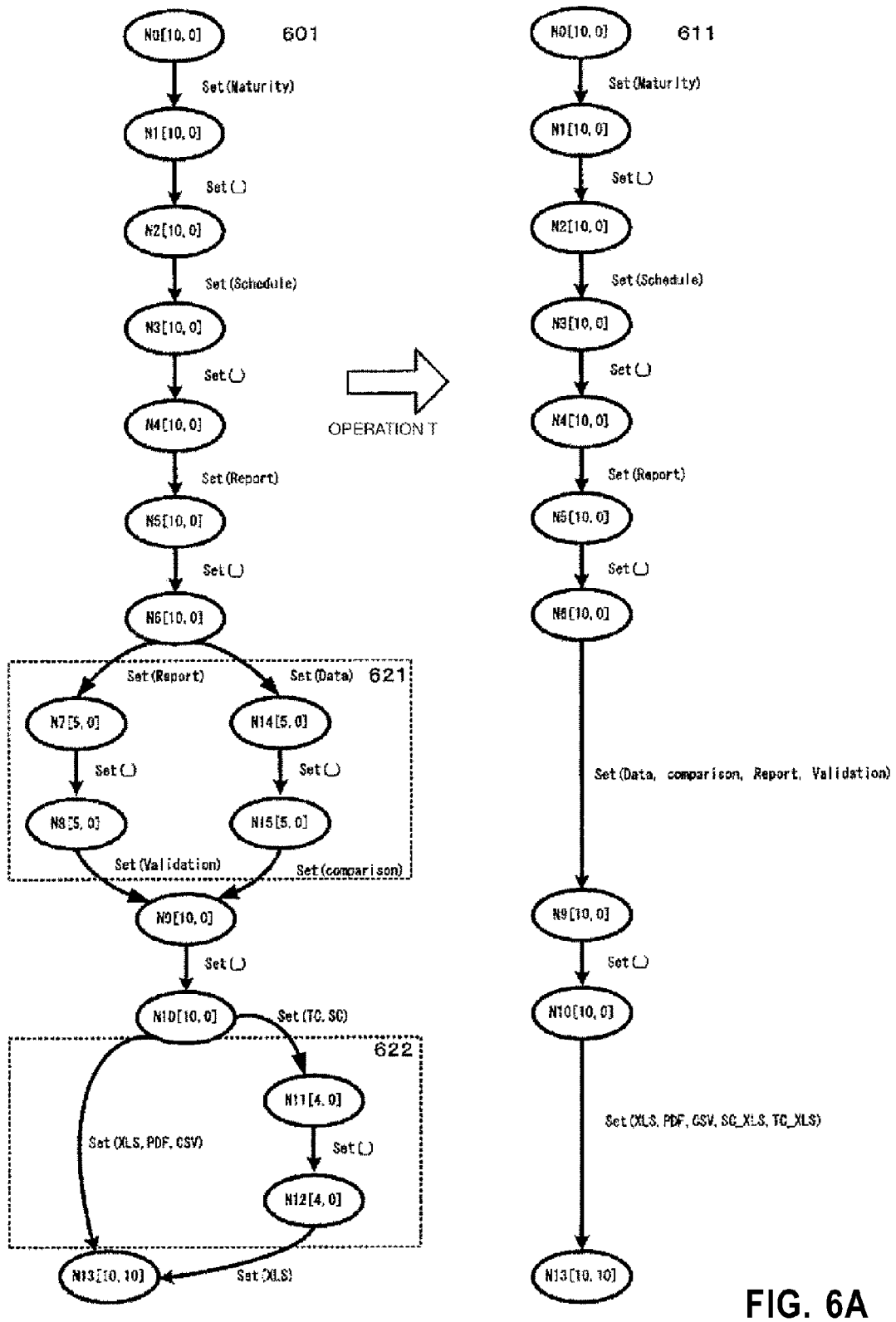
FIG. 6A shows an example in which according to the embodiment of the present invention, at least one state in the finite state automaton shown in FIG. 5A is removed and at least two edges including an edge associated with the removed state are merged to generate a degenerated finite state automaton (an operation T).
Figure 6B:
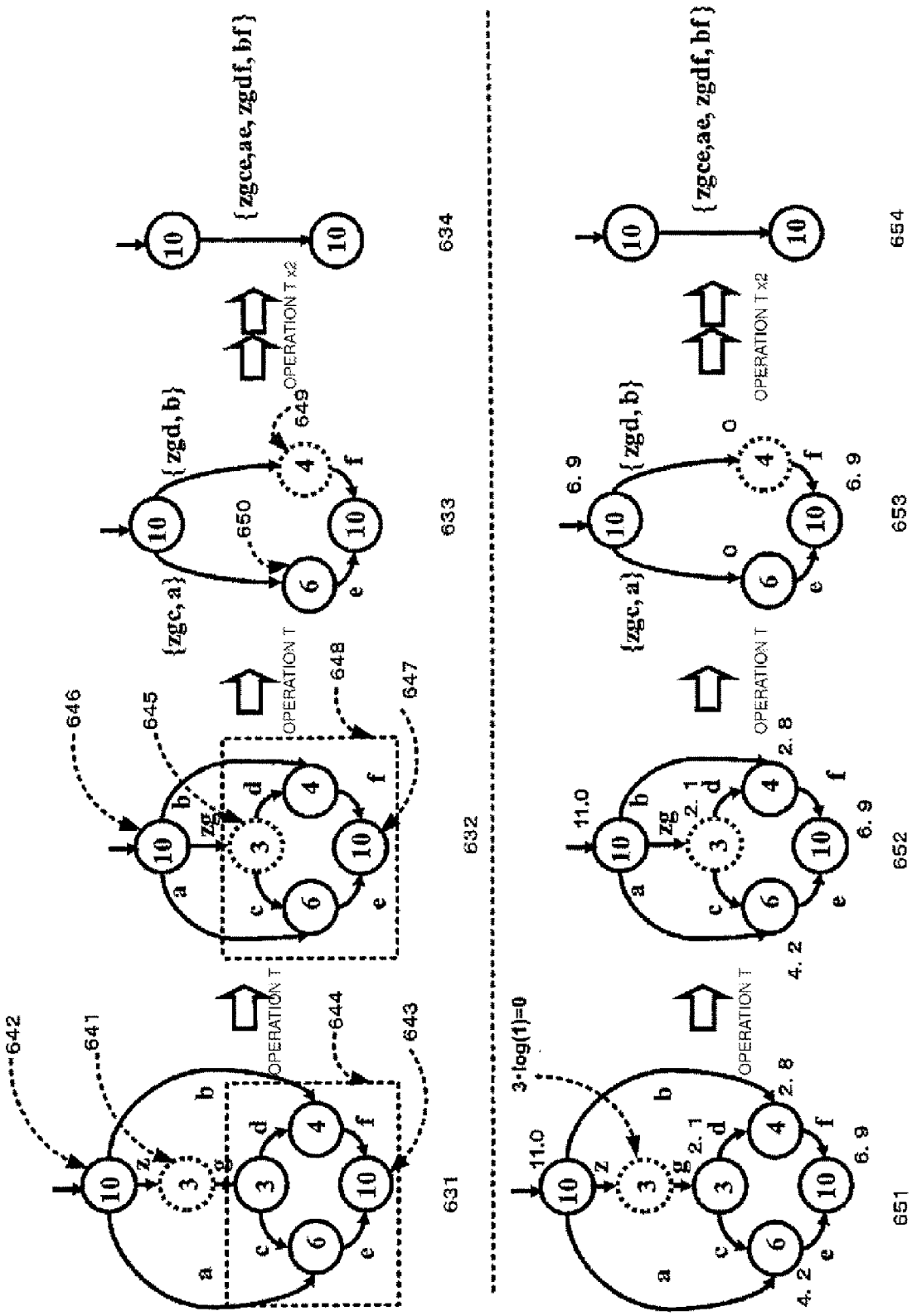
FIG. 6B shows an example in which according to the embodiment of the present invention, at least one state in the finite state automaton is removed and at least two edges including an edge associated with the removed state are merged to generate a degenerated finite state automaton (the operation T).
Figure 6C:
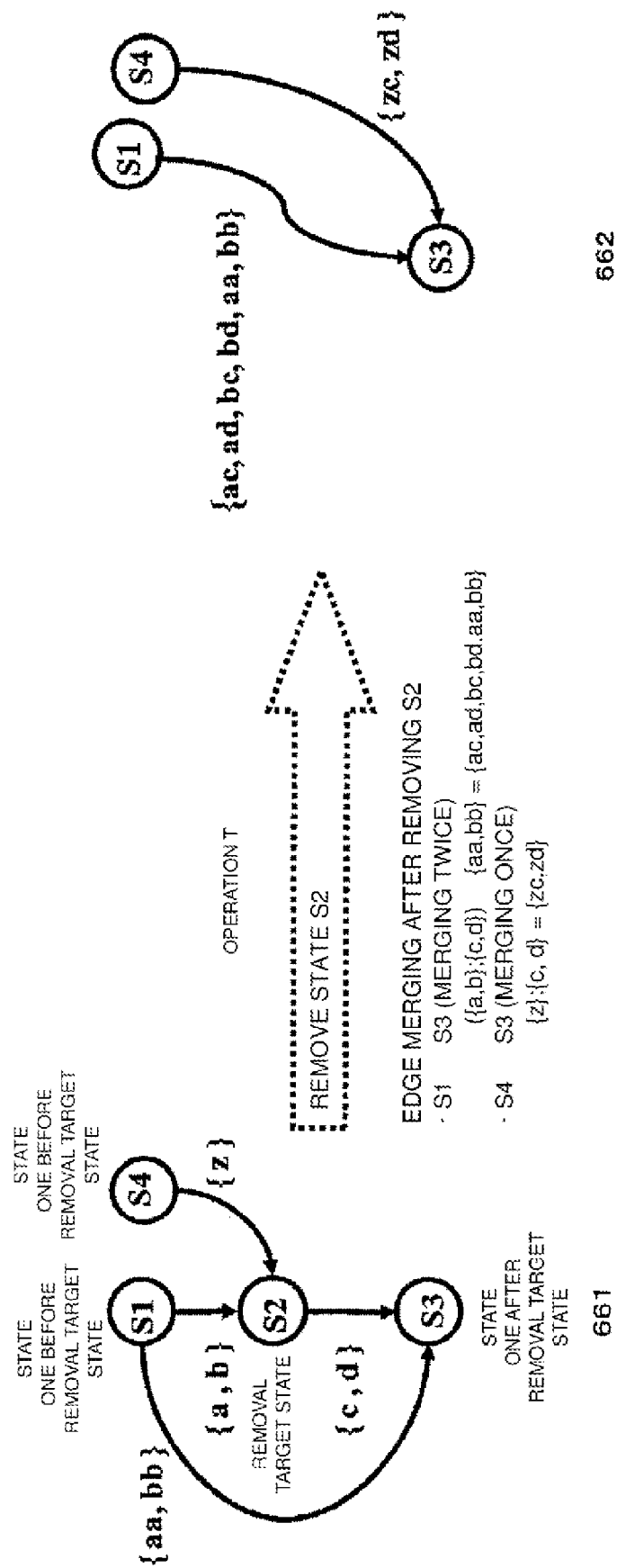
FIG. 6C is a diagram for explaining the number of times of merging edges according to the embodiment of the present invention.

FIGS. 6A to 6C each show an example in which according to the embodiment of the present invention, at least one state in a finite state automaton is removed and at least two edges including an edge associated with the removed state are merged to generate a reduced finite state automaton (an operation T).

To reduce the finite state automaton, the second generator (202-2) can remove at least one state in the finite state automaton (A) based on the state removal score; (B) based on the inclusion relation between a sub-structure and another sub-structure in the finite state automaton, or between the sub-structure in the finite state automaton and the finite state automaton; or (C) based on a combination of (A) and (B) above.

The following describe (A) to (C) above.

(A) A Method for Removing a State Based on the State Removal Score

The second generator (202-2) obtains a state removal score for each state of the finite state automaton as a score for determining whether to remove a state. The state removal score is a score for evaluating change levels of sub-structures in the automaton.

The state removal score for a certain state in the one structure can be obtained from: the number of times of merging edges with a removal of the certain state; and the number of input strings which reach states associated with the edges to be merged with the removal of the certain state.

The number of times of merging edges will be specifically described with reference to FIG. 6C.

Firstly, edges will be described. Each edge is labeled with a set of input strings L. There are two types of merging the edges, i.e., L1;L2 and L1∪L2.

When L1={s_1, ..., s_n}, L2={t_1, ..., t_m}
L1;L2={s_i, t_j|si∈L1, tj∈L2} and
L1∪L2={s_1, ..., s_n, t_1, ..., t_m} (a general union of sets).

Suppose a case where a state S2 is removed in a finite state automaton (661) shown in FIG. 6C. When the state S2 is removed, the number of times of merging edges is calculated in the following manner. The number of times of merging edges from the state S1 to the state S3 is 2: ({a,b};{c,d})∪{aa, bb}={ac,ad,bc,bd,aa,bb}. The number of times of merging edges from the state S4 to the state S3 is 1: {z};{c, d}={zc, zd}. Accordingly, when the finite state automaton (661) is reduced to a finite state automaton (662), the number of times of merging edges is 2+1, that is, 3 in total.

The state removal score for a certain state can be obtained in accordance with the following expression: the number of input edges of the certain state in the finite state automaton (IN)·the number of output edges of the certain state (OUT)+ the number of edges directly connecting states immediately before and after the certain state in transition steps (COM).

Specifically, a state removal score rM can be obtained in accordance with one of functions F shown below:

$$F(N, IN \cdot OUT + COM) = N(IN \cdot OUT + COM); \qquad (1)$$

$$F(N, IN \cdot OUT + COM) = N \cdot \log(IN \cdot OUT + COM); \text{ and} \qquad (2)$$

$$F(N, IN \cdot OUT) = N \cdot \log(IN \cdot OUT), \qquad (3)$$

where N is the number of sets of input strings which reach the certain state.

Which one of the aforementioned functions F is used to obtain the state removal score can be designated by the user in advance or dynamically during the operation T.

Alternatively, the state removal score rM can be metrics defined for a state having the smallest number of sets of input strings (N) which reach the state among states in a finite state automaton, in a case where a portion of the finite state automaton from any state from which edges branch to a state at which the edges meet (an abstraction unit) does not properly include any other abstraction unit in the finite state automaton.

Still alternatively, the state removal score rM can be metrics defined for a state having the smallest number of sets of input strings (N) which reach the state among states in a finite state automaton, in a case where a set of paths of a common context including a state s as one of end points in the finite state automaton does not properly include a set of paths of another common context in the finite state automaton. Here, the set of paths of the common context including the state s as one of the end points in the finite state automaton is a set of paths from the state s to a state s' or from the state s' to the state s when two or more paths from the state s meet at the state s' or when two or more paths from the state s' meet at the state s. When such a set of paths is CP[s], CP[s]=φ holds true for the certain state s in each of a transition to the state s and a transition from the state s. The following expression can express the removing of the state s performed when the set of paths of the common context in the finite state automaton including the state s as one of the end points does not properly include any other set of paths of a common context in the finite state automaton.

The second generator (202-2) can remove the state s when the state s is in the following condition: iff$_1$ ($\forall$s', $\forall$path'∈CP[s'],∃path∈CP[s] where iff means if and only If, and path is a sub-path of a path'.

The second generator (202-2) can identify a state having the smallest state removal score among states in the finite state automaton and remove the identified state from the finite state automaton. Then, the second generator (202-2) can merge at least two edges in the finite state automaton which include an edge associated with the removed state to generate a degenerated finite state automaton.

(B) A Method for Removing a State Based on an Inclusion Relationship Between a Sub-Structure and Another Sub-Structure in a Finite State Automaton or Based on an Inclusion Relationship Between the Sub-Structure in the Finite State Automaton and the Finite State Automaton.

To identify a state to be removed, the second generator (202-2) can determine an inclusion relationship between a sub-structure and another sub-structure in a finite state automaton or an inclusion relationship between the sub-structure in the finite state automaton and the finite state automaton. Based on one of the aforementioned inclusion relationships, the second generator (202-2) can remove at least one state in the finite state automaton from the finite state automaton. Then, the second generator (202-2) can merge at least two edges in the finite state automaton which include an edge associated with the removed state to generate a degenerated finite state automaton.

(C) A Method for Removing a State Based on a Combination of (A) and (B).

The second generator (202-2) can remove at least one state in a finite state automaton from the finite state automaton by combining the methods described in (A) and (B) above. The second generator (202-2) can merge at least two edges in the finite state automaton which include an edge associated with the removed state to generate a degenerated finite state automaton.

FIG. 6A shows an example in which according to the embodiment of the present invention, at least one state in the finite state automaton is removed to generate a degenerated finite state automaton (the operation T).

A finite state automaton (601) shown in FIG. 6A is the same as the finite state automaton (501) shown in FIG. 5A. That is, the finite state automaton (601) is formed by degenerating the finite state automaton (401) shown in FIG. 4 in the operation S.

The second generator (202-2) obtains a state removal score for each state in the finite state automaton (601).

States in a portion (621) in a dotted square in the finite state automaton (601), i.e., N7, N8, N14, and N15 have the same state removal score of 0 (the state removal score of each of the states N7, N8, N14, and N15 is calculated in accordance with $5 \cdot \log(1 \cdot 1) = 5 \log(1) = 0$). Thus, the second generator (202-2) removes the states N7, N8, N14, and N15 which have the lowest state removal score and merges edges associated with the removed states, i.e., edges respectively labeled with Set (Report), Set(Validation), Set(Data), and Set(comparison) into one edge. The one edge thus generated by being merged is labeled with Set(Data, comparison, Report, Validation).

In addition, states in a portion (622) in a dotted square in the finite state automaton (601), i.e., N11 and N12 have the same state removal score of 0 (the state removal score of each of the states N11 and N12 is calculated in accordance with $4 \cdot \log(1 \cdot 1) = 4 \log(1) = 0$). Thus, the second generator (202-2) removes the states N11 and N12 which have the lowest state removal score and merges edges associated with the removed states, i.e., edges respectively labeled with Set(XLS, PDF, CSV), Set(TC, SC), Set(_), and Set(XLS) into one edge. The one edge thus generated by being merged is labeled with Set(XLS,PDF,CSV,SC_XLS,TC_XLS).

As the result of the aforementioned processing, a degenerated finite state automaton (611) is generated.

FIG. 6B shows an example in which according to the embodiment of the present invention, at least one state in the finite state automaton is removed to generate a degenerated finite state automaton (the operation T).

A diagram on the upper side of FIG. 6B shows how a finite state automaton (631) is degenerated step by step in the repeated operation T. A diagram on the lower side of FIG. 6B shows a finite state automaton (651) having state removal scores of states in the finite state automaton (631) shown on the upper side. A number shown in each state is the number of sets of input strings which reach the state.

The state removal score of a state (641) shown in a dotted line in the finite state automaton (631) is 0, and the smallest in the finite state automaton (631). Further, the state (641) does not properly include any other abstraction unit in the finite state automaton (631). Thus, the second generator (202-2) removes the state (641) (the first operation T) and merges edges associated with the removed state (641), that is, the edges respectively having labels of z and g to generate a degenerated finite state automaton (632). The one edge thus generated by being merged is labeled with zg.

The state removal score of a state (645) shown in a dotted line in the finite state automaton (632) is 2.1 and the smallest in the finite state automaton (632). Further, the state (645) does not properly include any other abstraction unit in the finite state automaton (632). Thus, the second generator (202-2) removes the state (645) (the second operation T), and merges edges associated with the removed state (645), that is, merges the edges respectively having labels of c and zg, with an edge of a certain state (646) one transition step before the removed state (645), and also merges the edges respectively having a label of d and the label of zg, with an edge of the certain state 646 one transition step before the removed state, so that a degenerated finite state automaton (633) is generated. The edges thus generated by being merged are labeled with {zgc,a} and {zgd,b}, respectively.

In the finite state automaton (633), a state (649) shown in a dotted line has a state removal score of 0, and a state (650) also has a state removal score of 0. That is, the finite state automaton (633) has two states, i.e., the states (649 and 650) having a state removal score of 0. Hence, the second generator (202-2) removes a state having a smaller number of sets of input strings which reach the state, that is, the state (649) having the number of sets of input strings of 4 prior to the state (650) having the number of sets of input strings of 6 (the third operation T). That is, the second generator (202-2) uses the number of sets of input strings as weighting. The second generator (202-2) repeats the operation T (the fourth operation T) to remove the state (650). The second generator (202-2) removes the state (649) and the state (650) step by step in the third and fourth operations T and finally merges all the edges associated with the removed states (649) and (650), i.e., edges having labels of {zgd,b} and f and edges having labels of {zgc,a} and e, so that a degenerated finite state automaton (634) is generated. The edge thus generated by being merged is labeled with {zgce,ae,zgdf,bf}.

As described above, by repeating the operation T step by step, the finite state automaton (631) is abstracted (reduced) step by step.

Hereinafter, (B) described above for degenerating a finite state automaton will be described by using the example of the finite state automaton shown on the upper side of FIG. 6B.

A state (642) in the finite state automaton (631) has a portion (an abstraction unit) in which two edges branch from the state (642) and meet at a state (643). The abstraction unit includes another abstraction unit (644) in the finite state automaton (631). For this reason, the state (642) is not removed. In contrast, the state (641) in the finite state automaton (631) does not include any other abstraction unit in the finite state automaton (631). For this reason, the second generator (202-2) can remove the state (641).

Meanwhile, the state (646) in the finite state automaton (632) has a portion (an abstraction unit) in which two edges branch from the state (646) and meet at a state (647), and the abstraction unit includes another abstraction unit (648) in the finite state automaton (632). For this reason, the state (646) is not removed. In contrast, the state (645) in the finite state automaton (631) does not include any other abstraction unit in the finite state automaton (631). For this reason, the second generator (202-2) can remove the state (645).

Figure 7A:
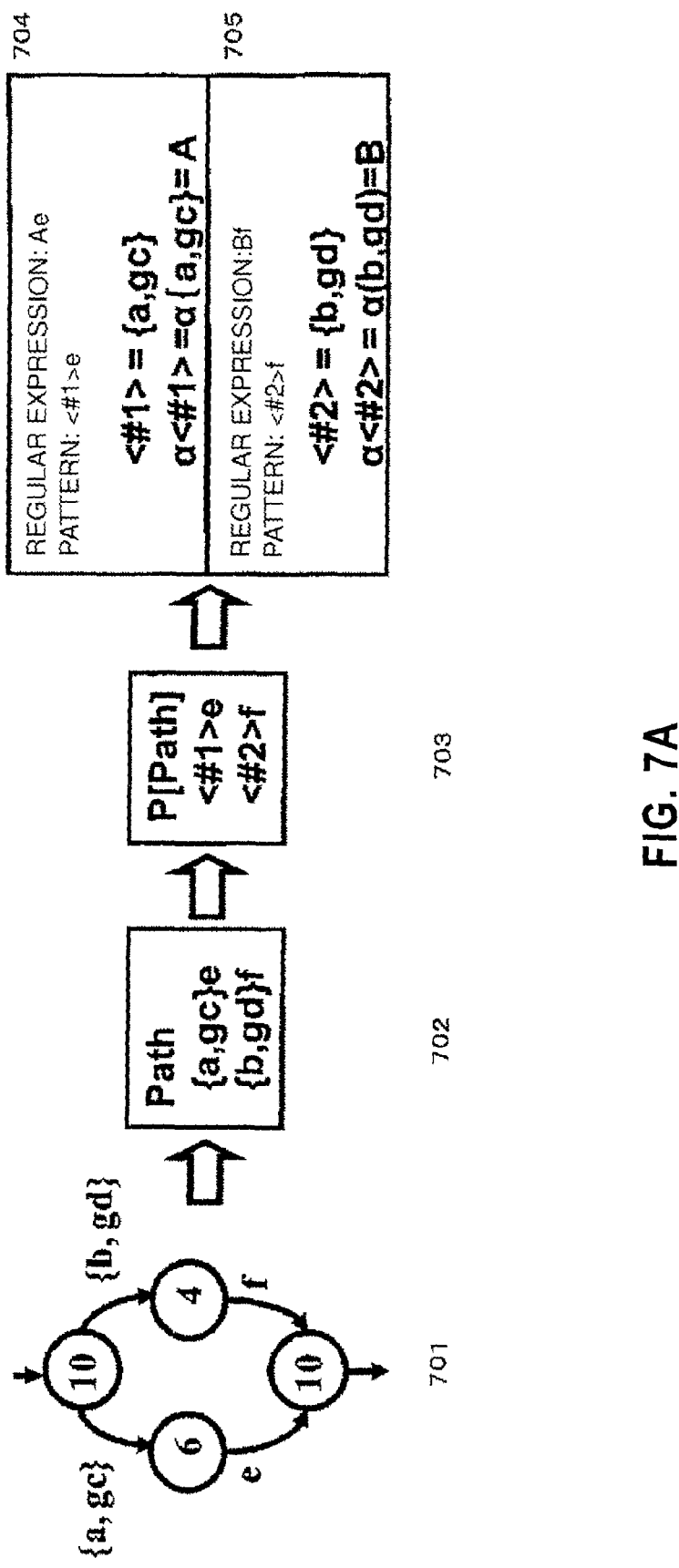
FIG. 7A shows an example of acquiring a regular expression pattern from a finite state automaton according to the embodiment of the present invention.

FIG. 7A shows an example of acquiring a regular expression pattern from a finite state automaton according to the embodiment of the present invention.

A regular expression pattern is used to discriminate a regular expression from another. When sets of strings are abstracted, there are n regular expression patterns. For example, in FIG. 10D to be described later, there are three regular expression patterns (see reference numeral 1004 in FIG. 10D).

The expression generator (203) applies an approximate pattern expression to a set of sub-strings of each transition (edge) in a finite state automaton in each degeneration step to acquire a regular expression. The approximate pattern expression expresses a regular expression inference function. As the default regular expression inference function, approximate pattern expressions <prim> and <choice>, expressing basic functions of the regular expression inference functions prim and choice, can be used.

First, a description is given of the regular expression inference functions. Each regular expression inference function expresses an inference pattern of a regular expression from sets of input strings. Once being acquired, the inference pattern is stored in a system and reusable. The regular expression inference function is acquired in the stepwise process of inference of the regular expression from sets of input strings. The basic functions for the regular expression inference function are prepared in advance. The user can freely define the regular expression inference function as a function (string set→regexp type) for transformation from a set of input strings (string set) to a regular expression (regexp) type.

The following functions are prepared in advance as the basic functions (also referred to as a primitive function) for the regular expression inference functions. The function choice is an inference function for combining all input strings with choice combinator without performing any approximation. The function prim performs an approximation while abstracting strings by using the character class lattice structure and identifying each string based on a prefix or a postfix. The function prim is an inference function for inferring an approximate pattern expression while finding in document parsing is used ad-hoc. Any function besides the above can be generated in advance by programming.

The function choice is expressed as (che ({s1, . . . , sn})= s1| . . . |sn), for example.

The function prim is used to transform an input string which is, for example, {AAB33b1C, ABC45BhC} to A[A-Z][A-Z][0-9][0-9][A-Z][.]C or A[A-Z][A-Z][0-9][0-9][A-Z]¥p{Alnum}C. Here, the first character "A" is a common prefix and the last character "C" is a common postfix.

Figure 7B:
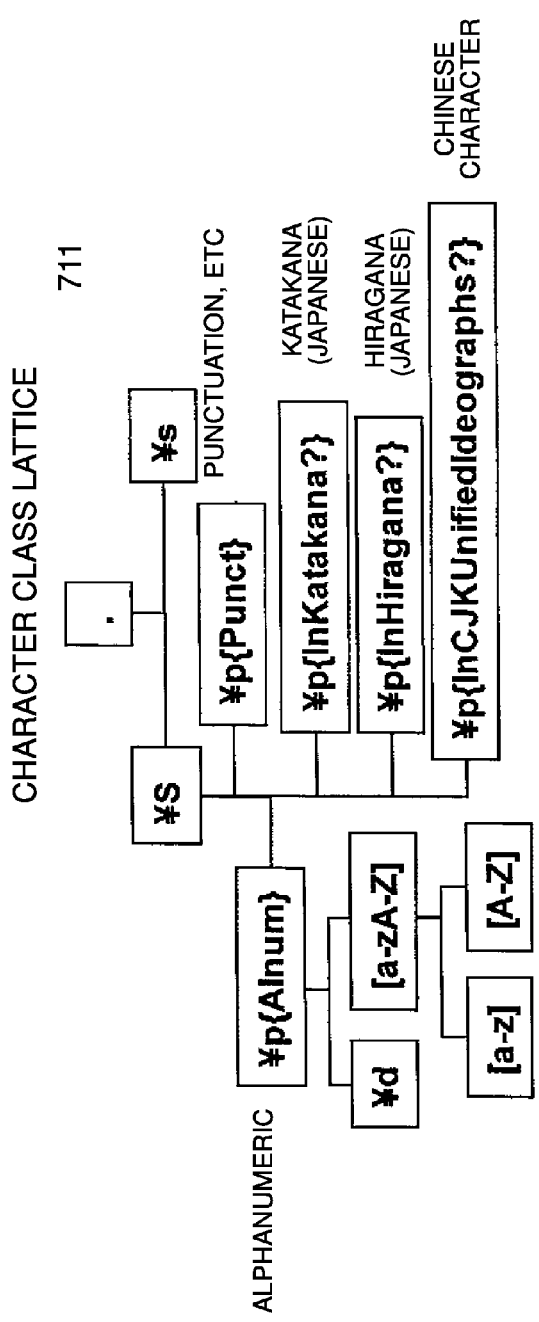
FIG. 7B shows a character class lattice structure used for abstracting input strings, according to the embodiment of the present invention.

The algorithm of prim will be described with reference to FIG. 7B. FIG. 7B shows a character class lattice structure (711) usable in the algorithm of prim. The algorithm of prim is characterized by repetitive abstraction performed while either a prefix or a postfix and a character class are identified.

The following shows the algorithm of prim.

Step 1: The computer (201) extracts a prefix and a postfix which are common to sets of input strings.

Step 2: The computer (201) abstracts each remaining string in one step in a character class lattice shown in FIG. 7B.

Step 3: When the remaining strings have the same length, the computer (201) takes a least upper bound in the character class lattice shown in FIG. 7B for each index.

Step 4: If all the characters of each remaining string are ., the computer (201) transforms the remaining string to .{n} or .+ or .* (according to the length). if not, the processing returns to Step 1.

In the character class lattice shown in FIG. 7B, represents any character; ¥S, a character other than a space; ¥s, a space; ¥d, a number; [a-zA-Z], a lower or upper case; [a-z], a lower case; and [A-Z], an upper case.

A regular expression pattern is inferred from the finite state automaton (701) in accordance with the following method.

In the processing of inferring a regular expression pattern, a finite state automaton having labels of sets of strings and approximate pattern expressions α, β, . . . are inputted. When an approximate pattern expression is not particularly designated, <prim> which is an approximate expression of prim which is a basic function of a regular expression inference function is inputted.

In the processing of inferring a regular expression pattern, a regular expression pattern is outputted. The regular expression pattern can be a regular expression candidate in a format of r1|r2| . . . |rk, for example.

The following shows steps of inferring a regular expression pattern.

Step 1: The expression generator (203) obtains all the paths from the start state to the end state in the inputted finite state automaton and sets the paths as Path. Since what is required for a path is to have one transition, a path can include a loop.

Step 2: The expression generator (203) obtains a pattern P[path] for each path∈Path in the following steps.

The expression generator (203) arranges all the labels on the paths as S1, . . . , Sk. The expression generator (203) sets a part which is Si.size>1 as a sub-pattern <#i>, and a part which is Sj.size=1 as sj s.t. sj∈Sj. Each of the labels on the paths is a set of sub-strings (a set of tokens).

The expression generator (203) obtains, as patterns, variations S of P[path]=u1, . . . , uk where ui=si or <#i> and each sub-pattern <#i>.

Step 3: In each path∈Path, a sub-pattern <#i> in P[path] is replaced with a regular expression α(Si), and a string matching the sub-pattern <#i> is set as a string included in the regular expression Si, i.e., si∈Si.

Hereinbelow, the processing of inferring a regular expression pattern from the finite state automaton (701) will be specifically described with reference to FIG. 7A. The expression generator (203) applies the regular expression inference function α to each of sets of sub-strings {a,gc} and {b,gd} of transitions in the finite state automaton (701) shown in FIG. 7A. Through the processing in Step 1 above, the expression generator (203) obtains all the paths from the start state to the end state in the finite state automaton (701) to obtain Path{a, gc}e and Path{b,gd}f (702). The expression generator (203) performs the processing in Step 2 above to obtain P[path]<#1> and P[path]<#2>f (703). The expression generator (203) performs the processing in Step 3 above to obtain a regular expression Ae(704) and a regular expression Bf(705).

Figure 8:
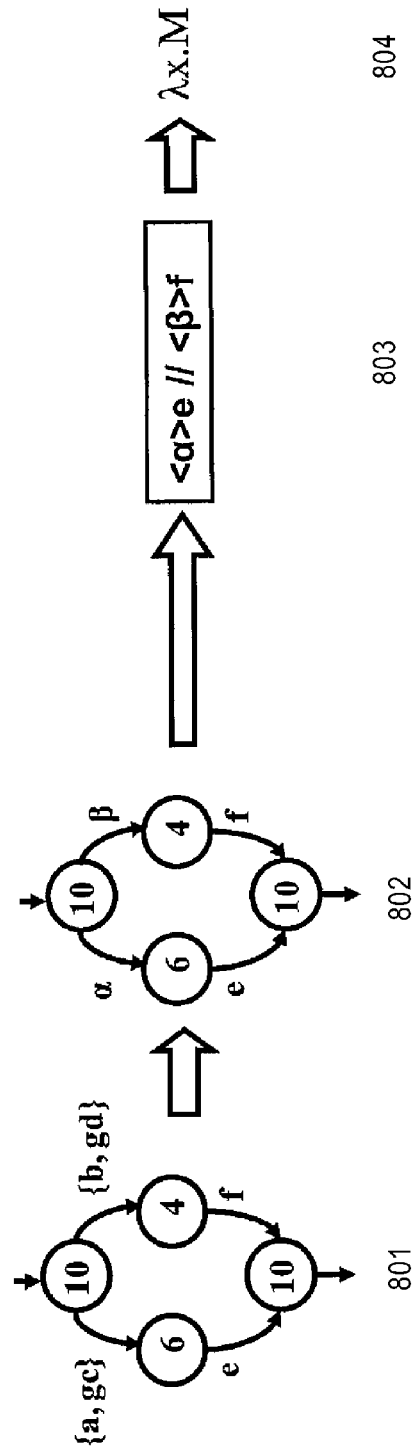
FIG. 8 shows an example in which according to the embodiment of the present invention, a regular expression is acquired from a finite state automaton, and a regular expression inference function is further acquired as an approximate pattern expression.

FIG. 8 shows an example in which according to the embodiment of the present invention, a regular expression is acquired from a finite state automaton, and a regular expression inference function is further acquired as an approximate pattern expression.

In processing of acquiring a regular expression inference function, a finite state automaton having labels of sets of strings and approximate pattern expressions α, β, . . . are inputted. When an approximate pattern expression is not particularly designated, <prim> is inputted which is an approximate expression of prim which is a basic function of a regular expression inference function. In the processing of acquiring a regular expression inference function, a function (string set type→regexp type) for transformation from a set of input strings (string set) to a regular expression (regexp) type or at least one of the inputted approximate pattern expressions is outputted.

The following shows steps of acquiring the regular expression inference function.

Step 1: The expression generator (203) replaces a part having multiple sub-strings of each transition label in the finite state automaton with the name of a selected or designated approximate pattern expression.

Step 2: The expression generator (203) acquires from the finite state automaton a regular expression including a symbol representing the approximate pattern expression. In Step 2, the expression generator (203) can use a method for Step 5 described in FIG. 3B. Alternatively, the expression generator (203) can acquire the regular expression from the finite state automaton by using an existing method.

Step 3: The expression generator (203) regards the regular expression including the aforementioned name of the approximate pattern expression as the expression of the regular expression inference function. The regular expression has options of −| and //. The outermost | can be changed to //.

Step 4: The inference function generator (204) acquires a regular expression inference function from the aforementioned expression by using an interpretation which is Iappro shown below.

A description is given below of processing of acquiring a regular expression inference function from an approximate pattern expression (803) acquired from a finite state automaton (801) shown in FIG. 8. The expression generator (203) performs the processing in Step 1 above to respectively apply approximate pattern expressions (which can be approximate pattern expressions corresponding to basic functions of a regular expression inference function or can be any approximate pattern expressions) <α> and <β> to the sets of sub-strings {a,gc} and {b,gd} of transitions in the finite state automaton (801) shown in FIG. 8. The expression generator (203) performs the processing in Step 2 above to replace the sets of sub-strings {a,gc} and {b,gd} with the approximate pattern expressions <α> and <β>, respectively (802). The inference function generator (204) performs the processing in Step 3 above to acquire an expression of the regular expression inference function (803). The inference function generator (204) performs the processing in Step 4 to acquire the regular expression inference function (804).

Hereinbelow, a description is given of an approximate pattern expression. The approximate pattern expression is defined as in the following expression A. In the expression A, a part corresponding to the approximate pattern expression <α> in matching using the expression A is expressed by an approximation function using α.

$$A::=str|<\alpha>|A1A2|A1|A2|A1//A2|A*$$

The symbol α represents the name of the regular expression inference function, and the symbol <α> represents an approximate pattern expression expressing a transformation pattern for transforming a set of strings to a regular expression by using the regular expression inference function α.

The approximate pattern expression is acquired by extending a regular expression by using <α> having the name of the regular expression inference function α and a constructor //.

The approximate pattern expression expresses an approximate pattern for approximating a set of strings to acquire a regular expression.

An approximate pattern acquired as a result of inference performed by using a stepwise regular expression inferer (the operation S or the operation T) can be acquired as the approximate pattern expression. For this reason, the computer (201) can reuse the acquired approximate pattern expression in processing of transforming another set of strings to an approximate pattern expression.

Hereinbelow, a description is given of transformation from an approximate pattern expression to a regular expression inference function. The aforementioned expression A can be taken as a function (string set→regexp type) for transformation from a set of input strings (string set) to a regular expression (regexp) type. Accordingly, the inference function generator (204) can generate a regular expression inference function by using the expression A. The algorithm is based on the following. A function is described by λ calculus. A function λx. M is a function where x denotes a dummy argument and M denotes a function body. For example, λx. (x+1) is a function of adding 1 to an argument. A function of calculating a least fixed-point of a function f is lfp(f). Input strings are represented by s1, . . . , sk or the like, and a set of input strings is represented by S, {s1, . . . , sk} or the like. Symbols ˆ and $ are used for designating the first and last characters, respectively (matching at the respective first and last characters only). A matcher algorithm m for matching between a regular expression and a string is prepared and fixed. The following is set for a regular expression r and input strings s: m(r,s)=if (r matches s) then true else false. In a case of m(r,s)=true, input strings s captured in a group i of a regular expression r are represented by r[s][i]. For the regular expression r and the input strings s, a function M(r,S) is defined by using the following expression in which true is returned if r matches every input string included in S (a set of strings), and false is returned if not: M(r, {s1, . . . , sk})=if (m(r, sj) for all j=1 . . . k) then true else false. The symbol α represents the name of a function of transforming a set of strings to a regular expression, and the symbol <<α>> represents a function expressed by a. It is assumed that the functions prim and choice for transforming a set of strings to a regular expression have been defined. When f(S)=1=choice(S) for the function f of transforming a set of input strings to a regular expression and the set of strings S, a description of Abst(f,S) is used. This means that the function f abstracts the set of strings S.

The following shows an example of the interpretation Iappro used to generate a regular expression inference function from an approximate pattern expression. Transformation <<•>>: A→(string set→regexp). If <<A>>=λx. M, A is a function of receiving the set of strings S to evaluate an expression M[S/x] in which x in a function M is replaced with S. Since A is recursively defined, <<•>> can be defined recursively. <<str>>=λx. if M(ˆstr$,x), then str else choice(S) <<<α>>>=<<α>>, <<A1 A2>>=λx. if Abst(<<A1>>, x) and Abst(<<A2>>, {<<A1>>(x)(.*) [s][1]|s∊x}), then <<A1>> (x)<<A2>>({<<A1>>(x)(.*) [s][1]|s∊x}) else choice(x).

A function <<A1 A2>> is a function of firstly inferring the set of strings S by using A1 and then inferring the right part thereof by using A2. <<A1|A2>>=λx. if (Abst(<<A1>>, v1) and ₁ Abst(<<A1>>, v2) for v1⊆x, v1⊂v2⊆x) and (Abst (<<A2>>, u1) and $_1$ Abst(<<A2>>, u2) for u1⊆x, u1⊂u2⊆x) then <<A1>>(v1)|<<A2>>(u1) else choice(x).

A function <<A1|A2>> is a function by which only subsets approximated by using A1 and A2, respectively, in the set of strings S are inferred by using A1 and A2, respectively, and the resultant values are returned while being combined by using |. <<A1//A2>>=λx. if (Abst(<<A1>>, v1) and $_1$ Abst(<<A1>>, v2) for v1⊆x, v1⊂v2⊆x) then <<A1>>(v1)|<<A2>>(x − v1) else <<A2>>(x).

A function <<A1//A2>> is a function by which, in the set of strings S, only a subset approximated by using A1 is inferred by using A1 and the other subsets are inferred by using A2, and the resultant values are returned while being combined by using |. <<A*>>=lfp (λx. if Abst(<<A1>>,x) and Abst(<<A2>>, {<<A*>>(x)(.*) [s][1]|s ∈x}) then <<A1>>(x)<<A*>> ({<<A1>>(x)(.*) [s][1]|s∈x}) else choice(x))

A function <<A*>> is a function by which a first part which can be approximated by using A is inferred by using A and the remaining part is repeatedly inferred by using A*.

It is possible to predefine useful basic functions for the regular expression inference function according to the situation and store expressions of the predefined functions for reuse. The regular expression inference function represents a reusable inference (approximate) pattern for acquiring a regular expression from a set of strings.

The following shows examples of defining expressions of useful regular expression inference functions according to the situation. A regular expression inference function which applies prim upon recognition of a file-extension: fext=<<<prim>¥. (?!.*¥..*)<prim>>>. Example: {design.xls, data.csv. text.myext}⇒ [a-z]+¥.[a-z]+).

A regular expression inference function which recognizes a file name having parentheses: parenExt=<<<prim>¥ (<prim>¥)<fext>>>. Example: {"kin-gaku-kaku-tei-sei-gyo (gen-pon).xls"

"gai-ka-cho-chiku-koh-za-sho-ri(kai-tei).xls"} ("kin-gaku-kaku-tei-sei-gyo" and "gen-pon" mean "amount determination control" and "original", respectively, in Japanese.)⇒ (¥kanj)+¥(¥kanji{2} ¥) ¥.xls (Here, ¥kanji and ¥kanji{3} are expressed in short forms, meaning ¥p{InCJKUnifiedIdeographs} and ¥kanji¥kanji¥kanji, respectively.)

A regular expression inference function which performs inference with file names separated into a file name having parentheses and a file name having no parentheses: parenFext=<<<parenExt>//<fext>>>. Example: {"kin-gaku-kaku-tei-sei-gyo.xls", "gai-ka-cho-chiku-koh-za-sho-ri(kai-tei).xls", "koh-za-kaku-tei-sei-gyo.xls, kin-gaku-kaku-tei-sei-gyo(kai-tei).xls}

("gai-ka-cho-chiku-koh-za-sho-ri", "koh-za-kaku-tei-sei-gyo", and "kai-tei" mean "foreign currency saving account processing", "account determination control", and "revision", respectively, in Japanese.)⇒ (¥kanj)+¥(¥kanji{2}¥)¥.xls|(¥kanji)+¥.xls.

The function parenFext expresses such inference that a file name having parentheses and a file name having no parentheses are extracted as separate patterns.

A regular expression inference function which performs inference in such a manner that a document file is separated: docext=<<<prim>¥. (?!.*¥..*) (xls//doc//txt//ppt)>>. Example: {"TestCase1.xls, TestCase2.xls, readme.txt, test.txt, Proj1.ppt, Proj2.ppt, memo.txt, A.dot, B.myext} TestCase¥d¥.xls|[a-z]+¥.txt|Proj¥d¥.ppt|[a-z]+¥.txt|[A-Z]¥.[a-z]+

Figure 9A:
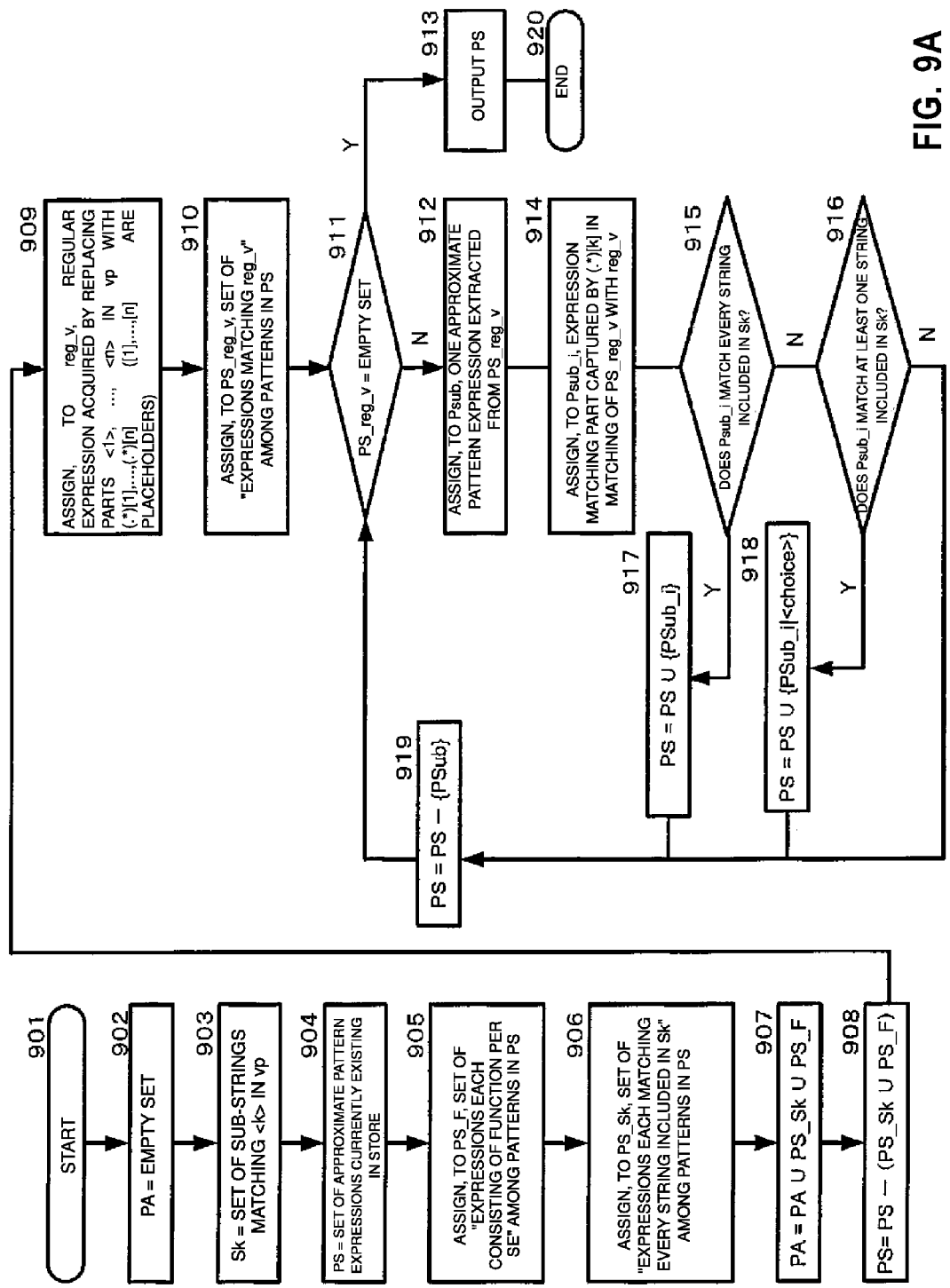
FIG. 9A shows an example of a flowchart for processing of determining an approximate pattern expression applicable to an approximation target part in a variation pattern, from an approximate pattern expression store according to the embodiment of the present invention.

FIG. 9A shows an example of a flowchart for processing of determining an approximate pattern expression applicable to a particular part (hereinafter, also referred to as an approximation target part) in a variation pattern, for example, a part <k>, from the approximate pattern expression store (214) according to the embodiment of the present invention.

A variation pattern (Var-Pattern) represents a pattern which expresses an abstraction target part as well as sub-strings matching the abstraction target part. A particular part (i.e., an approximation target part) in a variation pattern (see reference numeral 921 in FIG. 9B to be described below) is, for example, a part <k> in the variation pattern. The following shows the algorithm (hereinafter, also referred to as an "approximate pattern expression determination program") for determining an approximate pattern expression applicable to the part <k> in the variation pattern when the part <k> is focused. The part <k> is the abstraction target part. Note that approximate pattern expressions P1, . . . , Pm exist in the approximate pattern expression store (214) configured to store approximate pattern expressions.

Step 1: The expression generator (203) sets a basic function of a regular expression inference function as an approximate pattern expression candidate. If the approximate pattern expression store (214) stores an approximate pattern expression, the expression generator (203) sets the stored approximate pattern expression as an approximate pattern expression candidate as well. The approximate pattern expression candidate is, for example, the approximate pattern expression <prim> of the basic function prim of a regular expression inference function by default.

Step 2: The expression generator (203) assigns, to reg_v, a regular expression acquired by replacing parts <1> to <n> in the variation pattern with (.*).

Step 3: The expression generator (203) performs matching of the regular expression reg_v with each of the approximate pattern expressions P1, . . . , Pm currently existing in the approximate pattern expression store (214).

Step 4: In an approximate pattern expression Pi successfully matched with reg_v, the expression generator (203) assigns, to Psub_i, an approximate pattern of a part captured by the part (.*) of reg_v corresponding to the part <k>.

Step 5: The expression generator (203) determines an applicable approximate pattern expression based on the approximate pattern Psub_i of the aforementioned part based on the following conditions.

When Psub_i matches every sub-string in the set of sub-strings grouped by <k>, Psub_j is displayed as an approximate pattern expression candidate.

When Psub_i matches at least one sub-string in the set of sub-strings grouped by <k>, Psub_i|<choice> is displayed as an approximate pattern expression candidate.

When Psub_i does not match any sub-string in the set of sub-strings grouped by <k>, the approximate pattern expression is not applicable to the variation pattern when the part <k> is focused. Thus, no approximate pattern expression candidate is generated.

Hereinbelow, a description is given of a flowchart shown in FIG. 9A. In the processing of determining an applicable approximate pattern expression, PS={P1, . . . , Pm}, a variation pattern (Var-Pattern) vp, and the part <k> focused in vp are inputted. Here, PS is a set of approximate pattern expressions currently existing in the approximate pattern expression store (214). In the processing, PA is outputted which is an applicable approximate pattern expression.

In Step 901, the expression generator (203) starts the processing of determining an approximate pattern expression applicable to the part <k> in the variation pattern from a set of approximate pattern expressions in the approximate pattern expression store (214).

In Step 902, the expression generator (203) sets PA as an empty set.

In Step 903, the expression generator (203) acquires a set of sub-strings matching the part <k> in vp (Sk=vp). Here, Sk is a set of sub-strings matching the part <k> in the variation pattern. For example, in FIG. 9B to be described later, S_1 is a set of strings described as <1>=Set( . . . ).

In Step 904, the expression generator (203) assigns, to PS, a set of approximate pattern expressions currently existing in the approximate pattern expression store (214).

In Step 905, the expression generator (203) assigns, to PS_F, a set of "approximate pattern expressions each consisting of a basic function per se of a regular expression inference function", i.e., approximate pattern expressions such as <prim> and <choice>, among the approximate pattern expressions in PS.

In Step 906, the expression generator (203) assigns, to PS_Sk, a set of "approximate pattern expressions each matching every string included in Sk" among the approximate pattern expressions in PS.

In Step 907, the expression generator (203) obtains PA=PA∪PS_Sk∪PS_F.

In Step 908, the expression generator (203) obtains PS=PS−(PS_Sk∪PS_F).

In Step 909, the expression generator (203) acquires a regular expression by replacing parts <1>, . . . , <n> in vp with (.*)[1], . . . , (.*)[n] ([1], . . . , [n] are placeholders) (reg_v=vp).

In Step 910, the expression generator (203) assigns, to PS_reg_v, a set of "approximate pattern expressions matching reg_v" among the approximate pattern expressions in PS.

In Step 911, the expression generator (203) determines whether or not PS_reg_v is an empty set. In response to a determination that PS_reg_v is not an empty set, the expression generator (203) moves the processing to Step 912. On the other hand, in response to a determination that PS_reg_v is an empty set, the expression generator (203) moves the processing to Step 913.

In Step 912, the expression generator (203) extracts one of the approximate pattern expressions from PS_reg_v and assigns the approximate pattern expression to Psub.

In Step 913, the expression generator (203) outputs PS in response to the determination that PS_reg_v is an empty set. Then, the expression generator (203) moves the processing to Step 920 where the processing of determining an applicable approximate pattern expression is terminated.

In Step 914, the expression generator (203) assigns, to Psub_i, an approximate pattern expression matching a part captured by (.*)[k] in the matching of PS_reg_v with reg_v.

In Step 915, the expression generator (203) determines whether or not Psub_i matches every string included in Sk. In response to a determination that Psub_i does not match all of the strings included in Sk, the expression generator (203) moves the processing to Step 916. On the other hand, in response to a determination that Psub_i matches every string included in Sk, the expression generator (203) moves the processing to Step 917.

In Step 916, the expression generator (203) determines whether or not Psub_i matches at least one of the strings included in Sk. In response to a determination that Psub_i does not match any of the strings included in Sk, the expression generator (203) moves the processing to Step 919. On the other hand, in response to a determination that Psub_i matches at least one of the strings included in Sk, the expression generator (203) moves the processing to Step 918.

In Step 917, the expression generator (203) obtains PS=PS∪{PSub_i} and moves the processing to Step 919.

In Step 918, the expression generator (203) obtains PS=PS∪{PSub_i|<choice>} and moves the processing to Step 919.

In Step 919, the expression generator (203) assigns PS−{PSub} to PS and moves the processing back to Step 911. Here, PS can be acquired in Step 917 or 918, and PSub can be acquired in Step 916.

In Step 920, the expression generator (203) terminates the processing of determining an approximate pattern expression.

The following shows relationship between Steps 1 to 5 of the approximate pattern expression determination program and steps in the flowchart shown in FIG. 9A.

| Approximate pattern expression determination program | Flowchart shown in FIG. 9A |
| --- | --- |
| Step 1 | Steps 905 and 906 |
| Step 2 | Step 909 |
| Step 3 | Step 910 |
| Step 4 | Step 914 |
| Step 5 | Steps 915, 916, 917, and 918 |

FIG. 9B shows an example of determining an approximate pattern expression applicable to an approximation target part in a variation pattern by using the flowchart in FIG. 9A, according to the embodiment of the present invention. The following describes processing of determining an approximate pattern expression applicable to a part <1> (931) in the variation pattern denoted by reference numeral 921 when the part <1> (931) is focused.

Step 1: The expression generator (203) sets, as candidates, the approximate pattern expressions <prim> and <choice> in the approximate pattern expression store (214).

Step 2: The expression generator (203) acquires a regular expression Sc(.*)>.xls.

Step 3: The expression generator (203) determines that an approximate pattern expression Sc1<prim>>.xls is a matching approximate pattern expression, as shown in Step 910 in the flowchart shown in FIG. 9A.

Step 4: The expression generator (203) determines that a pattern of the captured part is 1<prim> as shown in Step 914 in the flowchart shown in FIG. 9A.

Step 5: In accordance with the flowchart shown in FIG. 9A, the expression generator (203) determines that 1<prim>|<choice> is applicable because 1<prim> does not match A0_LiDiSc<AA (Step 915), but matches 11_InSc<EF30 and 12_ItIpSc<EG43 (Step 916). The expression generator (203) thus sets these as approximate pattern expression candidates applicable to the part <1> in the variation pattern.

Step 6: As the result, the expression generator (203) sets the approximate pattern expressions <prim>, <choice>, and 1<prim>|<choice> as the approximate pattern expression candidates for the part <1> (931) in the variation pattern. The display unit (206) can display the candidates on the screen. Alternatively, the presentation unit (205) can deliver the candidates to an application (not shown).

FIG. 9C shows an example of determining an approximate pattern expression applicable to an approximation target part in a variation pattern by using the flowchart in FIG. 9A in a case of a file name comprising strings of Japanese characters (kanji characters), English characters and numbers, for example, according to the embodiment of the present invention. The following describes processing of determining an approximate pattern expression applicable to a part <1> (951)

in the variation pattern denoted by reference numeral 941 when the part <1> (951) is focused.

Step 1: The expression generator (203) sets, as candidates, the approximate pattern expressions <prim> and <choice> in the approximate pattern expression store (214).

Step 2: The expression generator (203) acquires a regular expression Sc(.*)>.xls.

Step 3: The expression generator (203) determines that an approximate pattern expression Sc1<prim>>.xls is a matching approximate pattern expression, as shown in Step 910 in the flowchart shown in FIG. 9A.

Step 4: The expression generator (203) determines that a pattern of the captured part is 1<prim> as shown in Step 914 in the flowchart shown in FIG. 9A.

Step 5: In accordance with the flowchart shown in FIG. 9A, the expression generator (203) determines that 1<prim>|<choice> is applicable because 1<prim> does not match A0_LiDiSc<AA (Step 915), but matches 11_ItIpSc<EF30 and 12_InSc<EG43 (Step 916). The expression generator (203) thus sets these as approximate pattern expression candidates applicable to the part <1> in the variation pattern.

Step 6: As the result, the expression generator (203) sets the approximate pattern expressions <prim>, <choice>, and 1<prim>|<choice> as the approximate pattern expression candidates for the part <1> (951) in the variation pattern. The display unit (206) can display the candidates on the screen. Alternatively, the presentation unit (205) can deliver the candidates to an application (not shown).

Figure 10A:
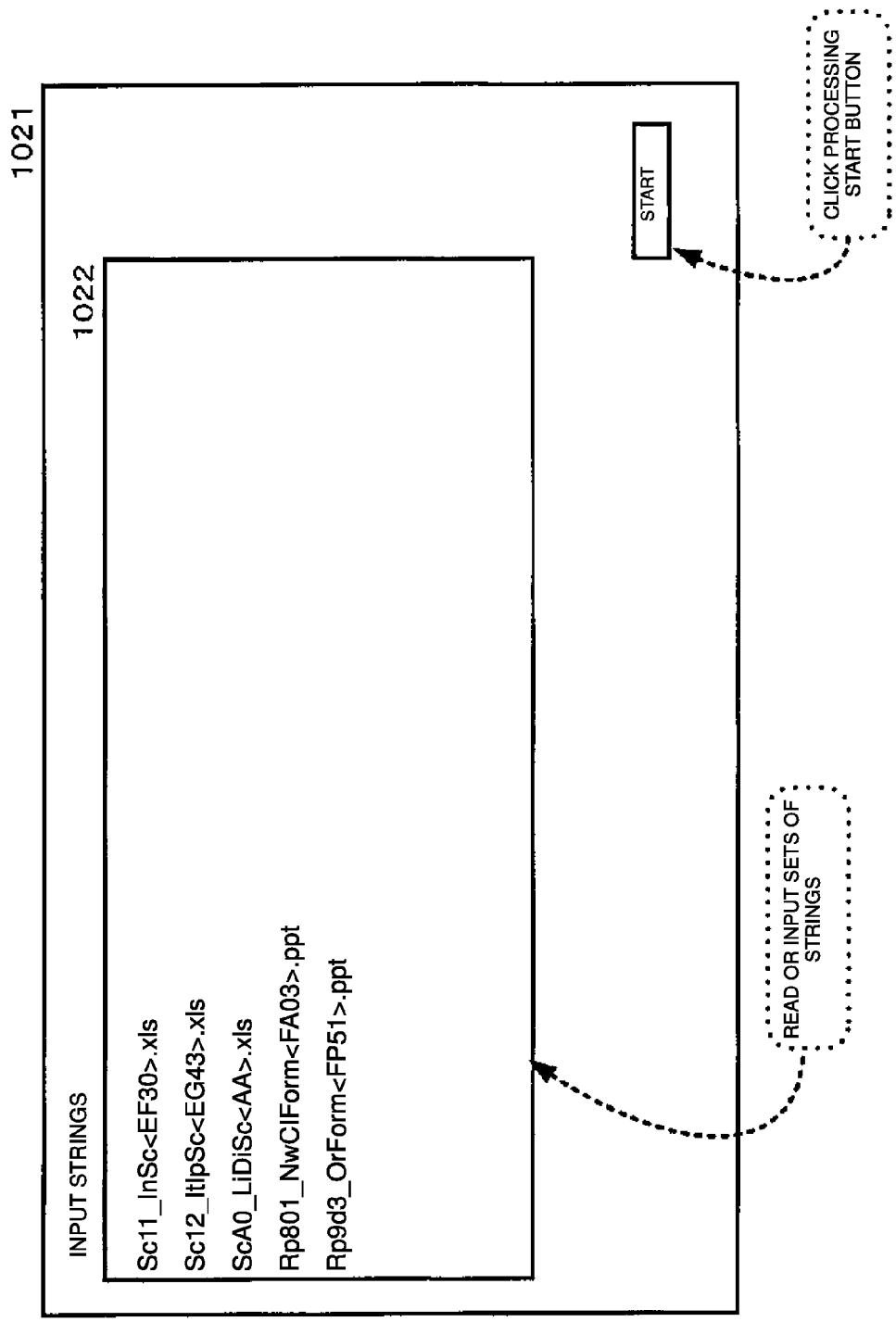
FIG. 10A shows Embodiment 1 which is an embodiment of the present invention, and exemplifies a screen for starting processing of generating the first finite state automaton from inputted sets of strings.

In an embodiment, processing of transforming sets of input strings (file names comprising strings of English characters and numbers) to an approximate pattern expression stepwise will be described by using screen examples shown in FIGS. 10A to 10U. FIGS. 11A to 11F respectively show finite state automatons generated in Embodiment 1. FIG. 10V exemplifies a screen showing that a regular expression inference function stored in the regular expression inference function store (215) in the processing in Embodiment 1 is reusable in processing of transforming sets of input strings to an approximate pattern expression step by step in a case other than Embodiment 1. The strings included in file names used in Embodiment 1 are defined as shown below as the abbreviations for the respective English words.

Figure 11A:
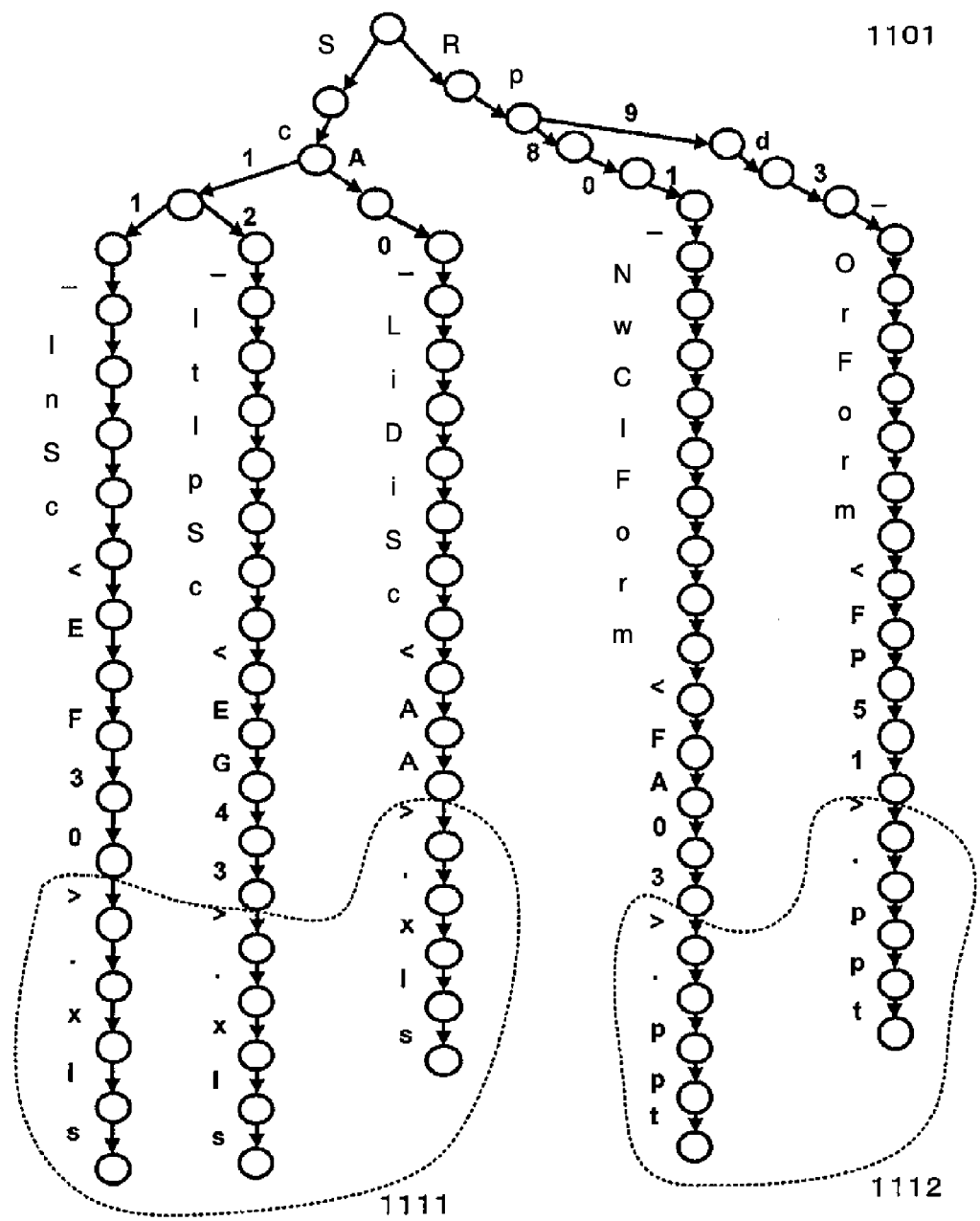
FIG. 11A shows Embodiment 1 which is the embodiment of the present invention, and shows the finite state automaton firstly generated by the abstraction processing in FIG. 10A.

String: English word
Sc: Screen
In: Initial
It: Item
Ip: Input
Li: List
Di: Display
Nw: New
Cl: Client
Or: Order
Rp: Report FIG. 10A exemplifies a screen for inputting sets of strings to start processing of generating the first finite state automaton from the inputted sets of strings. The user sends the computer (201), for example, an instruction (not shown) for reading a file having a name including any of the sets of strings (212) from the storage unit (211). In response to the instruction, the first generator (202-1) reads a file including any of the sets of strings (212) from the storage unit (211) (the processing in Step 1). Then, the display unit (206) displays the read sets of strings (212) in a predetermined sub-window (1022) on the screen. The example in FIG. 10A shows the number of sets of input strings of 5. The sets of strings are examples of file names in a folder. The user clicks a "Start" button in the window (1021) to instruct the computer (201) to start the processing of transforming sets of input strings to an approximate pattern expression. The first generator (202-1) generates one finite state automaton in the memory (103) from the sets of input strings read in the processing in Step 1 (the processing in Step 2). FIG. 11A shows a finite state automaton (1101) generated in the processing in Step 2.

Figure 10B:
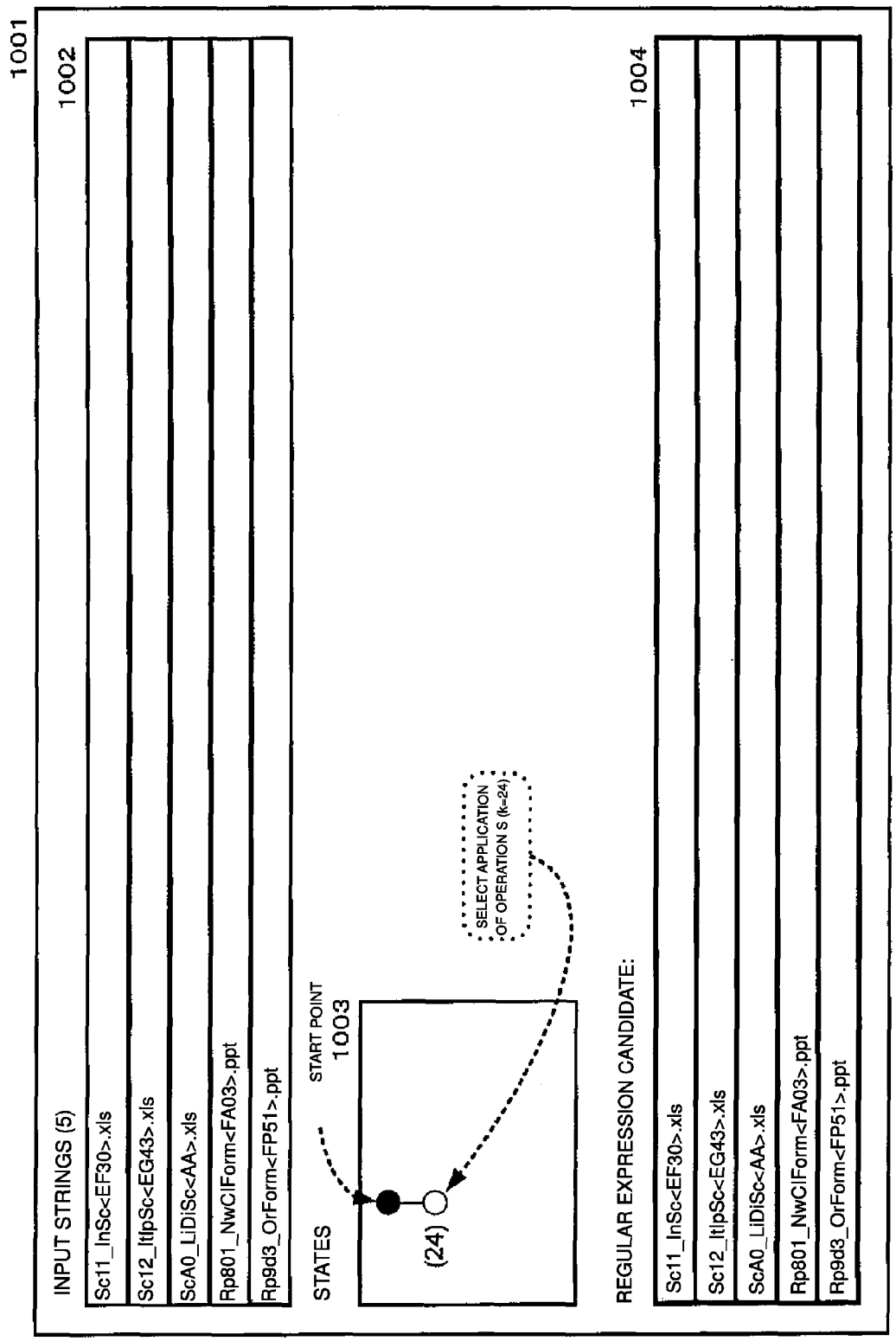
FIG. 10B shows Embodiment 1 which is the embodiment of the present invention, and exemplifies a screen showing an operation for starting abstraction processing of the operation S (hereinafter, referred to as operation-S abstraction processing) on the finite state automaton which is generated by the processing in FIG. 10A and is shown in FIG. 11A to be described below.

FIG. 10B exemplifies a screen showing an operation for starting the operation-S abstraction processing on the finite state automaton (1101) shown in FIG. 11A. The display unit (206) displays, in a window (1001), sets of input strings (1002) as well as 5 which is the number of the sets of input strings (1002), states (1003) in the processing of transforming sets of input strings to an approximate pattern expression, and regular expression candidates (1004). A circle annotated by a string of a "start point" in the states (1003) shows a start point in the abstraction processing in Embodiment 1. A black circle shows a location of abstraction processing completed immediately before the abstraction processing to be started. In FIG. 10B, the start point is shown by the black circle. This means that the first finite state automaton (1101) has been generated already, that is, the processing in Step 2 has been completed already. A circle below a black circle shows that the operation-S abstraction processing can be performed on a finite state automaton. It should be noted that a white circle located on the right side of the black circle (not shown in FIG. 10B) shows that the operation-T abstraction processing can be performed on a finite state automaton. FIG. 10B shows one circle below the black circle (the start point). The white circle below the black circle shows that the user can select the operation-S abstraction processing on the finite state automaton (1101).

When wishing to apply the operation-S abstraction processing to the finite state automaton (1101), the user clicks the white circle in the states (1003) with the mouse to instruct the computer (201) to start the operation-S abstraction processing on the finite state automaton (1101). The number (24) on the left side of the white circle represents the maximum number of input strings (the maximum path length) in the finite state automaton (1101) before the first operation-S abstraction processing is performed. After the first operation-S abstraction processing is completed, k is decreased from the first maximum number of input strings, and does not always represent the maximum number of input strings. The smaller k, the larger the degree of abstraction. Decreasing k step by step means abstraction performed step by step.

Figure 11B:
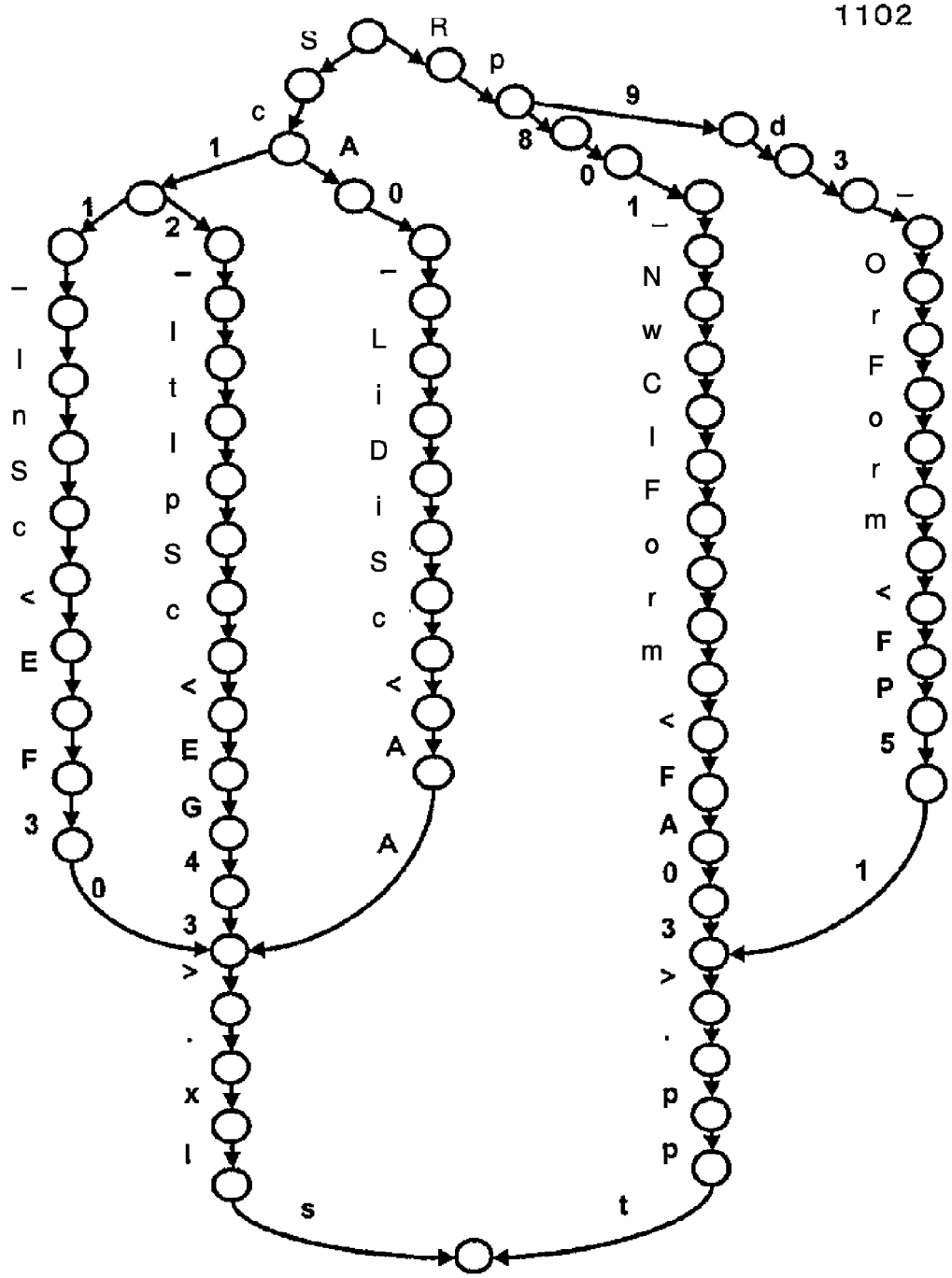
FIG. 11B shows Embodiment 1 which is the embodiment of the present invention, and shows the degenerated finite state automaton generated by the abstraction processing in FIG. 10B.

Upon receipt of the instruction for starting the operation-S abstraction processing, the third generator (202-3) performs the operation-S abstraction processing on the finite state automaton (1101). In the operation-S abstraction processing, the third generator (202-3) merges states (portions denoted by 1111 and 1112) having a common path in the finite state automaton (1101) shown in FIG. 11A to generate a degenerated finite state automaton in the memory (103) (the processing in Step 3). The common path denoted by reference numeral 1111 has a set of common label strings which are >.xls. The common path denoted by reference numeral 1112 has a set of common label strings which are >.ppt. FIG. 11B shows a finite state automaton (1102) generated in the processing in Step 3. In the finite state automaton (1102), sets of transitions owned by the set of label strings of the common path are merged, and sets of states included in the sets of transitions are merged (">.xls" in the portion of reference numeral 1111 and ">.ppt" in the portion of reference numeral 1112).

In FIG. 10B, the regular expression candidates are the same as the input strings themselves. This is because the finite state automaton (1101) shown in FIG. 11A has not been abstracted yet.

Figure 10C:
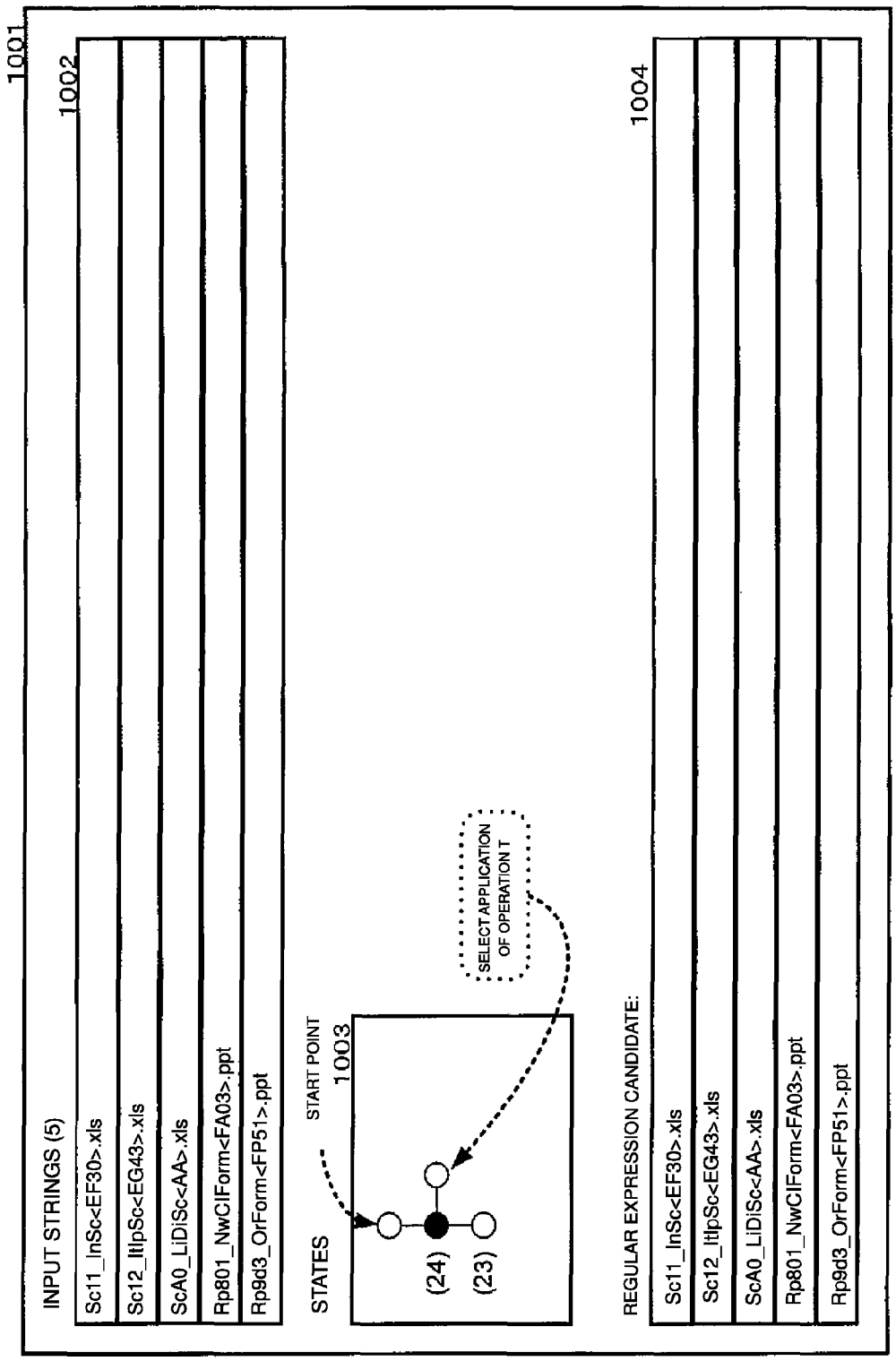
FIG. 10C shows Embodiment 1 which is the embodiment of the present invention, and exemplifies a screen showing an operation for starting abstraction processing of the (first) operation T (hereinafter, referred to as operation-T abstraction processing) on the finite state automaton which is generated by the processing in FIG. 10N and is shown in FIG. 11B to be described below.

FIG. 10C exemplifies a screen showing an operation for starting the (first) operation-T abstraction processing on the finite state automaton (1102) shown in FIG. 11B. The black circle in the states (1003) shows the location of the operation-S abstraction processing (Step 3) which is the abstraction processing completed immediately before the abstraction processing to be started. In FIG. 10C, a black circle is present directly below the start point. This shows that a degenerated finite state automaton has been generated by applying the operation S to the first finite state automaton, that is, the processing in Step 3 has been completed. The white circle below the black circle shows that the operation-S abstraction processing can be performed on the finite state automaton, while the white circle on the right side of the black circle shows that the operation-T abstraction processing can be performed on the finite state automaton.

When wishing to apply the operation-T abstraction processing to the finite state automaton (1102), the user clicks the white circle on the right side of the black circle in the states (1003) to instruct the computer (201) to start the operation-T abstraction processing on the finite state automaton (1102).

Figure 11C:
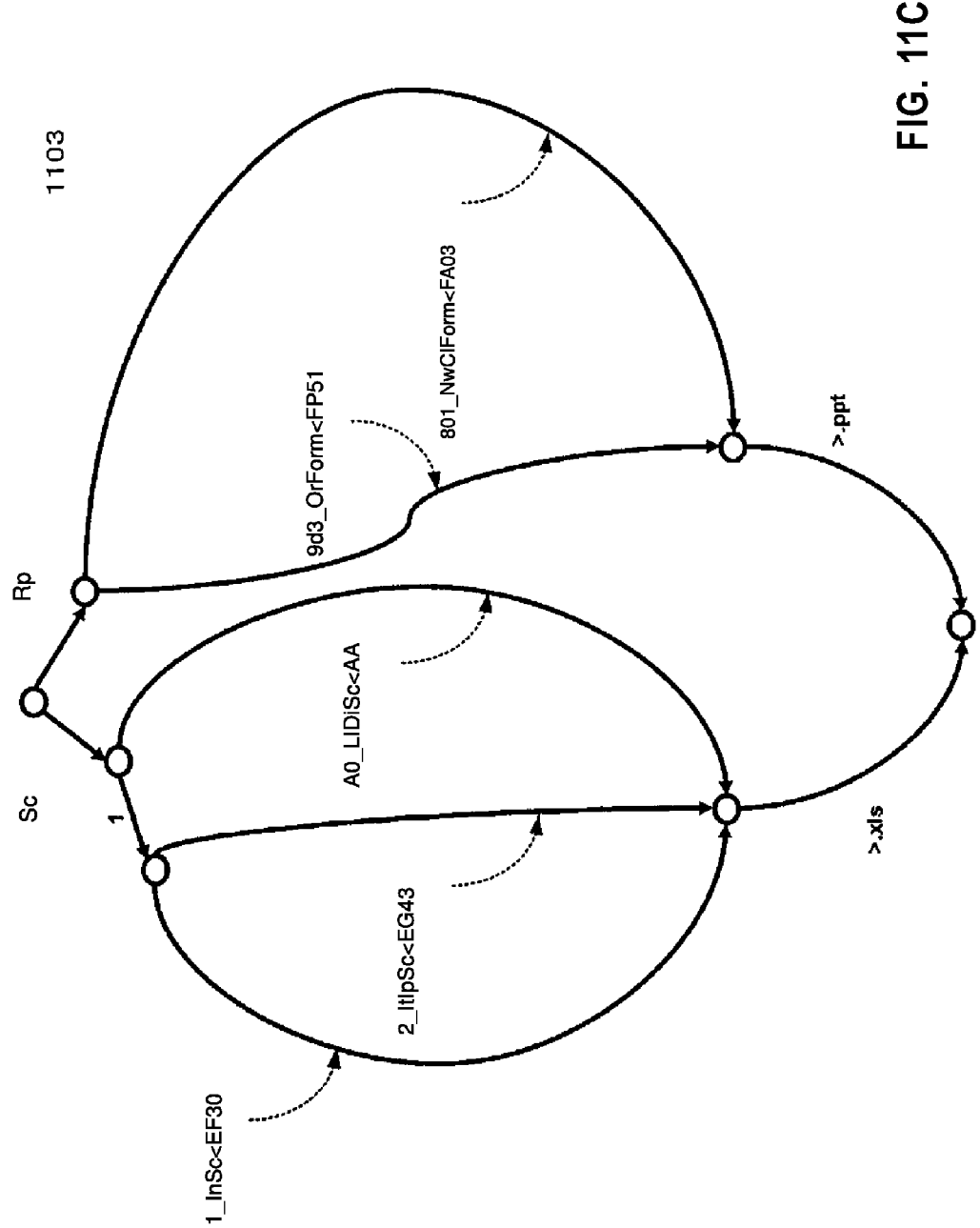
FIG. 11C shows Embodiment 1 which is the embodiment of the present invention, and shows the finite state automaton (FIG. 11D to be described below) in the course of generation by the abstraction processing in FIG. 10C.
Figure 11D:
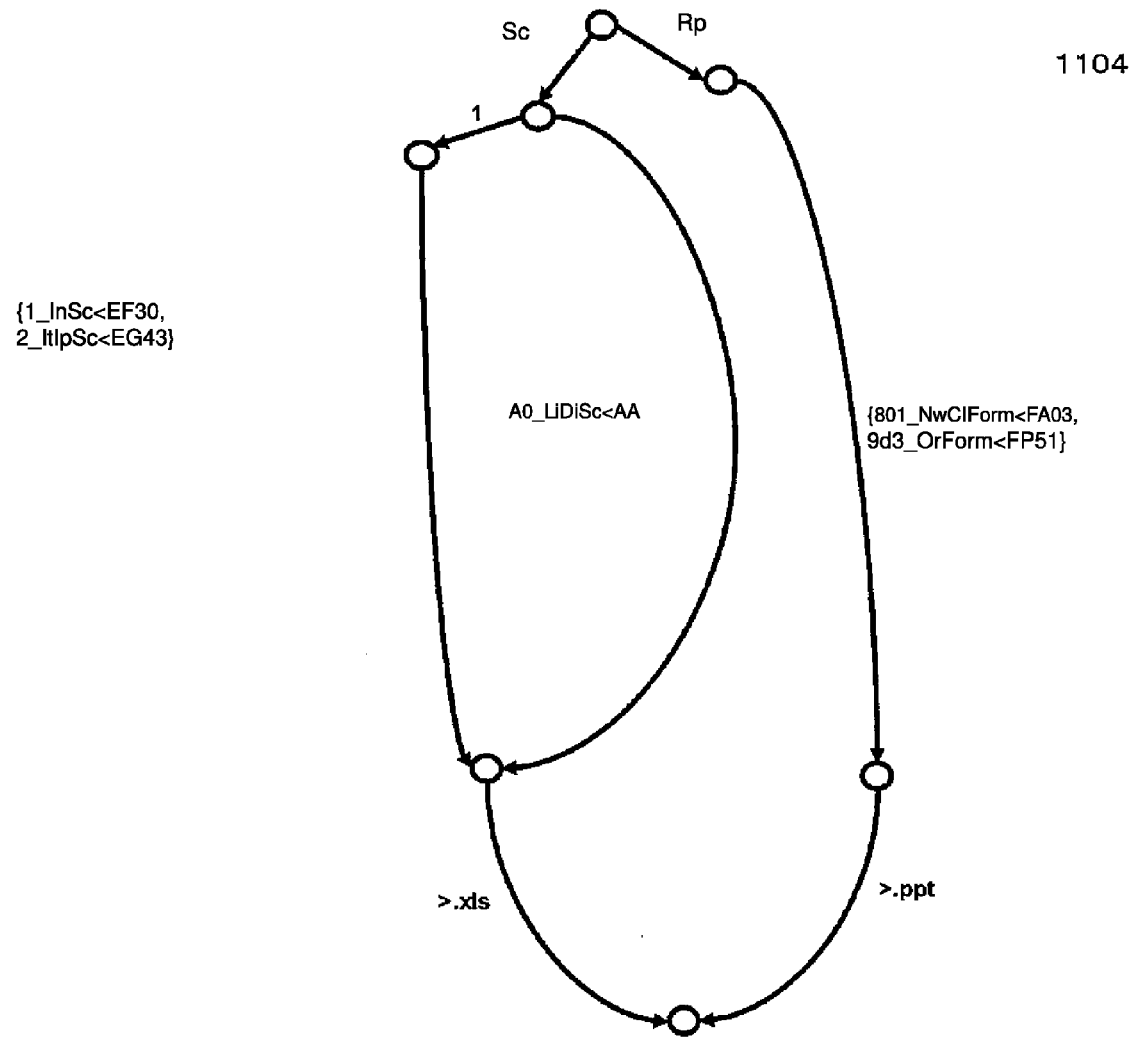
FIG. 11D shows Embodiment 1 which is the embodiment of the present invention, and shows the finite state automaton generated by the abstraction processing in FIG. 10C.

Upon receipt of the instruction for starting the operation-T abstraction processing, the second generator (202-2) performs the operation-T abstraction processing on the finite state automaton (1102). In the operation-T abstraction processing, the second generator (202-2) removes states in the finite state automaton (1102) shown in FIG. 11B, and merges edges to generate a degenerated finite state automaton in the memory (103) (the processing in Step 4). FIG. 11C shows a finite state automaton (1103) in the course of generating a finite state automaton (1104 in FIG. 11D) by the processing in Step 4. FIG. 11D shows the finite state automaton (1104) generated in the (first) processing in Step 4.

Figure 10D:
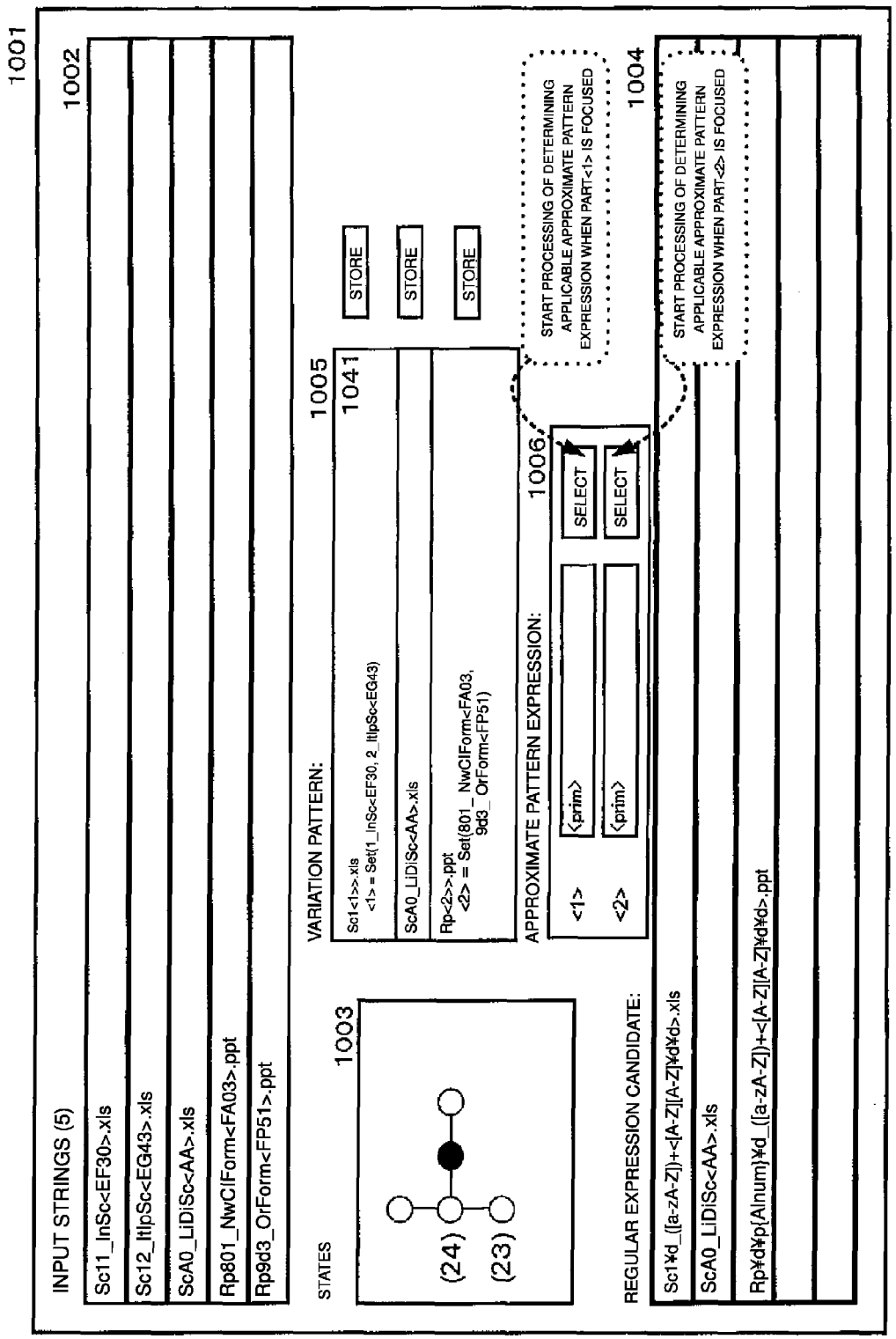
FIG. 10D shows Embodiment 1 which is the embodiment of the present invention, and exemplifies a screen showing an operation for determining, to acquire a regular expression candidate from the finite state automaton generated in the operation-T abstraction processing shown in FIG. 10C, approximate pattern expressions applicable to approximation target parts in variation patterns generated from the finite state automaton.

FIG. 10D exemplifies a screen showing an operation for determining, to acquire a regular expression candidate from the finite state automaton (1104) generated in the operation-T abstraction processing shown in FIG. 10C, approximate pattern expressions applicable to parts <1> and <2>, respectively, in variation patterns generated from the finite state automaton (1104). After the operation T shown in FIG. 10C is completed, the display unit (206) displays, in the window (1001), the sets of input strings (1002) as well as the number of the sets of input strings (1002) which is "5", the states (1003) in the processing of transforming sets of input strings into an approximate pattern expression stepwise, and the regular expression candidates (1004). In addition to these, the display unit (206) displays variation patterns (1005) and default approximate pattern expressions (1006) each applicable to a corresponding part <k> in the variation patterns (1005).

The user clicks a button for selecting an approximate pattern expression to start the processing of determining, in accordance with the flowchart shown in FIG. 9A, an approximate pattern expression applicable to the part <k> in the variation patterns (1005) when the part <k> is focused. FIG. 10D shows that the variation patterns (1005) have the parts <1> and <2>. For each of the parts <1> and <2>, <prim> designated as a default approximate pattern expression is firstly displayed. Here, prim is (the name of) a regular expression inference function, and <prim> is an approximate pattern expression.

The user clicks the Select button associated with the part <1> to start the processing of determining an approximate pattern expression applicable to the part <1>. In response to the click on the Select button, the approximate pattern expression determination program runs, so that a sub-window (1023) shown in FIG. 10F appears.

FIG. 10D also shows the variation patterns (1005) of the finite state automaton (1104) shown in FIG. 11D as well as the regular expression candidates (1004) at present. The regular expression candidates (1004) at present indicate regular expression candidates acquired by inference by using the approximate pattern expressions <prim> and <prim> (1006) applicable to the respective parts <1> and <2> in the variation patterns (1005) shown in FIG. 10D when the part <1> or <2> is focused.

FIG. 10E shows: a variation pattern (1041) in the case of focusing the part <1> among the variation patterns (1005) shown in FIG. 10D; and the approximate pattern expressions <prim> and <choice> currently existing in the approximate pattern expression store (1042). When the part <1> in the variation pattern (1041) is focused, the processing of determining an approximate pattern expression applicable to the part <1> is performed in the following manner.

Step 1: The expression generator (203) sets as candidates approximate pattern expressions <prim> (1042-1) and <choice> (1042-2) in the approximate pattern expression store (1042). Since the approximate pattern expression store (1042) does not store any approximate pattern expression matching every sub-string in a set of sub-strings grouped by the part <1>, no approximate pattern expression other than the above expressions is set as a candidate at this time.

Step 2: The expression generator (203) assigns, to reg_v, a regular expression which is Sc(.*)>.xls acquired by replacing the part <1> with (.*).

Step 3: The expression generator (203) performs matching of the regular expression reg_v with each of the approximate pattern expressions (1042-1 and 1042-2) corresponding to the basic functions currently existing in the approximate pattern expression store (1042). However, neither of the approximate pattern expressions matches the regular expression Sc(.*)>.xls. Thus, the approximate pattern expressions applicable to the part <1> are <prim> and <choice> only. Accordingly, the display unit (206) displays the two approximate pattern expressions <prim> and <choice> only as the approximate pattern expression candidates for the part <1> (see FIG. 10F).

Figure 10F:
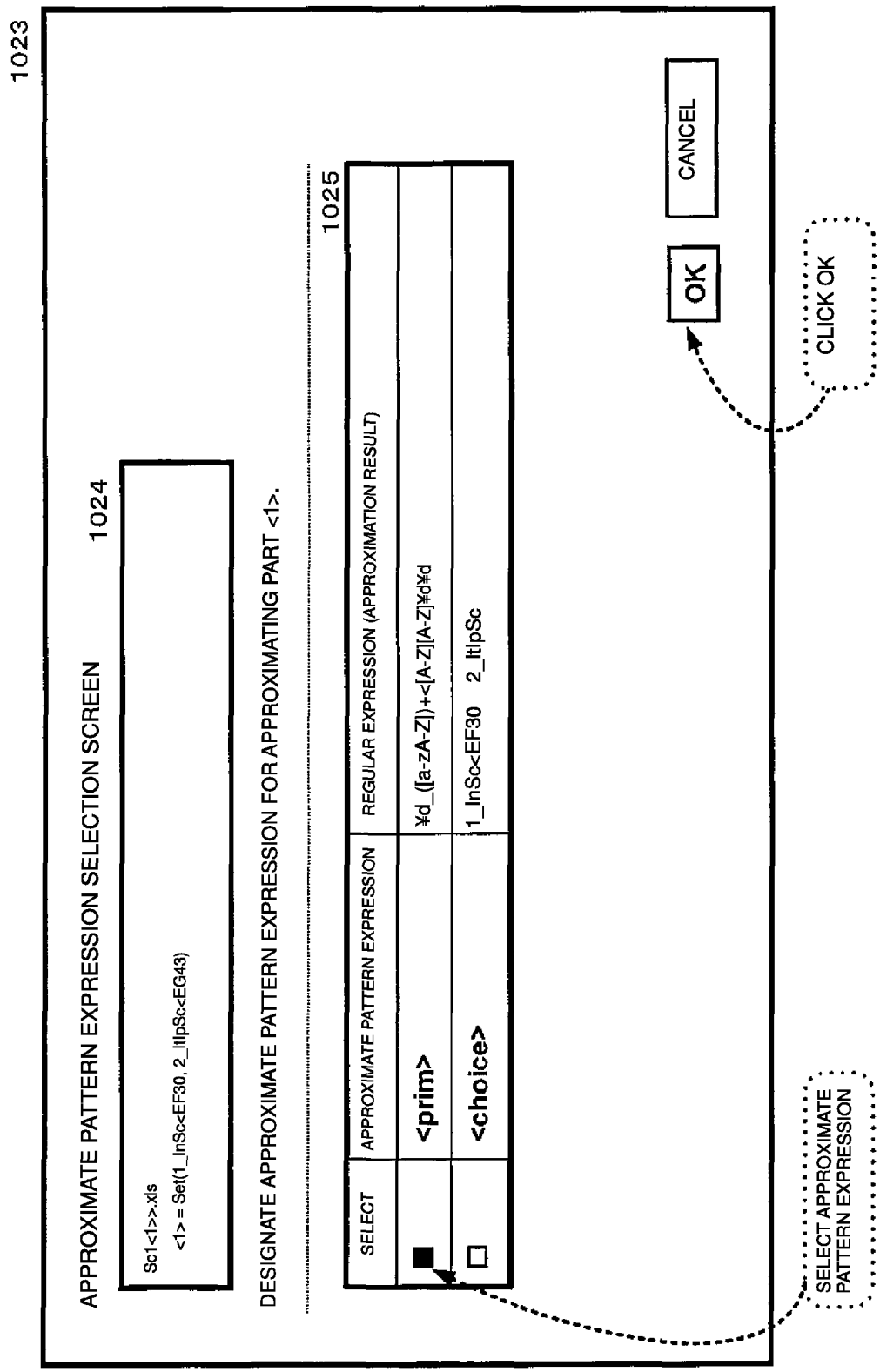
FIG. 10F shows Embodiment 1 which is the embodiment of the present invention, and exemplifies a screen showing processing of enabling a user to select an approximate pattern expression among approximate pattern expressions determined to be applicable when the approximation target part of the variation pattern shown in FIG. 10E is focused.

FIG. 10F exemplifies a screen showing processing for enabling the user to select an approximate pattern expression among approximate pattern expressions determined to be applicable to the part <1> when the part <1> of the variation pattern (1041) shown in FIG. 10E is focused. Specifically, FIG. 10F shows that the approximate pattern expressions applicable to the part <1> are <prim> and <choice> (1025). FIG. 10F also shows regular expressions (i.e., approximation results) matching the respective approximate pattern expressions applicable to the part <1>. The user can select one of the approximate pattern expressions (1025) applicable to the part <1>.

When wishing to select the approximate pattern expression <prim>, the user clicks the Select button on the left side of the approximate pattern expression <prim> and then the OK button. In response to the click on the OK button, a regular expression candidate (1004) including a regular expression matching the selected approximate pattern expression <prim> is displayed in the window (1001) as shown in FIG. 10G.

The user also selects <prim> for the part <2> as an approximate pattern expression applicable to the part <2> (not shown). In response to the selection, the window (1001) shows a regular expression candidate (1004) including a regular expression acquired by inferring the part <2> by using a regular expression inference function using the approximate pattern expression <prim>.

Figure 10G:
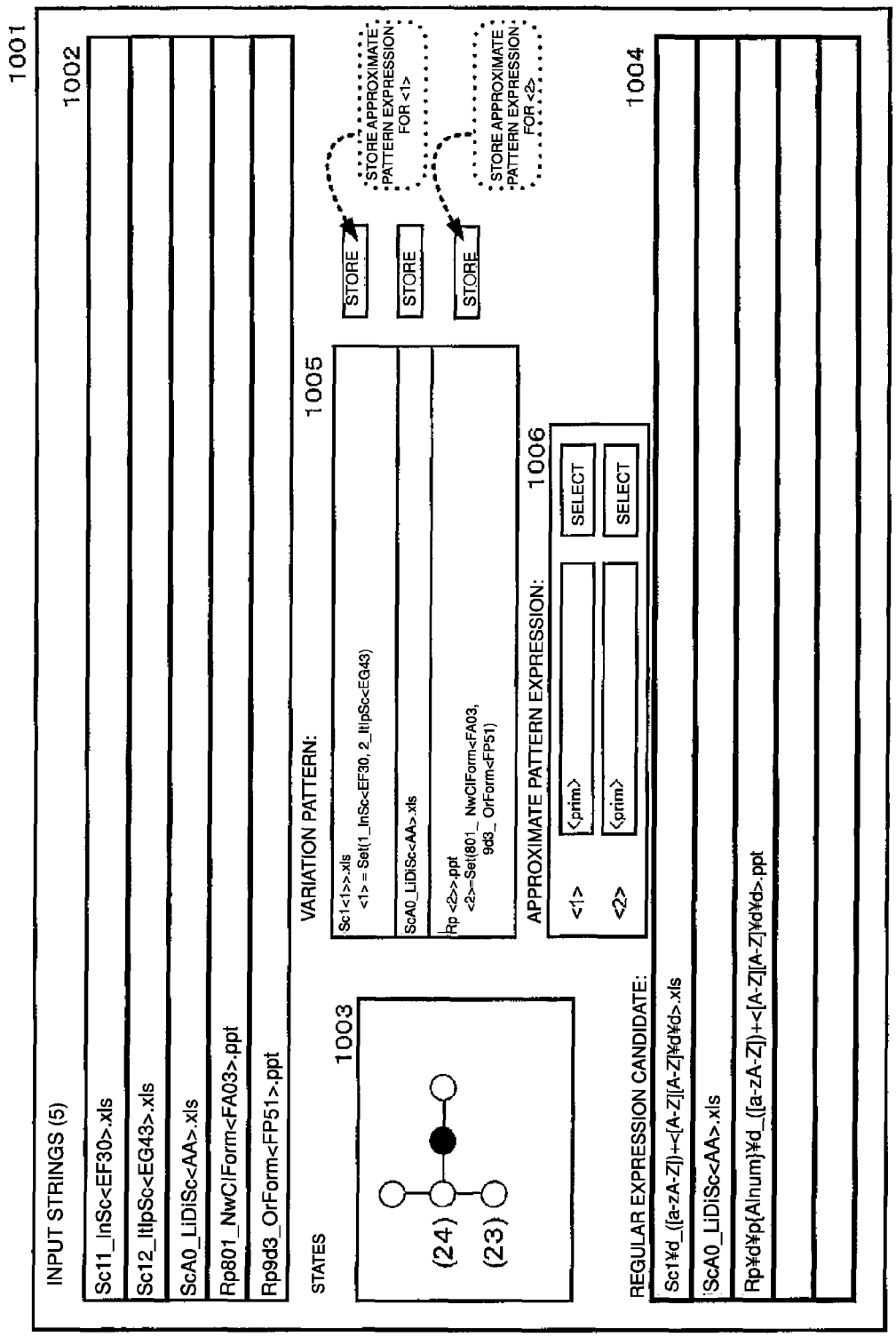
FIG. 10G shows Embodiment 1 which is the embodiment of the present invention, and exemplifies a screen showing processing for storing, in the approximate pattern expression store, an approximate pattern expression generated from a finite state automaton generated in the processing shown in FIG. 10C.

FIG. 10G exemplifies a screen showing processing for storing, in the approximate pattern expression store (1042), the approximate pattern expressions generated from the finite state automaton generated in the processing shown in FIG. 10C. Specifically, FIG. 10G shows that the approximate pattern expressions (1006) acquired by applying the approximate pattern expression <prim> to each of the parts <1> and <2> (<1>=<prim> and <2>=<prim>) in the variation patterns (1005) are stored in the approximate pattern expression store (1042), the variation patterns (1005) being acquired from the finite state automaton generated by performing the operation S (k=24) (FIG. 10B) and the (first) operation T (FIG. 10C).

When wishing to store, in the approximate pattern expression store (1042), the approximate pattern expression which is Sc1<prim>>.xls acquired by applying the approximate pattern expression <prim> to the part <1>, the user clicks a Store button. In response to the click on the Store button, a sub-window (1026) shown in FIG. 10H appears.

In addition, when wishing to store, in the approximate pattern expression store (1042), an approximate pattern expression which is Rp<prim>>.ppt acquired by applying the approximate pattern expression <choice> to the part <2>, the user clicks the Store button. In response to the click on the Store button, the sub-window (1026) shown in FIG. 10H appears.

Figure 10H:
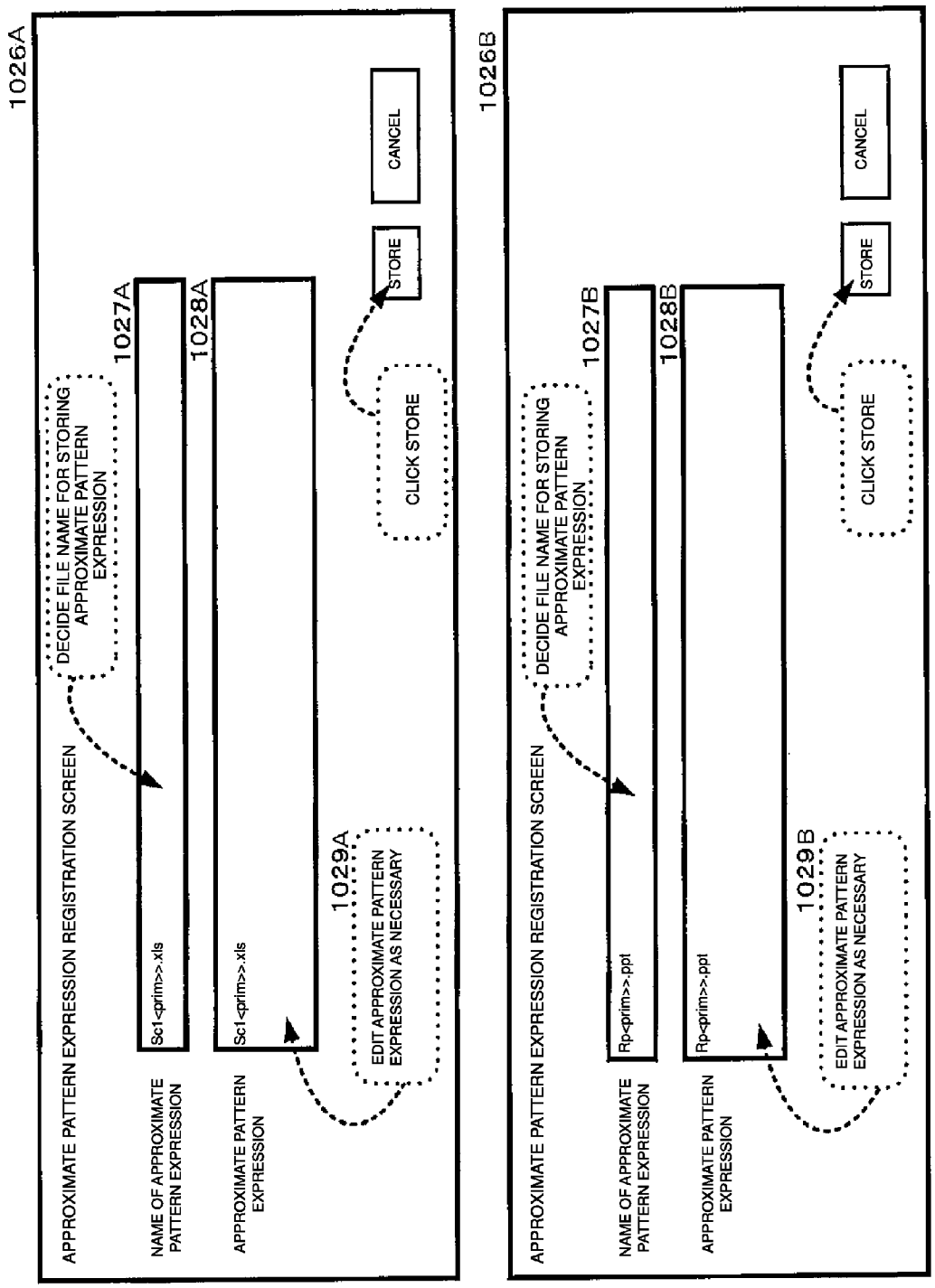
FIG. 10H shows Embodiment 1 which is the embodiment of the present invention, and exemplifies screens showing processing for storing the approximate pattern expression in FIG. 10F in the approximate pattern expression store and processing for editing the approximate pattern expression.

FIG. 10H exemplifies screens each showing processing for storing the selected approximate pattern expression in FIG. 10F in the approximate pattern expression store (1042) and processing for editing the approximate pattern expression.

A sub-window (1026A) shows an example of storing the approximate pattern expression Sc1<prim>>.xls in FIG. 10G in the approximate pattern expression store (1042).

To store the approximate pattern expression Sc1<prim>>.xls as a file, the user types a file name for the approximate pattern expression. Alternatively, the computer (201) can display in advance a file name for the approximate pattern expression automatically acquired from the approximate pattern expression. In addition, the user can edit the approximate pattern expression Sc1<prim>>.xls (1029A). After the editing, the user can store the edited approximate pattern expression in the approximate pattern expression store (1042). When the approximate pattern expression is stored, the user can click the Store button. In response to the click on the Store button, the approximate pattern expression Sc1<prim>>.xls is stored in the approximate pattern expression store (1042).

A sub-window (1026B) shows an example of storing the approximate pattern expression Rp<prim>>.ppt in FIG. 10G in the approximate pattern expression store (1042). To store the approximate pattern expression Rp<prim>>.ppt as a file, the user types a file name for the approximate pattern expression. Alternatively, the computer (201) can display in advance a file name for the approximate pattern expression automatically acquired from the approximate pattern expression. In addition, the user can edit the approximate pattern expression Rp<prim>>.ppt (1029B). After the editing, the user can store the edited approximate pattern expression in the approximate pattern expression store (1042). When storing the approximate pattern expression, the user can click the Store button. In response to the click on the Store button, the approximate pattern expression Rp<prim>>.ppt is stored in the approximate pattern expression store (1042).

Figure 10J:
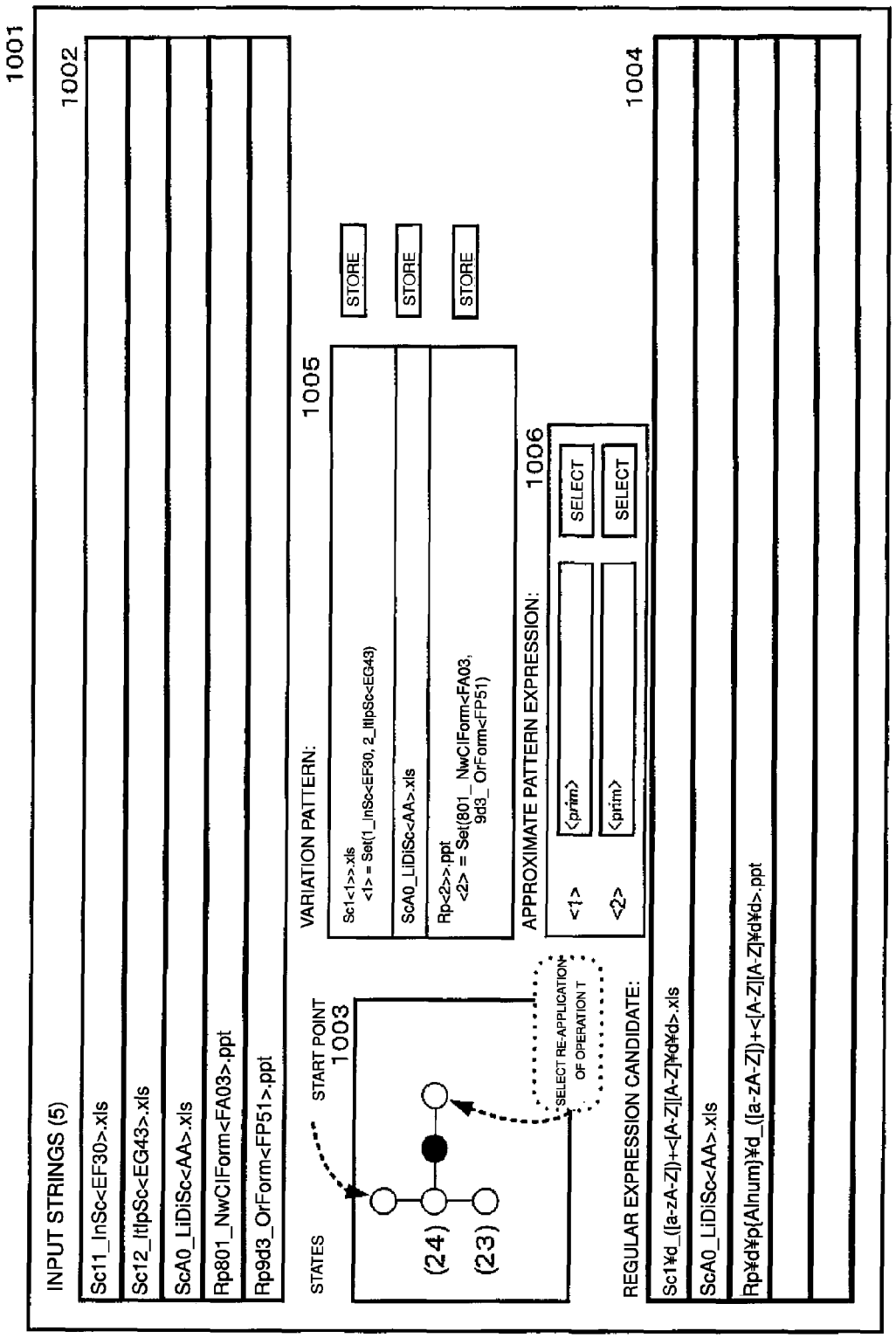
FIG. 10J shows Embodiment 1 which is the embodiment of the present invention, and exemplifies a screen showing an operation for starting the (second) operation-T abstraction processing on the finite state automaton which is generated by the abstraction processing in FIG. 10C and is shown in FIG. 11D to be described below.

FIG. 10J exemplifies a screen showing the operation for starting the (second) operation-T abstraction processing on the finite state automaton (1104) shown in FIG. 11D. The black circle in the states (1003) shows the location of the operation-T abstraction processing (Step 4) which is the abstraction processing completed immediately before the abstraction processing to be started. FIG. 10J shows that the operation S has been applied to the first finite state automaton and then the operation T (the black circle) has been applied thereto. The white circle on the right side of the black circle shows that the operation-T abstraction processing can be performed on the current finite state automaton.

When wishing to apply the operation-T abstraction processing to the finite state automaton (1104), the user clicks the white circle on the right side of the black circle in the states (1003) to instruct the computer (201) to start the operation-T abstraction processing on the finite state automaton (1104).

Figure 11F:
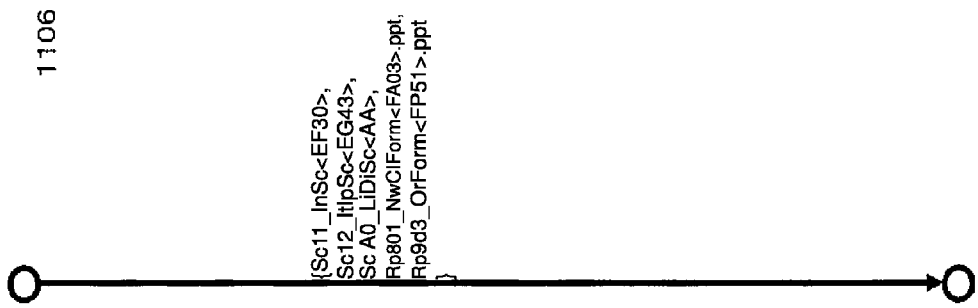
FIG. 11F shows Embodiment 1 which is the embodiment of the present invention, and shows an example of the degenerated finite state automaton generated by the abstraction processing in FIG. 10P.
Figure 11E:
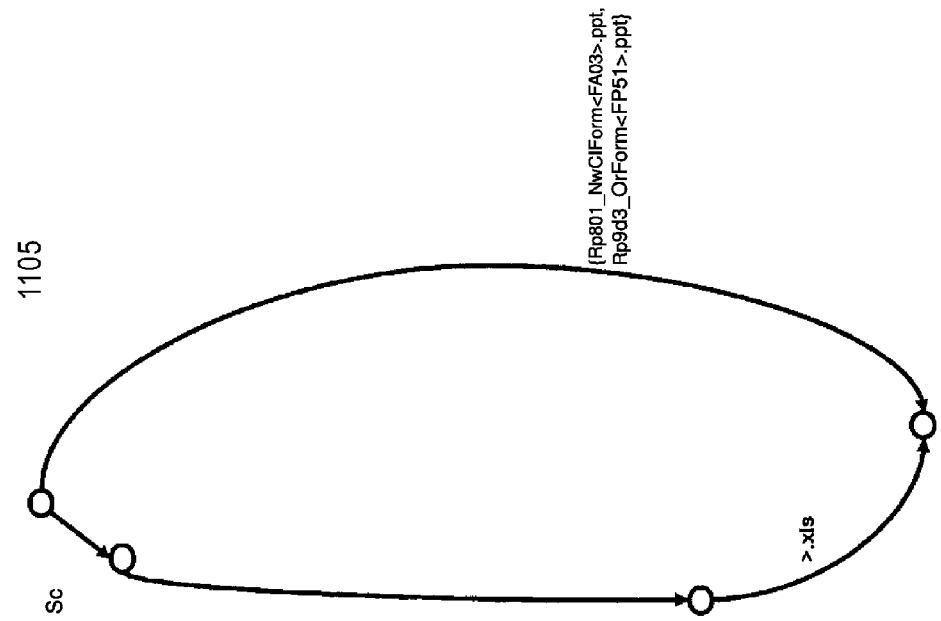
FIG. 11E shows Embodiment 1 which is the embodiment of the present invention, and shows an example of the degenerated finite state automaton generated by the abstraction processing in FIG. 10J.

Upon receipt of the instruction for starting the operation-T abstraction processing, the second generator (202-2) performs the operation-T abstraction processing on the finite state automaton (1104). In the operation-T abstraction processing, the second generator (202-2) removes states in the finite state automaton (1104) shown in FIG. 11B, and merges edges to generate a degenerated finite state automaton in the memory (103) (the processing in Step 4). FIG. 11E shows a finite state automaton (1105) generated in the processing in Step 4 executed for the second time.

Figure 10K:
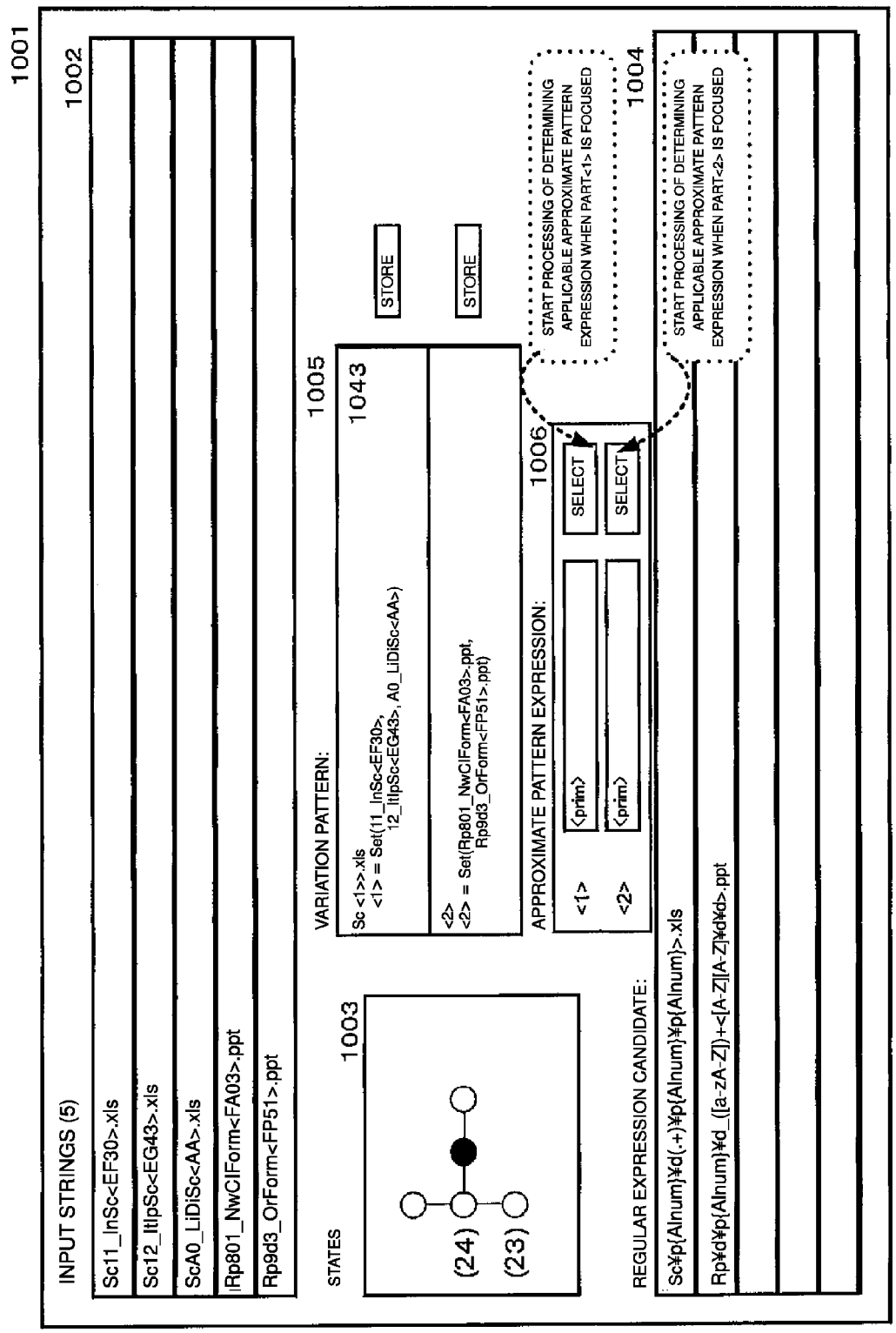
FIG. 10K shows Embodiment 1 which is the embodiment of the present invention, and exemplifies a screen showing an operation for determining, to acquire a regular expression candidate from a finite state automaton generated by the operation-T abstraction processing shown in FIG. 10J, an approximate pattern expression applicable to an approximation target part in variation patterns generated from the finite state automaton.

FIG. 10K exemplifies a screen showing the operation for determining, to acquire a regular expression candidate from the finite state automaton (1105) generated in the operation-T abstraction processing shown in FIG. 10J, approximate pattern expressions applicable to parts <1> and <2>, respectively, in variation patterns (1005) generated from the finite state automaton (1105). The user clicks the button for selecting an approximate pattern expression to start the processing of determining, in accordance with the flowchart shown in FIG. 9A, an approximate pattern expression applicable to the part <k> in the variation patterns (1005) when the part <k> is focused. FIG. 10K shows that the variation patterns (1005) have the parts <1> and <2>. For each of the parts <1> and <2>, <prim> designated as the default approximate pattern expression is firstly displayed.

The user clicks the Select button associated with the part <1> to start the processing of determining an approximate pattern expression applicable to the part <1>. In response to the click on the Select button, the approximate pattern expression determination program runs, so that a sub-window (1030) shown in FIG. 10M appears.

FIG. 10K also shows variation patterns (1005) of the finite state automaton (1105) shown in FIG. 11E and regular expression candidates (1004) at present. The regular expression candidates (1004) at present indicate regular expression candidates acquired by inference by using the approximate pattern expressions <prim> and <prim> (1006) applicable to the respective parts <1> and <2> in the variation patterns (1005) shown in FIG. 10K when the part <1> or <2> is focused.

FIG. 10L shows: a variation pattern (1043) in the case of focusing the part <1> among the variation patterns (1005) shown in FIG. 10K; and approximate pattern expressions currently existing in the approximate pattern expression store (1044). When the part <1> in the variation pattern (1043) is focused, the processing of determining an approximate pattern expression applicable to the part <1> is performed in the following manner.

Step 1: The expression generator (203) sets as candidates approximate pattern expressions <prim> (1044-1) and <choice> (1044-2) in the approximate pattern expression store (1044). Here, the approximate pattern expression store (1044) includes the approximate pattern expression Sc1<prim>>.xls and the approximate pattern expression Rp<prim>>.ppt which are added to the approximate pattern expression store (1042) shown in FIG. 10E in the processing shown in FIG. 10H.

Step 2: The expression generator (203) assigns, to reg_v, the regular expression which is Sc1(.*)>.xls acquired by replacing the part <1> with (.*).

Step 3: The expression generator (203) performs matching of the regular expression reg_v with each of approximate pattern expressions (1044-3 and 1044-4) which do not correspond to the basic functions currently existing in the approximate pattern expression store (1044). As the result, of the two approximate pattern expressions (1044-3 and 1044-4) stored in the approximate pattern expression store (1042) in the storing operation shown in FIG. 10G, Sc1<prim>>.xls (1044-3) matches the regular expression reg_v.

Step 4: In the approximate pattern expression Sc1<prim>>.xls (Pi) successfully matched with reg_v, the expression generator (203) assigns, to Psub_i, a pattern 1<prim> of a part captured by the part (.*) of reg_v corresponding to the part <1>.

Step 5: Since the approximate pattern expression 1<prim> does not match A0_LiDiSc<AA but matches 11_InSc<EF30 and 12_ItIpSc<EG43, the expression generator (203) determines that the approximate pattern expression 1<prim>|<choice> is applicable. Accordingly, as approximate pattern expression candidates for the part <1>, the display unit (206) displays on the screen the three approximate pattern expressions which are <prim>, <choice>, and 1<prim>|<choice> (see FIG. 10M).

Figure 10M:
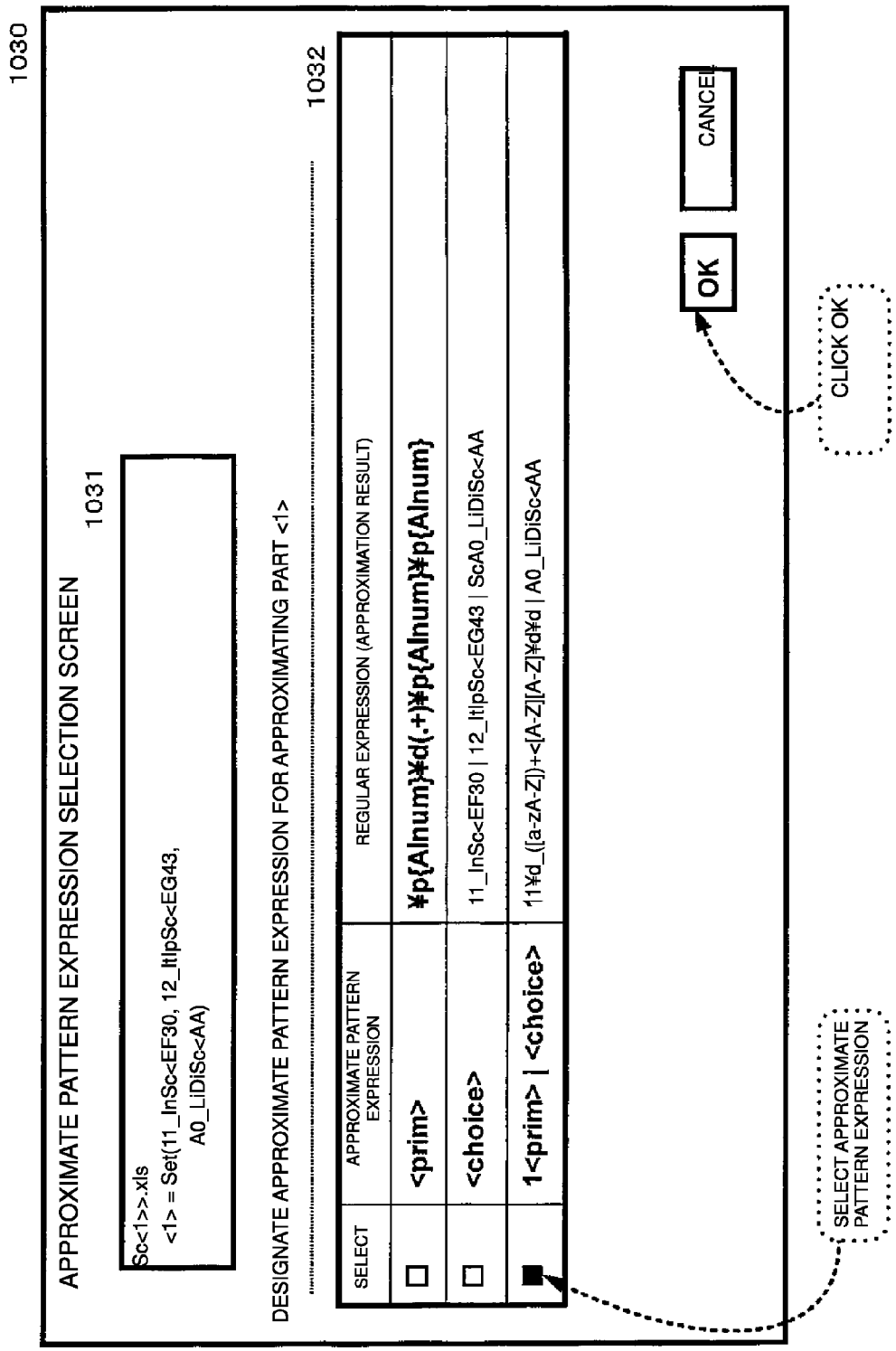
FIG. 10M shows Embodiment 1 which is the embodiment of the present invention, and exemplifies a screen showing processing for enabling the user to select an approximate pattern expression among approximate pattern expressions determined to be applicable to the approximation target part of the variation pattern shown in FIG. 10L when the approximation target part is focused.

FIG. 10M exemplifies a screen showing processing for enabling the user to select an approximate pattern expression among approximate pattern expressions determined to be applicable to the part <1> of the variation pattern (1043) shown in FIG. 10L when the part <1> is focused. Specifically, FIG. 10M shows that the three approximate pattern expressions applicable to the part <1> are <prim>, <choice>, and 1<prim>|<choice> (1032). FIG. 10M also shows regular expressions (i.e., approximation results) matching the respective approximate pattern expressions applicable to the part <1>. The user can select one of the approximate pattern expressions (1032) applicable to the part <1>.

When wishing to select the approximate pattern expression 1<prim>|<choice>, the user clicks the Select button on the left side of the approximate pattern expression 1<prim>|<choice> and then the OK button. In response to the click on the OK button, a regular expression candidate (1004) including a regular expression matching the selected approximate pattern expression 1<prim>|<choice> is displayed in the window (1001).

The user also selects <prim> for the part <2> as an approximate pattern expression applicable to the part <2> (not shown) in the same way as the above. In response to the selection, the window (1001) shows a regular expression candidate (1004) including a regular expression acquired by inferring the part <2> by using a regular expression inference function using the approximate pattern expression <prim>.

Figure 10N:
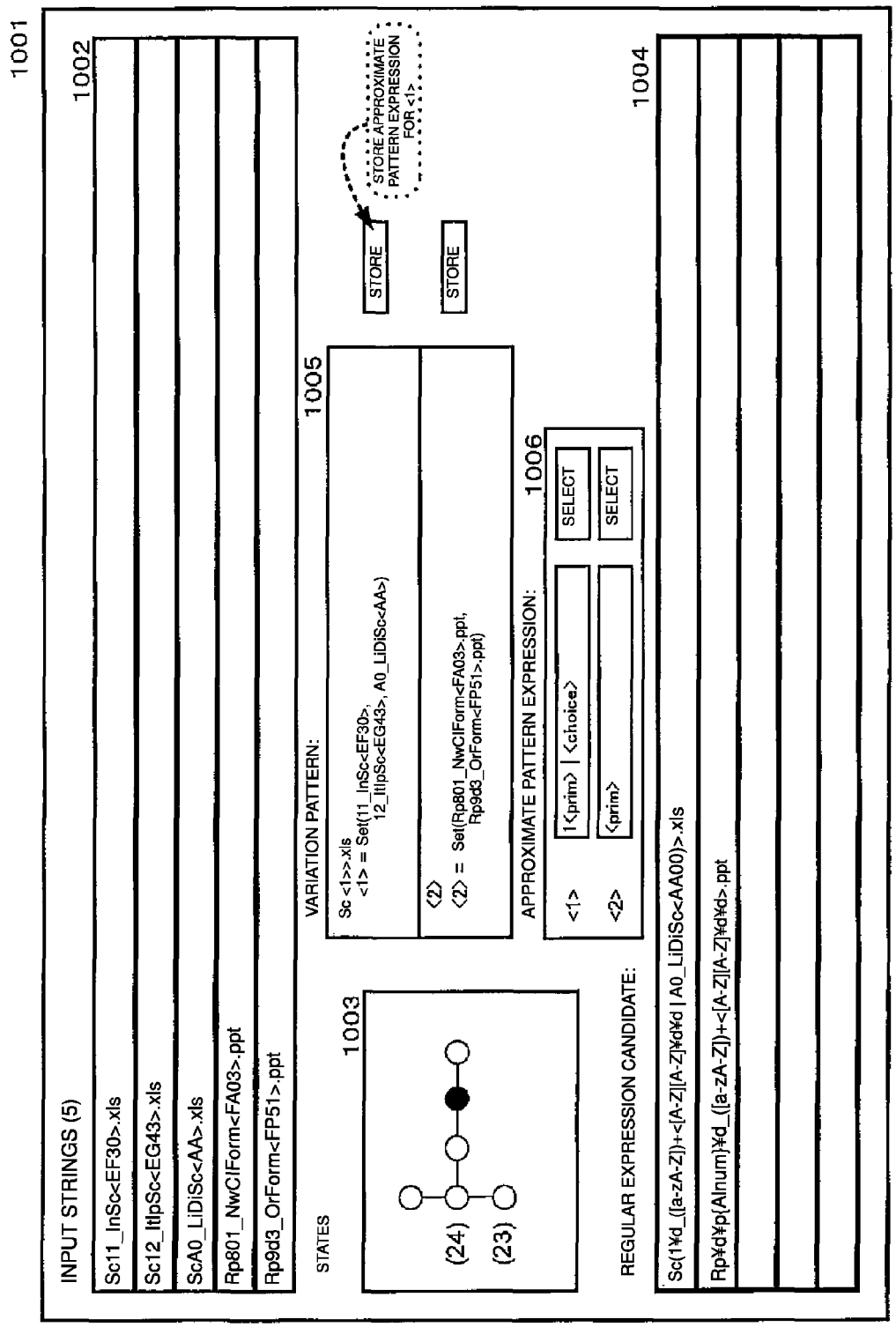
FIG. 10N shows Embodiment 1 which is the embodiment of the present invention, and exemplifies a screen showing processing for storing, in the approximate pattern expression store, an approximate pattern expression generated from a finite state automaton generated by the processing shown in FIG. 10J.

FIG. 10N exemplifies a screen showing processing for storing, in the approximate pattern expression store (1044), the approximate pattern expressions generated from the finite state automaton generated in the processing shown in FIG. 10J. Specifically, FIG. 10N shows that the approximate pattern expressions (1006) acquired by applying the approximate pattern expression 1<prim>|<choice> to the part <1> (<1>=1<prim>|<choice>) in the variation patterns (1005) are stored in the approximate pattern expression store (1044), the variation patterns (1005) being acquired from the finite state automaton generated by performing the operation S (k=24) (FIG. 10B), the (first) operation T (FIG. 10C), and the (second) operation T (FIG. 10J).

When wishing to store, in the approximate pattern expression store (1044), the approximate pattern expression Sc(1<prim>|<choice>)>.xls acquired by applying the approximate pattern expression 1<prim>|<choice> to the part <1>, the user clicks the Store button. In response to the click on the Store button, the same sub-window (not shown) as the sub-window (1026) shown in FIG. 10H appears on the display unit (206). In storing the approximate pattern expression, the user clicks the Store button (not shown). In response to the click on the Store button, the approximate pattern expression Sc(1<prim>|<choice>)>.xls is stored as an approximate pattern expression in the approximate pattern expression store (1044). In addition, the user can edit the approximate pattern expression Sc(1<prim>|<choice>)>.xls. After the editing, the user can store the edited approximate pattern expression in the approximate pattern expression store (1044).

Figure 10P:
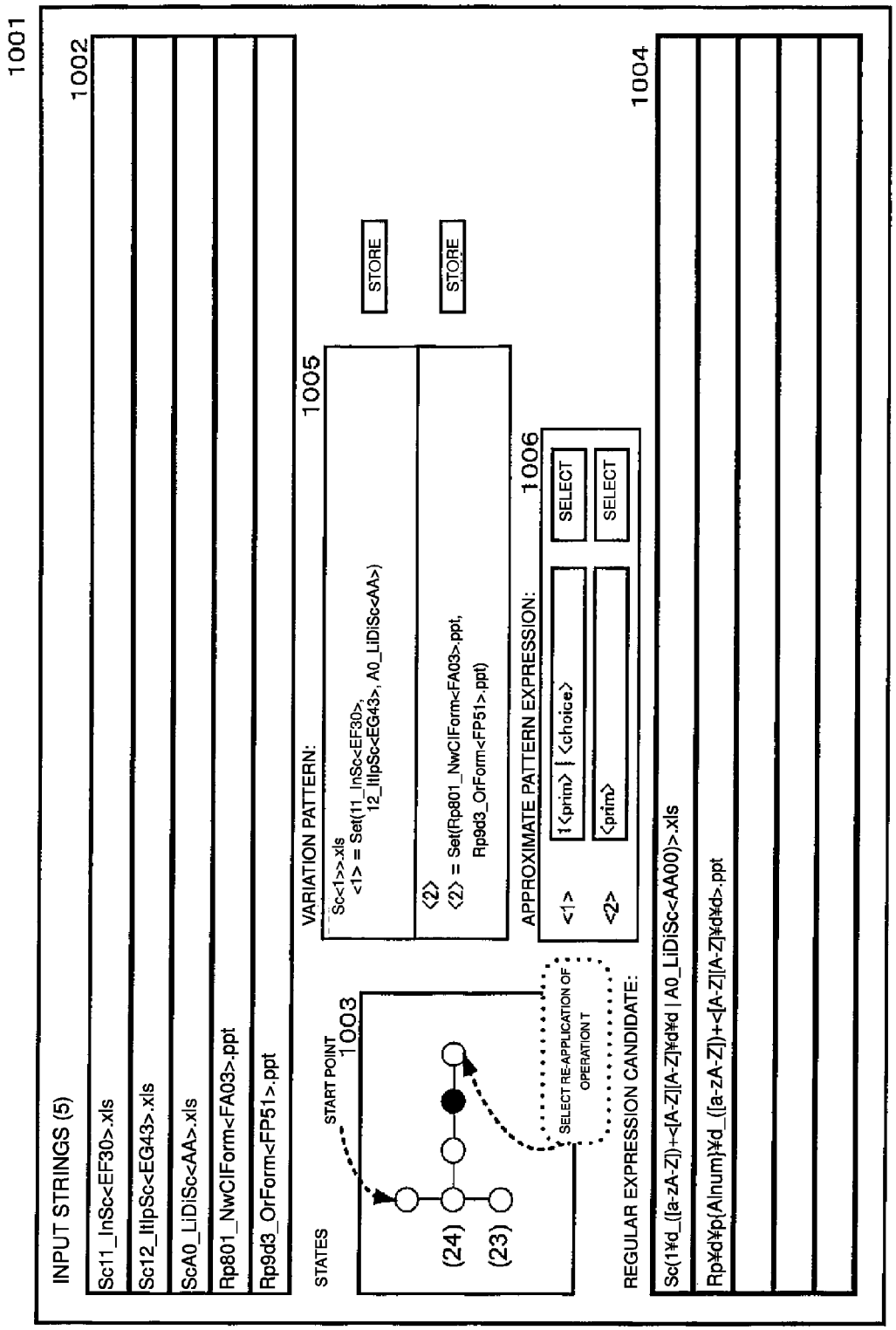
FIG. 10P shows Embodiment 1 which is the embodiment of the present invention, and exemplifies a screen showing an operation for starting the (third) operation-T abstraction processing on the finite state automaton which is generated by the processing in FIG. 10J and is shown in FIG. 11E to be described below.

FIG. 10P exemplifies a screen showing the operation for starting the (third) operation-T abstraction processing on the finite state automaton (1105) shown in FIG. 11E. The black circle in the states (1003) shows the location of the operation-T abstraction processing (Step 4) which is the abstraction processing completed immediately before the abstraction processing to be started. FIG. 10P shows that the operation S has been applied to the first finite state automaton, and then the operation T (the white circle) and further the operation T (the black circle) have been applied thereto. The white circle on the right side of the black circle shows that the operation-T abstraction processing can be performed on the current finite state automaton.

When wishing to apply the operation-T abstraction processing to the finite state automaton (1105), the user clicks the white circle on the right side of the black circle in the states (1003) to instruct the computer (201) to start the operation-T abstraction processing on the finite state automaton (1105).

Upon receipt of the instruction for starting the operation-T abstraction processing, the second generator (202-2) performs the operation-T abstraction processing on the finite state automaton (1105). In the operation-T abstraction processing, the second generator (202-2) removes states in the finite state automaton (1105) shown in FIG. 11E, and merges edges to generate a degenerated finite state automaton in the memory (103) (the processing in Step 4). FIG. 11F shows a finite state automaton (1106) generated in the processing in Step 4 executed for the third time.

Figure 10Q:
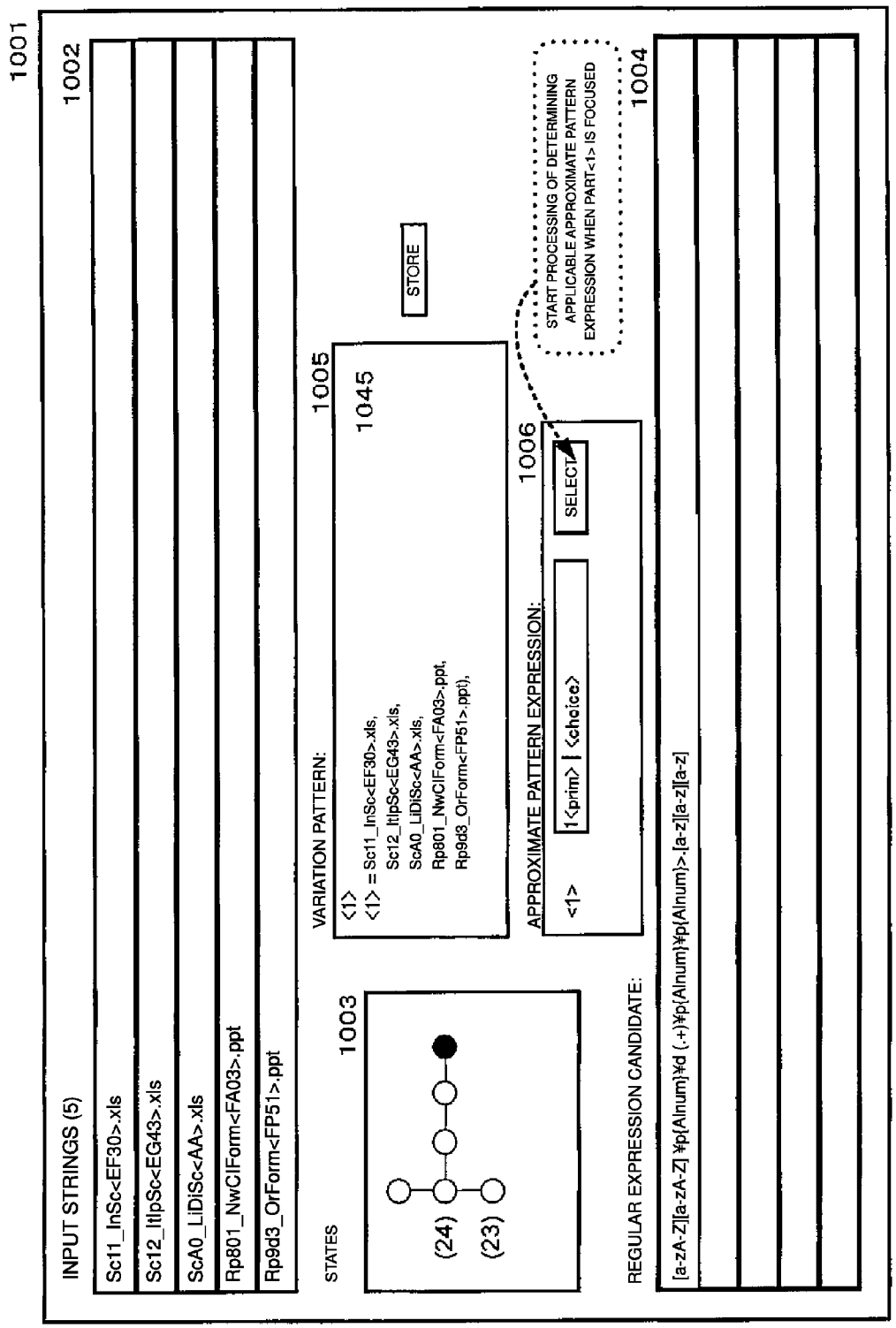
FIG. 10Q shows Embodiment 1 which is the embodiment of the present invention, and exemplifies a screen showing an operation for determining, to acquire a regular expression candidate from a finite state automaton generated by the operation-T abstraction processing shown in FIG. 10P, an approximate pattern expression applicable to an approximation target part in a variation pattern generated from the finite state automaton.

FIG. 10Q exemplifies a screen showing the operation for determining, to acquire a regular expression candidate from the finite state automaton (1105) generated in the operation-T abstraction processing shown in FIG. 10P, an approximate pattern expression applicable to a part <1> in a variation pattern (1005) generated from the finite state automaton (1105). The user clicks the button for selecting an approximate pattern expression to start the processing of determining, in accordance with the flowchart shown in FIG. 9A, an approximate pattern expression applicable to the part <k> in the variation pattern (1005) when the part <k> is focused. FIG. 10Q shows that the variation pattern (1005) has the part <1>, and the approximate pattern expression 1<prim>|<choice> is displayed for the part <1>.

The user clicks the Select button associated with the part <1> to start the processing of determining an approximate pattern expression applicable to the part <1>. In response to the click on the Select button, the approximate pattern expression determination program runs, so that a sub-window (1034) shown in FIG. 10S appears.

FIG. 10Q shows the variation pattern (1005) of the finite state automaton (1106) shown in FIG. 11F and a regular expression candidate (1004) at present.

FIG. 10R shows: a variation pattern (1045) of the variation pattern (1005) shown in FIG. 10Q in the case of focusing the part <1>; and approximate pattern expressions currently existing in the approximate pattern expression store (1046). When the part <1> in the variation pattern (1045) is focused, the processing of determining an approximate pattern expression applicable to the focused part <1> is performed in the following manner.

Step 1: The expression generator (203) sets as candidates the basic functions <prim> (1046-1) and <choice> (1046-2) in the approximate pattern expression store (1046). Here, the approximate pattern expression store (1046) includes the approximate pattern expression Sc(1<prim>|<choice>).xls which is added to the approximate pattern expression store (1044) shown in FIG. 10L in the processing shown in FIG. 10N.

Step 2: The expression generator (203) assigns, to reg_v, the regular expression (*).acquired by replacing the part <1> in Var-Pattern with (.*).

Step 3: The expression generator (203) performs matching of the regular expression reg_v with each of approximate pattern expressions (1046-1, 1046-2, 1046-3, 1046-4, and 1046-5) currently existing in the approximate pattern expression store (1046). As the result, each of the three approximate pattern expressions (1046-3, 1046-4, and 1046-5) stored in the storing operations shown in FIGS. 10G and 10N matches the regular expression reg_v.

Step 4: In the approximate pattern expressions Sc1<prim>>.xls, Rp<prim>>.ppt, and Sc(1<prim>|<choice>)>.xls which are successfully matched with reg_v, the expression generator (203) assigns, to Psub_i, each of patterns Sc1<prim>>.xls, Rp<prim>>.ppt, and Sc(1<prim>|<choice>).xls of parts captured by the part (.*) of reg_v corresponding to the part <1>.

Step 5: Since the aforementioned Psub_i matches a part of a set of sub-strings having Sc11_InS<EF30>.xls, Sc12_ItIpSc<EG43>.xls, ScA0_LiDiSc<AA>.xls, Rp801_NwClForm<FA03>.ppt ("NwClForm" means "new client form"), and Rp9d3_OrForm<FP51>.ppt ("OrForm" means "order form") but does not match the others, the expression generator (203) determines that the approximate pattern expressions Sc1<prim>>.xls|<choice>, Rp<prim>>.ppt|<choice>, and Sc(1<prim>|<choice>)>.xls are applicable. For example, Sc1<prim>>.xls matches the first two sub-strings but does not match the remaining three sub-strings. Since Psub_i does not match at least one sub-string in the set of sub-strings, <choice> is added to the approximate pattern expressions. Accordingly, as the approximate pattern expression candidates for the part <1>, the display unit (206) displays on the screen five approximate pattern expressions <prim> and <choice> as well as Sc1<prim>>.xls|<choice>, Rp<prim>>.ppt|<choice>, and Sc(1<prim>|<choice>)>.xls|<choice> (see FIG. 10S).

Figure 10S:
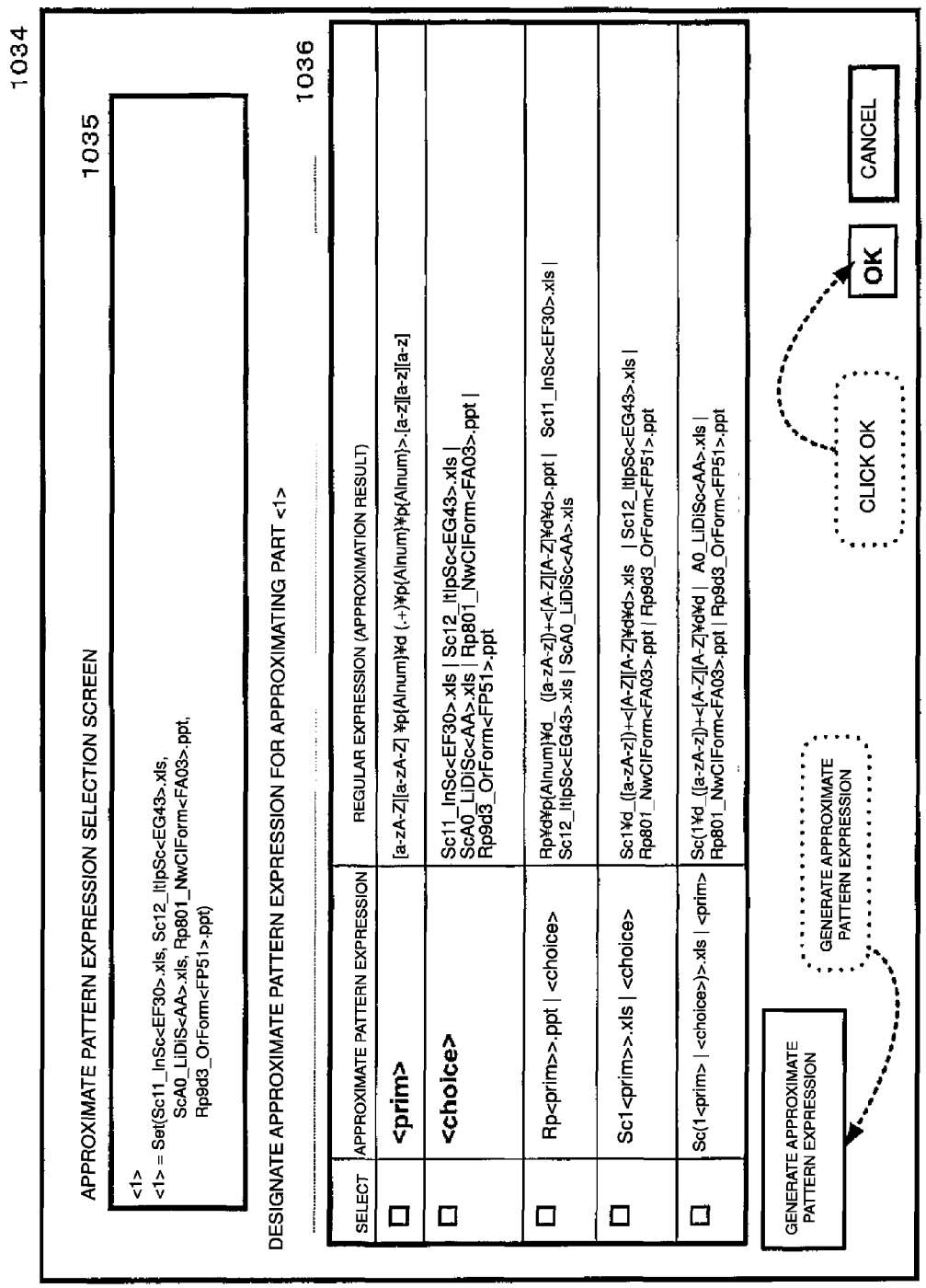
FIG. 10S shows Embodiment 1 which is the embodiment of the present invention, and exemplifies a screen showing processing for enabling the user to select an approximate pattern expression among approximate pattern expressions determined to be applicable to the approximation target part in the variation pattern shown in FIG. 10R when the approximation target part is focused.

FIG. 10S exemplifies a screen showing processing for enabling the user to select an approximate pattern expression among approximate pattern expressions determined to be applicable to the part <1> of the variation pattern (1045) shown in FIG. 10R when the part <1> is focused. Specifically, FIG. 10S shows that the approximate pattern expressions applicable to the part <1> are <prim>, <choice>, Rp<prim>>.ppt|<choice>, Sc1<prim>>.xls|<choice>, and Sc(1<prim>|<choice>)>.xls|<choice> (1036). FIG. 10S also shows regular expressions (i.e., approximation results) matching the respective approximate pattern expressions applicable to the part <1>. The user can select one of the approximate pattern expressions (1036) applicable to the part <1>.

However, suppose a case where the five approximate pattern expressions do not include any approximate pattern expression desirable to the user. In this case, the user clicks a button "Create Approximate Pattern Expression" in the sub-window (1034) and then the OK button. In response to the click on the OK button, the user can manually type and add an approximate pattern expression (illustration of a screen therefore is omitted). In addition, the user can delete an unnecessary approximate pattern expression as necessary (illustration of a screen therefore is omitted).

FIG. 10T shows an example of the approximate pattern expressions applicable to the part <1> in the variation pattern (1045) shown in FIG. 10R when the part <1> is focused, and illustrates a screen showing that an added approximate pattern expression desired by the user is selectable. FIG. 10T shows an approximate pattern expression Sc(1<prim>|<choice>)>.xls|<prim> added by the user to the approximate pattern expressions shown in FIG. 10S.

Here, when wishing to select the approximate pattern expression Sc(1<prim>|<choice>)>.xls|<prim>, the user clicks the Select button on the left side of the approximate pattern expression Sc(1<prim>|<choice>)>.xls|<prim> and then the OK button. In response to the click on the OK button, the window (1001) displays a regular expression candidate (1004) including a regular expression matching the selected approximate pattern expression Sc(1<prim>|<choice>)>.xls|<prim>, as shown in FIG. 10U.

Figure 10U:
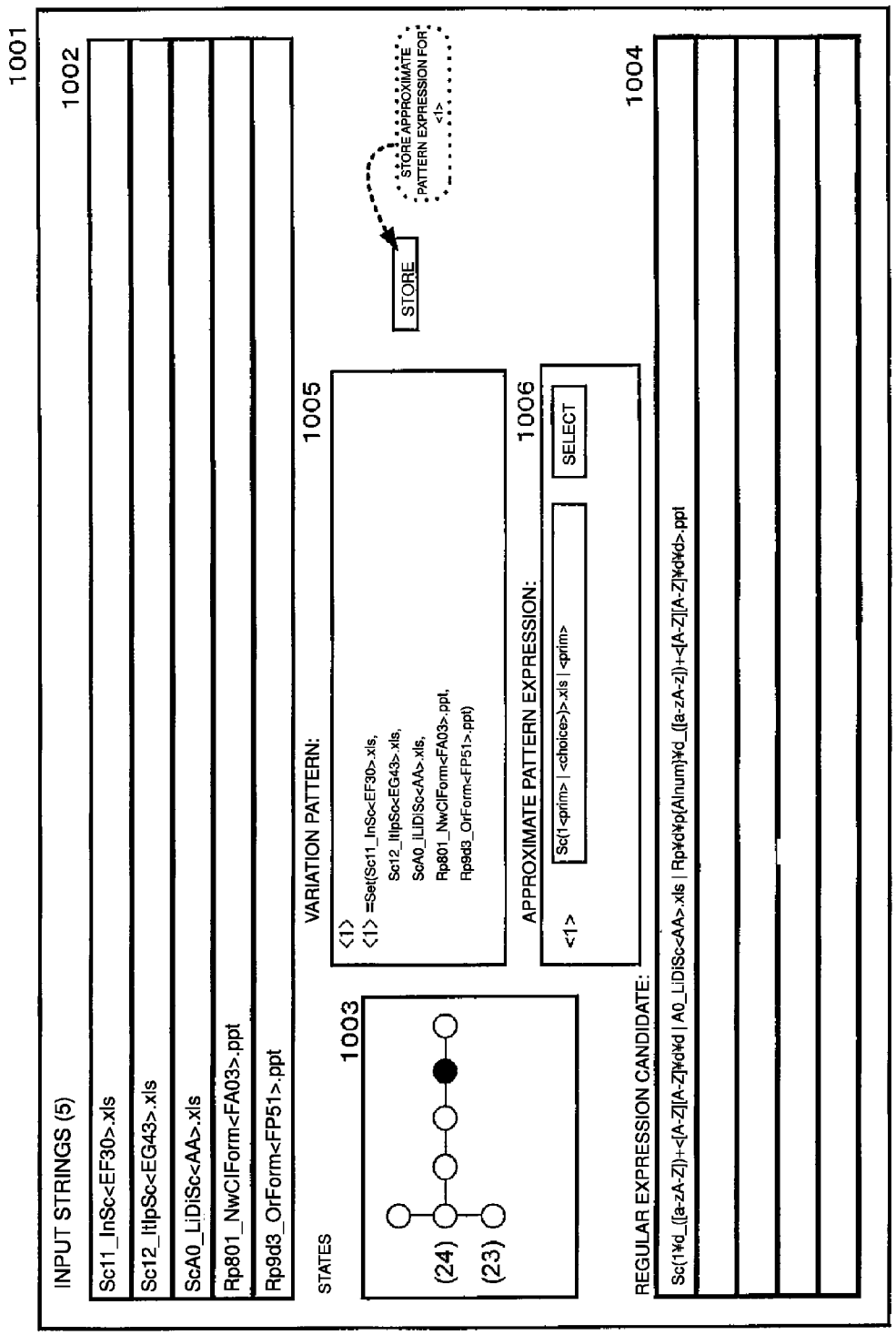
FIG. 10U shows Embodiment 1 which is the embodiment of the present invention, and exemplifies a screen showing processing for storing, in the approximate pattern expression store, an approximate pattern expression generated from a finite state automaton generated by the processing shown in FIG. 10P.
Figure 10V:
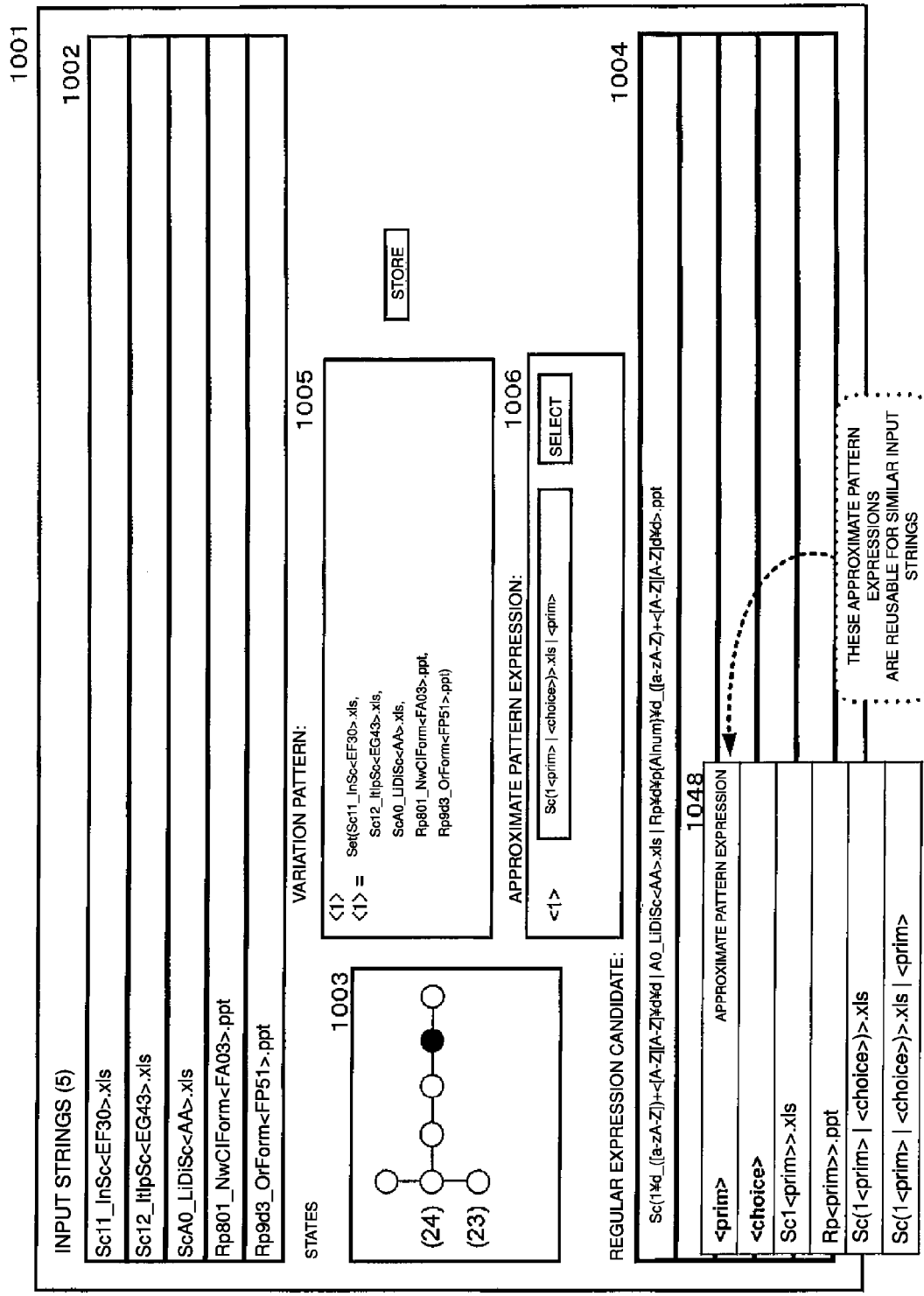
FIG. 10V shows an embodiment of the present invention, and exemplifies a screen showing that the approximate pattern expression generated by the abstraction processing in Embodiment 1 shown in FIGS. 10A to 10U and stored in the approximate pattern expression store is reusable in processing of transforming sets of input strings into an approximate pattern expression step by step in a case other than in Embodiment 1.

FIG. 10U exemplifies a screen showing processing for storing, in the approximate pattern expression store (1046), the approximate pattern expressions generated from the finite state automaton generated in processing shown in FIG. 10P. Specifically, FIG. 10U shows that the approximate pattern expression (1006) acquired by applying the approximate pattern expression Sc(1<prim>|<choice>)>.xls|<prim> to the part <1> in the variation pattern (1005) (<1>=<Sc (1<prim>|<choice>)>.xls|<prim>) is stored in the approximate pattern expression store (1046), the variation pattern (1045) being acquired from the finite state automaton generated by performing the operation S (k=24)(FIG. 10B), the (first) operation T (FIG. 10C), the (second) operation T (FIG. 10J), and the (third) operation T (FIG. 10P).

When wishing to store the approximate pattern expression (1006) in the approximate pattern expression store (1046), the user clicks the Store button. In response to the click on the Store button, the same sub-window (not shown) as the sub-window (1026) shown in FIG. 10H appears on the display unit (206). In storing the approximate pattern expression, the user can click the Store button (not shown). In response to the click on the Store button, the approximate pattern expression Sc(1<prim>|<choice>)>.xls|<prim> can be stored in the approximate pattern expression store (1046) (see reference numeral 1048 in FIG. 10V). Here, since the approximate pattern expression Sc(1<prim>|<choice>)>.xls|<prim> has been stored in the approximate pattern expression store (1046) in the processing of adding the approximate pattern expression shown in FIG. 10T by the user, the computer (201) can display, for example, an error message indicating that the same approximate pattern expression is already present in the approximate pattern expression store (1046) or a confirming message indicating that a file having the same approximate pattern expression in the approximate pattern expression store (1046) is to be overwritten.

FIG. 10V exemplifies a screen showing that the approximate pattern expression generated by the abstraction processing in Embodiment 1 and currently stored in the approximate pattern expression store (1048) is reusable also in processing of transforming sets of input strings into an approximate pattern expression step by step in a case other than in Embodiment 1. As the result of the abstraction processing in Embodiment 1, the approximate pattern expressions other than <prim> and <choice> which are the approximate pattern expressions corresponding to the basic functions are added to the approximate pattern expression store (1048). The added approximate pattern expressions are reusable also in processing of transforming sets of input strings into an approximate pattern expression stepwise in a case other than in Embodiment 1.

Figure 12A:
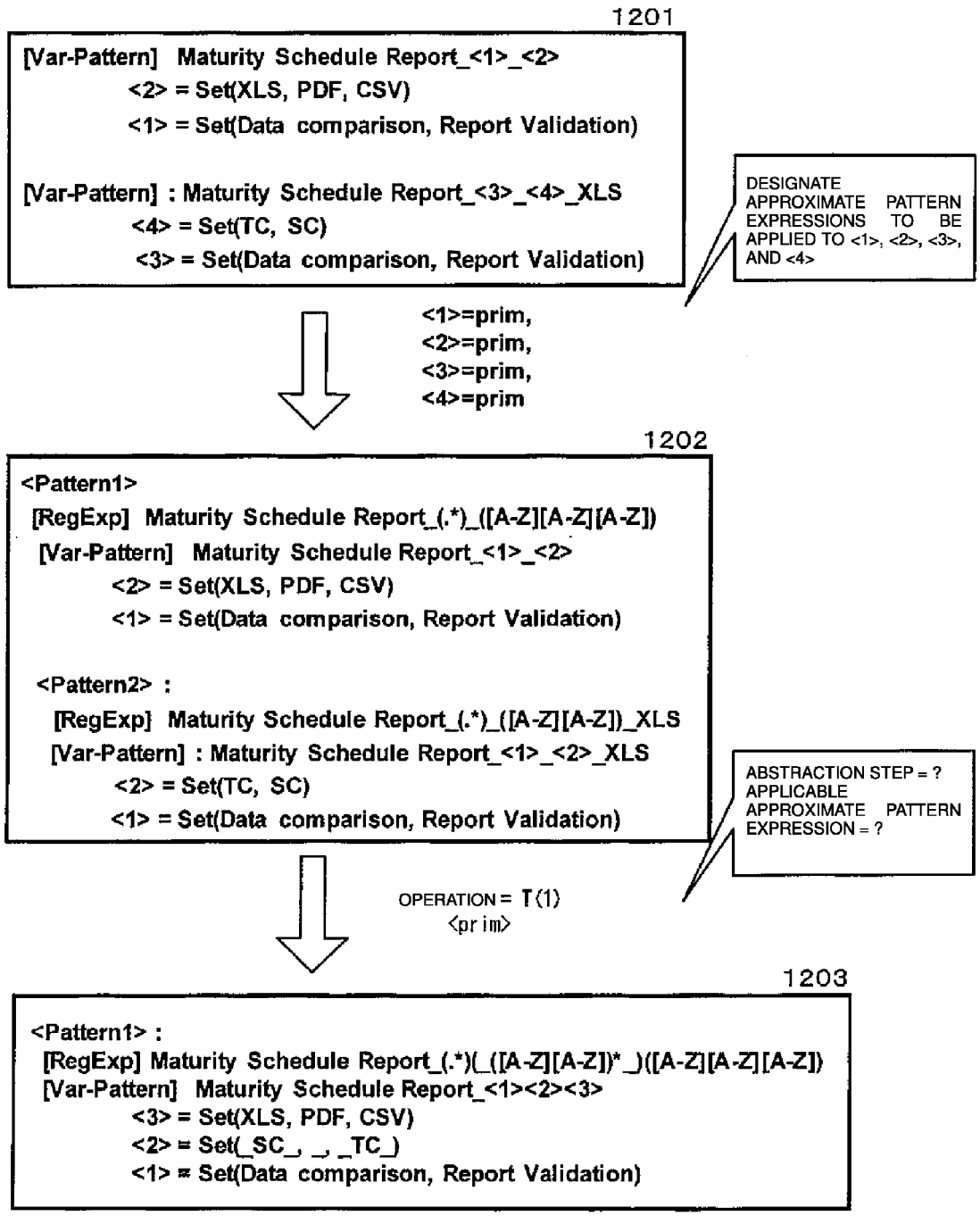
FIG. 12A shows an interaction feature for inferring a regular expression in a user-interactive manner according to the embodiment of the present invention, in regular expression inference processing performed in such a manner that sets of input strings change from a specific regular expression to an abstract regular expression step by step.

FIGS. 12A and 12B show an interaction feature for inferring a regular expression in a user-interactive manner according to the embodiment of the present invention, in regular expression inference processing performed in such a manner that sets of input strings change from a specific regular expression to an abstract regular expression step by step. The interaction feature includes Features A to D. Features A to D will be described below.

Feature A enables the user viewing a "regular expression candidate" presented to the user: (1) to select or designate stepwise abstraction steps (the operation S or the operation T); and (2) to select or designate an approximate pattern expression to be applied to a part <k> (an approximation target part) in a variation pattern. In Feature A, user input 1 includes a parameter k (k in k-bound, i.e., the path length regarded as the same) of the operation S and a parameter n (the number of repetition of the operation T) of the operation T, and a user input 2 includes an approximate pattern expression to be applied to an approximation target part. A default approximate pattern expression can be an approximate pattern expression <prim> corresponding to prim which is a basic function of a regular expression inference function. In processing of Feature A, the operation S is executed on the current finite automation by using k (the user input 1), and then the operation T is executed n times (the user input 1) thereon. An approximate pattern expression (the user input 2) is then applied to an approximation target part in a variation pattern acquired in each step of the operation T, and thereby a regular expression candidate is acquired.

Feature B enables the user to select or designate, among approximate pattern expressions presented to the user, an approximate pattern expression to be applied to "a variation pattern explicitly showing an approximation target part" for each approximation target part. In Feature B, user input includes approximate pattern expressions α1, α2, . . . to be applied to approximation target parts. In processing of Feature B, the approximation target part is presented to the user, and thus the selected or designated one of the approximate pattern expressions α1, α2, . . . is applied to the approximation target part. Feature C enables an approximate pattern expression acquired in the stepwise inference or in a particular inference step to be searched for by using a particular condition. In Feature C, user input includes designation of the operation S (including k) or the operation T (including the parameter), an approximate pattern expression, a regular expression set as reg for an approximation target part, and the number n of variation patterns (n is an integer). In processing of Feature C, searching is performed on sets of regular expressions inferred in the stepwise inference in steps of a designated operation: to find a sub-pattern including the regular expression reg (for example, to find a regular expression including <[A-Z][A-Z]¥d¥d> shown in FIG. 10D); or to find an expression having the number of variation patterns of n or smaller.

Feature D abstracts or makes specific a finite state automaton while fixing a particular part of a regular expression presented to the user (for example, fixing a part of <[A-Z][A-Z]¥d¥d> shown in FIG. 10D). Abstracting or making specific a finite state automaton leads to abstracting or making specific a regular expression. Making specific a regular expression is, for example, specifically describing the part <[A-Z][A-Z]¥d¥d> shown in FIG. 10D to <[A-Z][A-Z](3|4|5)(0|3|1). In Feature D, user input includes a fixed particular part of a regular expression or designation thereof, for example, designation of the operation S (including k) or the operation T (including a parameter n), and an approximate pattern expression. In processing of Feature D, a finite state automaton is abstracted or made specific in accordance with the operation designation of which is inputted by the user, while a particular part of a regular expression designated by the user is fixed.

FIG. 12A exemplifies Features A and B.

A screen (1201) shows variation patterns (1201). The variation patterns (1201) show two variation patterns. One of the variation patterns has approximation target parts <1> and <2>, and the other has approximation target parts <3> and <4>. A dialog implementing unit (not shown) prompts the user to select or type approximate pattern expressions for approximating <1>, <2>, <3>, and <4>. The dialog implementing unit displays a message, for example, "Designate approximate pattern expressions to be applied to <1>, <2>, <3>, and <4>" on the display unit (206). The messaging corresponds to Feature B. In response to the message, for each of <1>, <2>, <3>, and <4>, the user can select an approximate pattern expression that the user wishes to apply, for example, from a list of approximate pattern expressions or type the approximate pattern expression. The user selects an approximate pattern expression <prim> for all of <1>, <2>, <3>, and <4>.

A screen (1202) shows regular expression candidates [RegExp] acquired by applying the approximate pattern expression <prim> to each of <1>, <2>, <3>, and <4>. The screen (1202) also shows variation patterns. The dialog implementing unit displays a message, for example, "Abstraction step=?, applicable approximate pattern expression=?" on the display unit (206). The messaging corresponds to Feature A. In response to the message, the user selects "Operation=T(1)" and selects or types the approximate pattern expression <prim>. "Operation=T(1)" means that the abstraction processing in the operation T is performed once.

A screen (1203) shows: a variation pattern for a finite state automaton acquired by performing the operation T once on a finite state automaton corresponding to the variation patterns shown on the screen (1202); and a regular expression acquired by applying the approximate pattern expression <prim> to the approximation target part in the variation pattern for the finite state automaton acquired by applying the operation T.

FIG. 12B exemplifies Features C and D. Reference numeral 1211 in FIG. 12B denotes a history of finite state automatons in the process of abstraction (inference) performed by using the operations S and T. "Merging based on sub-string arrangement" represents the operation S, and "Merging based on sub-string location" represents the operation T. Reference letter FA denotes a finite state automaton. Reference numeral 1212 in FIG. 12B denotes a regular expression store inferred according to the history of the finite state automatons (1211). The arrows (1221) in the regular expression store (1212) show that by using Feature C, the user designates a particular sub-pattern and thereby all the regular expressions including the designated sub-pattern are acquired. Reference letters RE denoted by 1232, 1233, and 1234 denote acquired regular expressions. The arrow (1231) in the regular expression store (1212) shows that by using Feature D, the user fixes the particular sub-pattern and the processing is moved back from the fixed sub-pattern.

FIG. 13 shows regular expressions generated according to the embodiment of the present invention when sets of input strings are processed interactively in such a manner as to be changed from a specific regular expression to an abstract regular expression step by step. A screen (1301) shows sets of input strings. The sets of input strings are the same as the sets of input strings shown in the sub-window (1022) in FIG. 10A. A screen (1302) shows: variation patterns [Var-Pattern] acquired by abstracting sets of strings in the operation S and then the operation T according to the embodiment of the present invention; and regular expressions [Reg-Exp] acquired by applying the approximate pattern expression <prim> to each approximation target part in each of the variation patterns [Var-Pattern]. The regular expressions shown on the screen (1302) are provided for processing to be performed in such a manner that strings which begin with Sc<number(s)>, Sc<English character(s)>, and Rp are discriminated from each other. A screen (1303) shows: variation patterns acquired by abstracting the sets of strings to a one-level higher level in the operation T according to the embodiment of the present invention; and regular expressions [Reg-Exp] acquired by applying an approximate pattern expression to each approximation target part in each of the variation patterns. It should be noted that the variation patterns shown on the screen (1303) exemplify abstraction by using a different method (using a different approximate pattern expression) from the operation-T abstraction processing in Embodiment 1. The regular expressions shown on the screen (1303) can be provided for, for example, processing to be performed in such a manner that files in a folder are sorted based on the strings "Sc" and "Rp". A screen (1304) shows an approximate pattern expression representing the regular expression inference method implemented on the screen (1303) according to the embodiment of the present invention. The approximate pattern expression on the screen (1304) builds up an approximate pattern expression (i.e., a regular expression inference function) expressing the method for inferring the regular expressions shown as [Reg-Exp] on the screen (1303) from the sets of strings shown on the screen (1301). The approximate pattern expression is reusable in abstracting sets of input strings other than the sets of input strings shown on the screen (1301).

FIG. 14 shows regular expression patterns generated according to the embodiment of the present invention when sets of input strings are processed interactively in such a manner as to be changed from a specific regular expression to an abstract regular expression step by step. A screen (1401) shows sets of input strings. The sets of input strings are the same as the sets of input strings (411) shown in the sub-window in FIG. 4. A screen (1402) shows: variation patterns [Var-Pattern] acquired by abstracting sets of strings in the operation S and then the operation T according to the embodiment of the present invention; and regular expressions [Reg-Exp] acquired by applying the approximate pattern expression <prim> to each approximation target part in each of the variation patterns [Var-Pattern]. The regular expression shown on the screen (1402) can be provided, for example, for automating separate processing of files in a folder by sorting the files. A screen (1403) shows: variation patterns acquired by abstracting the sets of strings to one-level higher level in the operation T according to the embodiment of the present invention; and regular expressions [Reg-Exp] acquired by applying an approximate pattern expression to each approximation target part in each of the variation patterns. The regular expressions shown on the screen (1403) can be provided for, for example, processing of extracting data format (XLS, PDF or CSV) from files in a folder (for example, test cases and documents for explaining the test cases). A screen (1404) shows an approximate pattern expression representing the regular expression inference method implemented on the screen (1403) according to the embodiment of the present invention. The approximate pattern expression on the screen (1404) builds up an approximate pattern expression (i.e., a regular expression inference function) expressing the method for inferring the regular expression shown as [Reg-Exp] on the screen (1403) from the sets of strings shown on the screen (1401). The approximate pattern expression is reusable in abstracting sets of input strings other than the sets of input strings shown on the screen (1401).

In another embodiment, processing of transforming sets of input strings (file names comprising strings of Japanese characters (including kanji and katakana characters), English characters and numbers) to an approximate pattern expression stepwise will be described by using screen examples shown in FIGS. 15A to 15U. FIGS. 16A to 16F respectively show finite state automatons generated in Embodiment 2. FIG. 15V exemplifies a screen showing that a regular expression inference function stored in the regular expression inference function store (215) in the processing in Embodiment 2 is reusable in processing of transforming sets of input strings to an approximate pattern expression step by step in a case other than Embodiment 2.

Figure 15A:
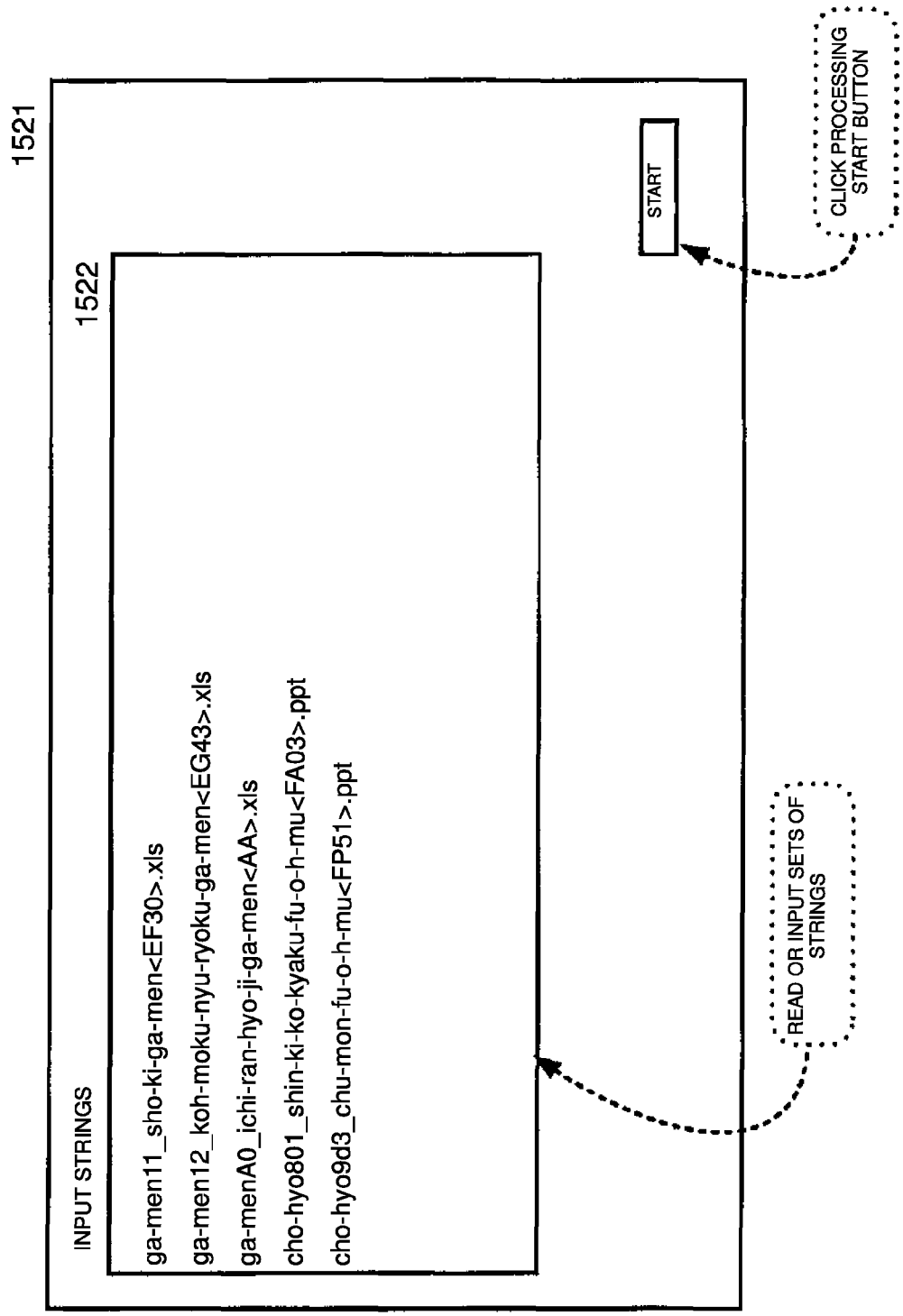
FIG. 15A shows Embodiment 2 which is an embodiment of the present invention, and exemplifies a screen for starting processing of generating the first finite state automaton from inputted sets of strings.
Figure 16A:
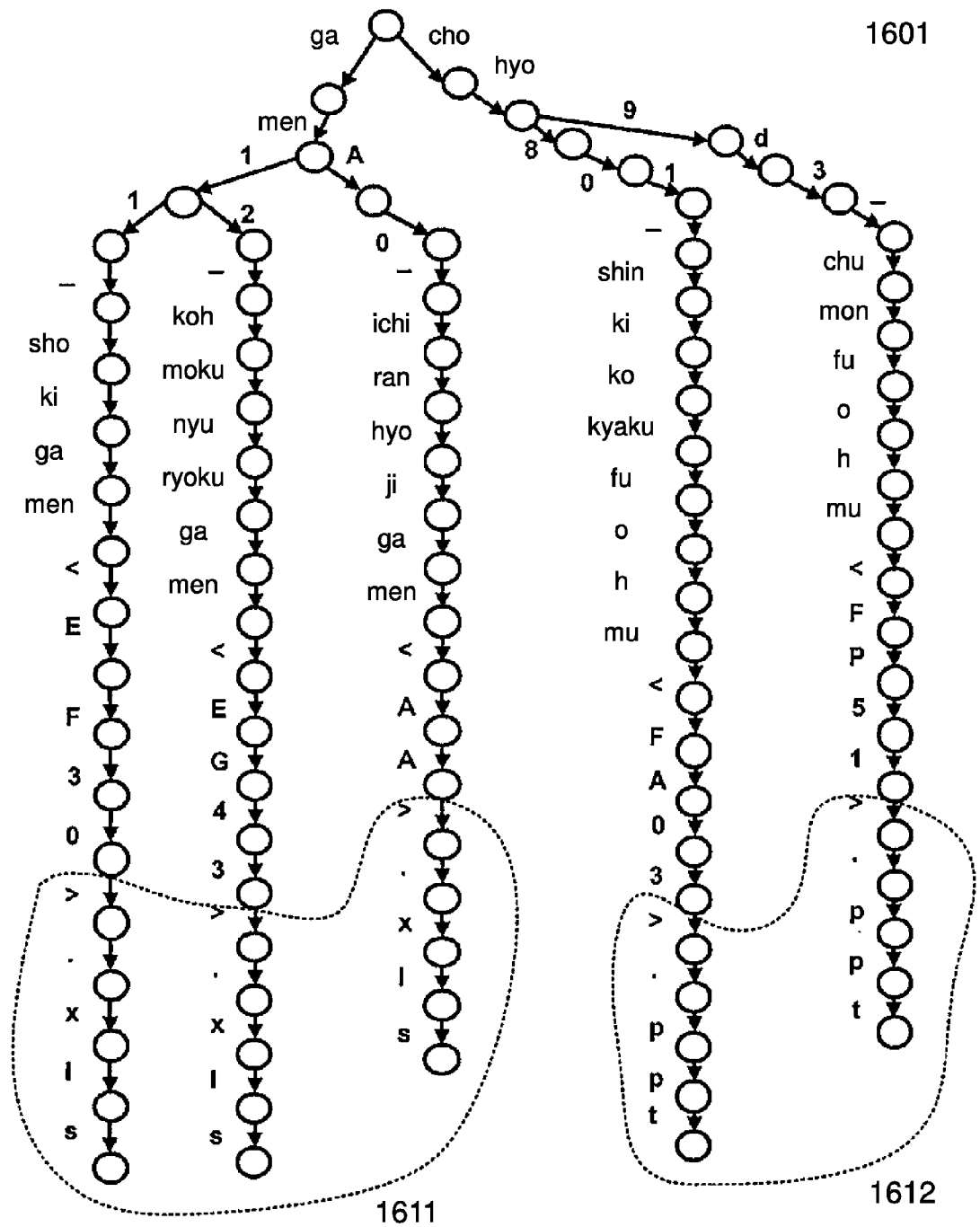
FIG. 16A shows Embodiment 2 which is the embodiment of the present invention, and shows the finite state automaton firstly generated by the abstraction processing in FIG. 15A.

FIG. 15A exemplifies a screen for inputting sets of strings to start processing of generating the first finite state automaton from the inputted sets of strings. The user sends the computer (201), for example, an instruction (not shown) for reading a file having a name including any of the sets of strings (212) from the storage unit (211). In response to the instruction, the first generator (202-1) reads a file including any of the sets of strings (212) from the storage unit (211) (the processing in Step 1). Then, the display unit (206) displays the read sets of strings (212) in a predetermined sub-window (1522) on the screen. The example in FIG. 15A shows the number of sets of input strings of 5. The sets of strings are examples of file names in a folder. The user clicks a "Start" button in a window (1521) to instruct the computer (201) to start the processing of transforming sets of input strings to an approximate pattern expression. The first generator (202-1) generates one finite state automaton in the memory (103) from the sets of input strings read in the processing in Step 1 (the processing in Step 2). FIG. 16A shows a finite state automaton (1601) generated in the processing in Step 2.

Figure 15B:
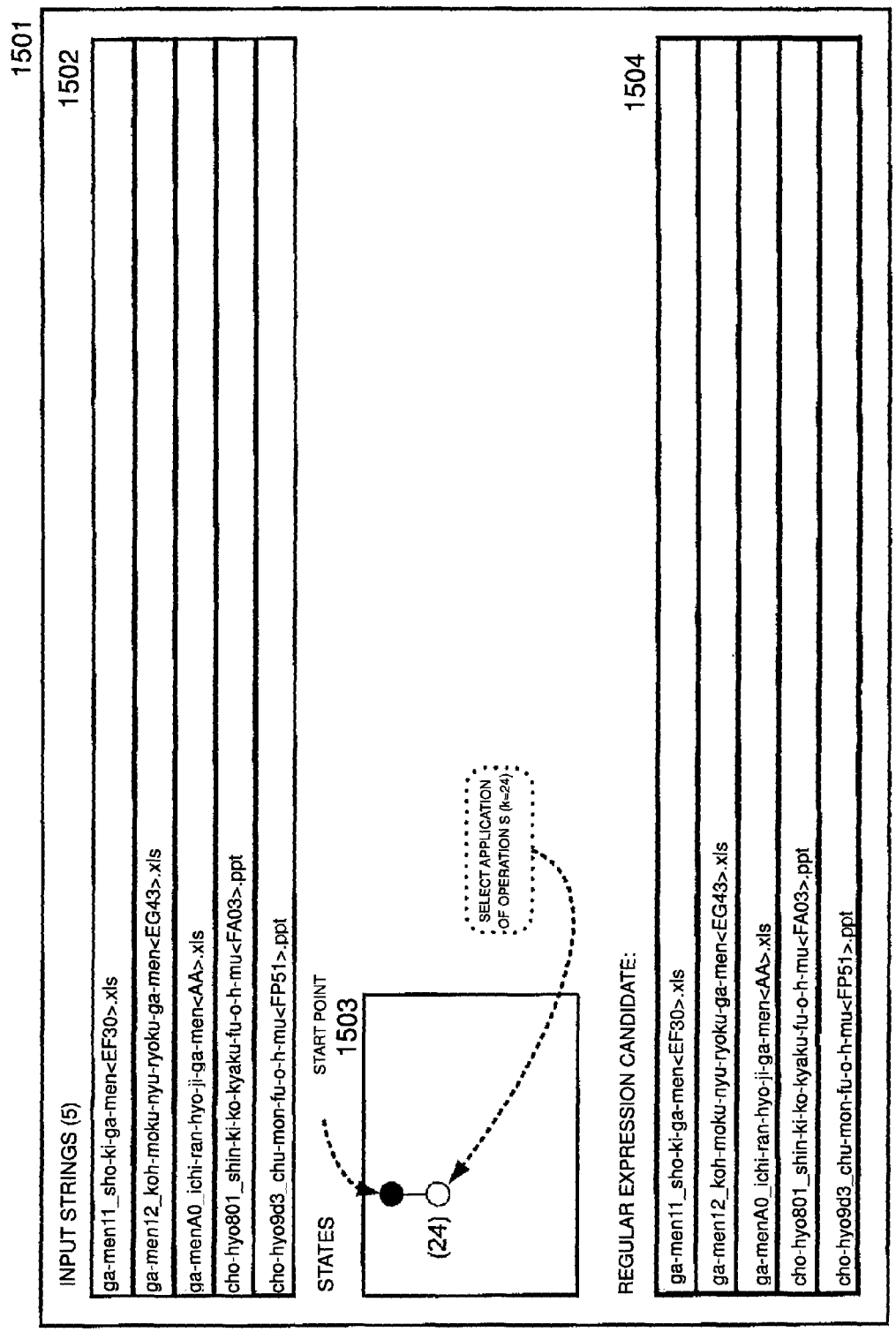
FIG. 15B shows Embodiment 2 which is the embodiment of the present invention, and exemplifies a screen showing an operation for starting operation-S abstraction processing on the finite state automaton which is generated by the processing in FIG. 15A and is shown in FIG. 16A to be described below.

FIG. 15B exemplifies a screen showing an operation for starting the operation-S abstraction processing on the finite state automaton (1601) shown in FIG. 16A. The display unit (206) displays, in a window (1501), sets of input strings (1502) as well as 5 which is the number of the sets of input strings (1502), states (1503) in the processing of transforming sets of input strings to an approximate pattern expression, and regular expression candidates (1504).

A circle annotated by a string of a "start point" in the states (1503) shows a start point in the abstraction processing in Embodiment 1. A black circle shows a location of abstraction processing completed immediately before the abstraction processing to be started. In FIG. 15B, the start point is shown by the black circle. This means that the first finite state automaton (1601) has been generated already, that is, the processing in Step 2 has been completed already. A circle below a black circle shows that the operation-S abstraction processing can be performed on a finite state automaton. It should be noted that a white circle located on the right side of the black circle (not shown in FIG. 15B) shows that the operation-T abstraction processing can be performed on a finite state automaton. FIG. 15B shows one circle below the black circle (the start point). The white circle below the black circle shows that the user can select the operation-S abstraction processing on the finite state automaton (1601).

When wishing to apply the operation-S abstraction processing to the finite state automaton (1601), the user clicks the white circle in the states (1503) with the mouse to instruct the computer (201) to start the operation-S abstraction processing on the finite state automaton (1601). The number (24) on the left side of the white circle represents the maximum number of input strings (the maximum path length) in the finite state automaton (1601) before the first operation-S abstraction processing is performed. After the first operation-S abstraction processing is completed, k is decreased from the first maximum number of input strings, and does not always represent the maximum number of input strings. The smaller k, the larger the degree of operation-S abstraction. Decreasing k step by step means abstraction performed step by step.

Figure 16B:
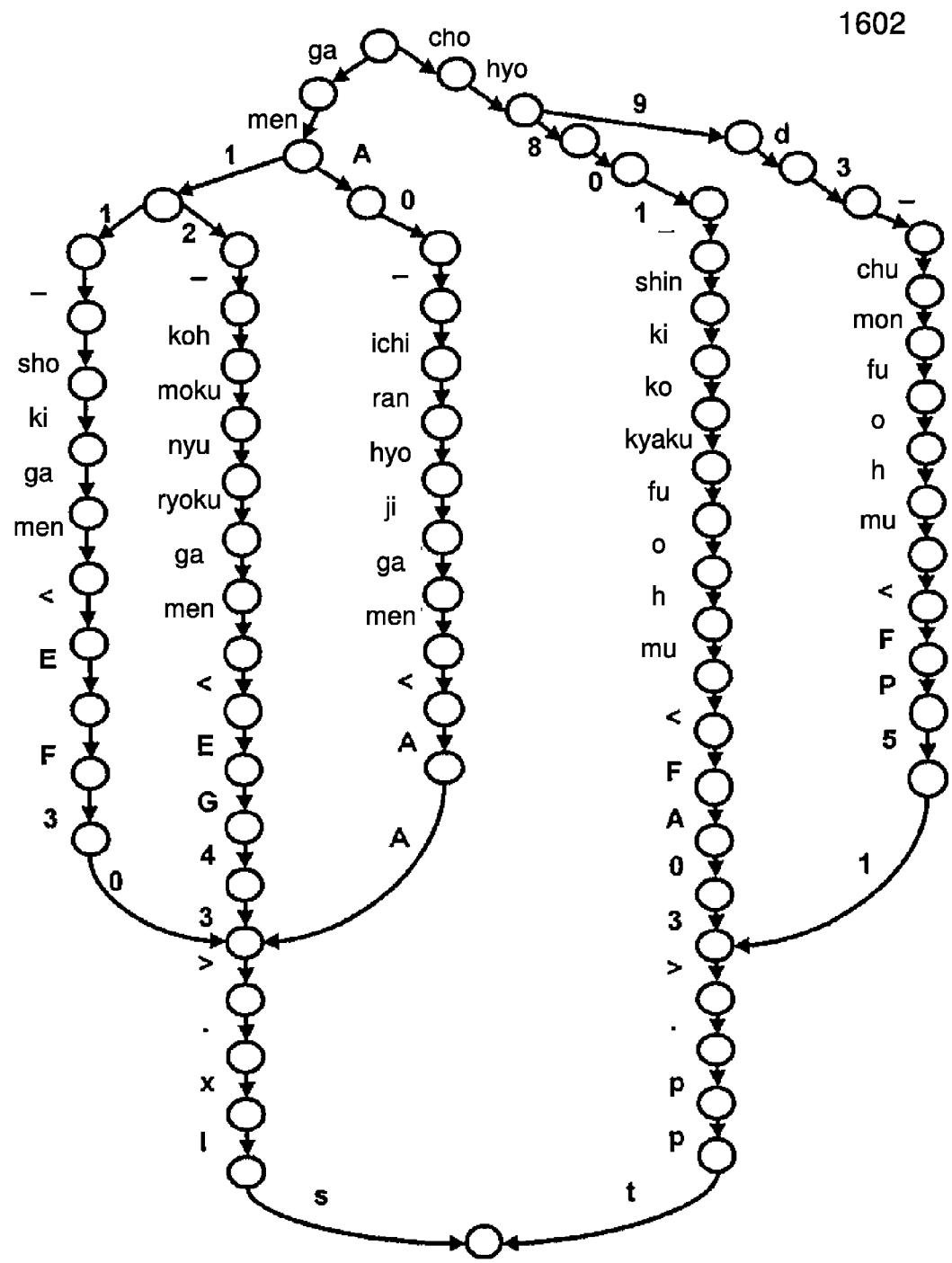
FIG. 16B shows Embodiment 2 which is the embodiment of the present invention, and shows the reduced finite state automaton generated by the abstraction processing in FIG. 15B.

Upon receipt of the instruction for starting the operation-S abstraction processing, the third generator (202-3) performs the operation-S abstraction processing on the finite state automaton (1601). In the operation-S abstraction processing, the third generator (202-3) merges states (portions denoted by reference numerals 1611 and 1612) having a common path in the finite state automaton (1601) shown in FIG. 16A to generate a reduced finite state automaton in the memory (103) (the processing in Step 3). The common path denoted by reference numeral 1611 has a set of common label strings which are >.xls. The common path denoted by reference numeral 1612 has a set of common label strings which are >.ppt. FIG. 16B shows a finite state automaton (1602) generated in the processing in Step 3. In the finite state automaton (1602), sets of transitions owned by the set of label strings of the common path are merged, and sets of states included in the sets of transitions are merged (">.xls" in the portion of reference numeral 1611 and ">.ppt" in the portion of reference numeral 1612).

In FIG. 15B, the regular expression candidates are the same as the input strings themselves. This is because the finite state automaton (1601) shown in FIG. 16A has not been abstracted yet.

Figure 15C:
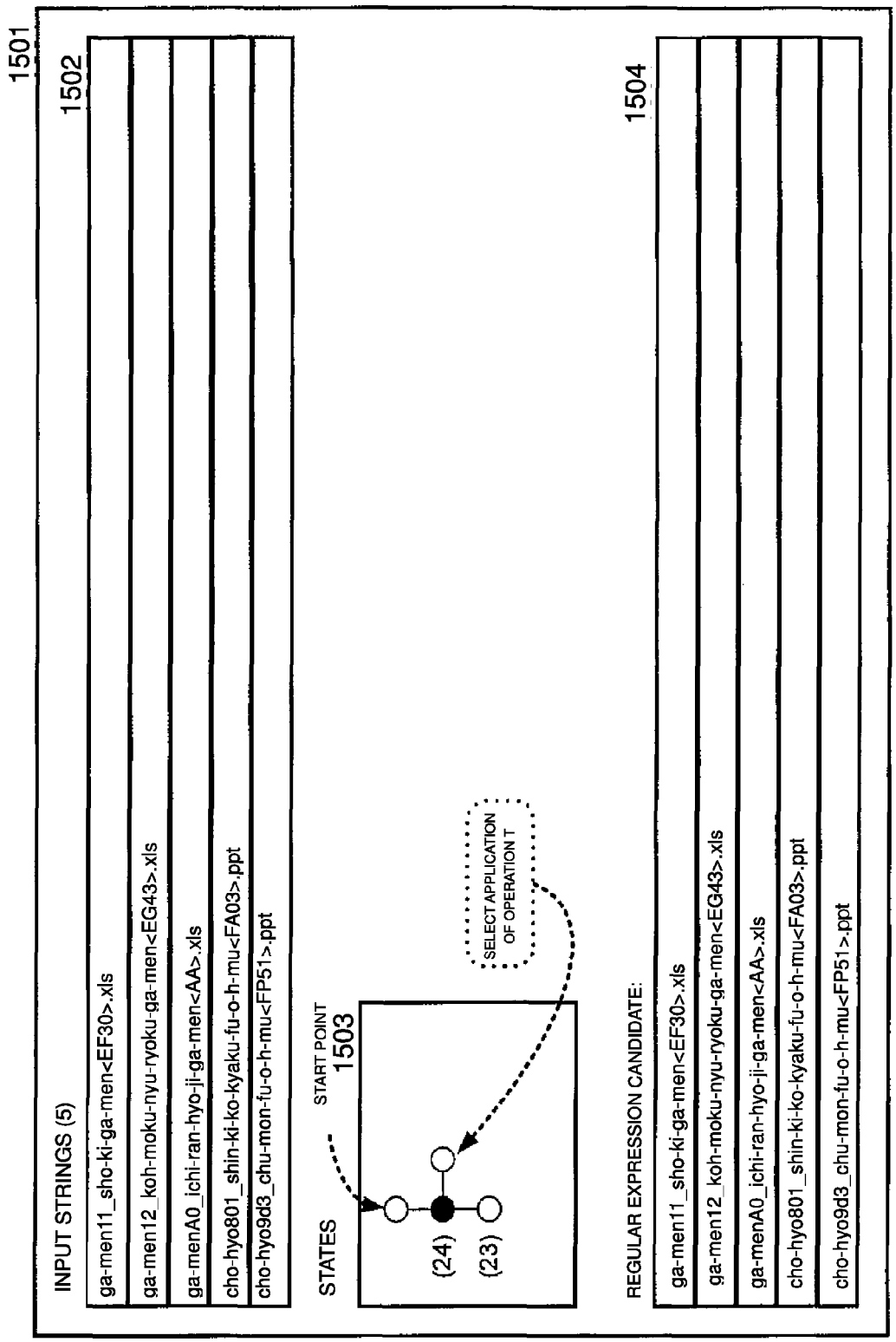
FIG. 15C shows Embodiment 2 which is the embodiment of the present invention, and exemplifies a screen showing an operation for starting the (first) operation-T abstraction processing on the finite state automaton which is generated by the processing in FIG. 15B and is shown in FIG. 16B to be described below.

FIG. 15C exemplifies a screen showing an operation for starting the (first) operation-T abstraction processing on the finite state automaton (1602) shown in FIG. 16B. The black circle in the states (1503) shows the location of the operation-S abstraction processing (Step 3) which is the abstraction processing completed immediately before the abstraction processing to be started. In FIG. 15C, a black circle is present directly below the start point. This shows that a reduced finite state automaton has been generated by applying the operation S to the first finite state automaton, that is, the processing in Step 3 has been completed. The white circle below the black circle shows that the operation-S abstraction processing can be performed on the finite state automaton, while the white circle on the right side of the black circle shows that the operation-T abstraction processing can be performed on the finite state automaton.

When wishing to apply the operation-T abstraction processing to the finite state automaton (1602), the user clicks the white circle on the right side of the black circle in the states (1503) to instruct the computer (201) to start the operation-T abstraction processing on the finite state automaton (1602).

Figure 16C:
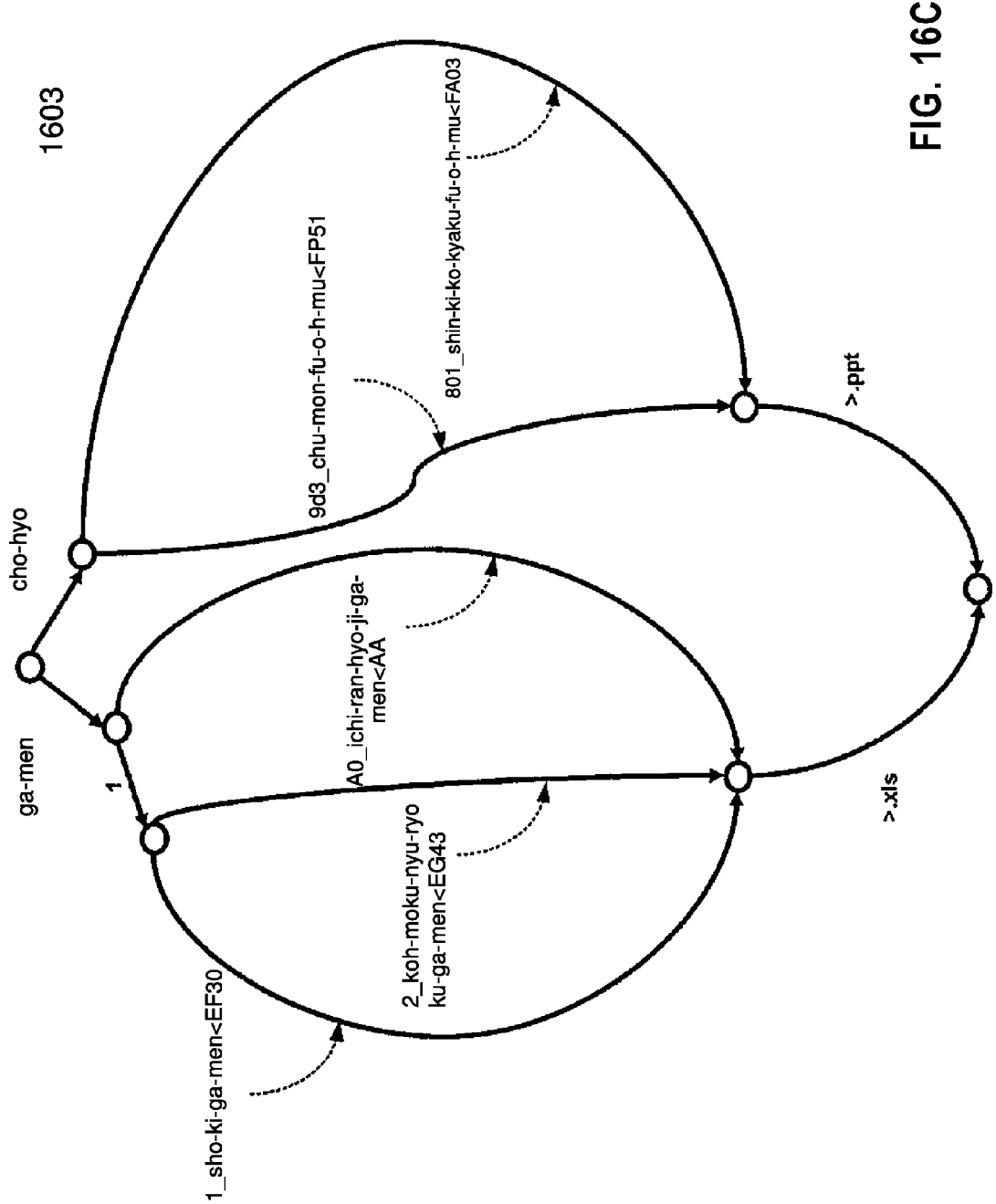
FIG. 16C shows Embodiment 2 which is the embodiment of the present invention, and shows the finite state automaton (FIG. 16D to be described below) in the course of generation by the abstraction processing in FIG. 15C.
Figure 16D:
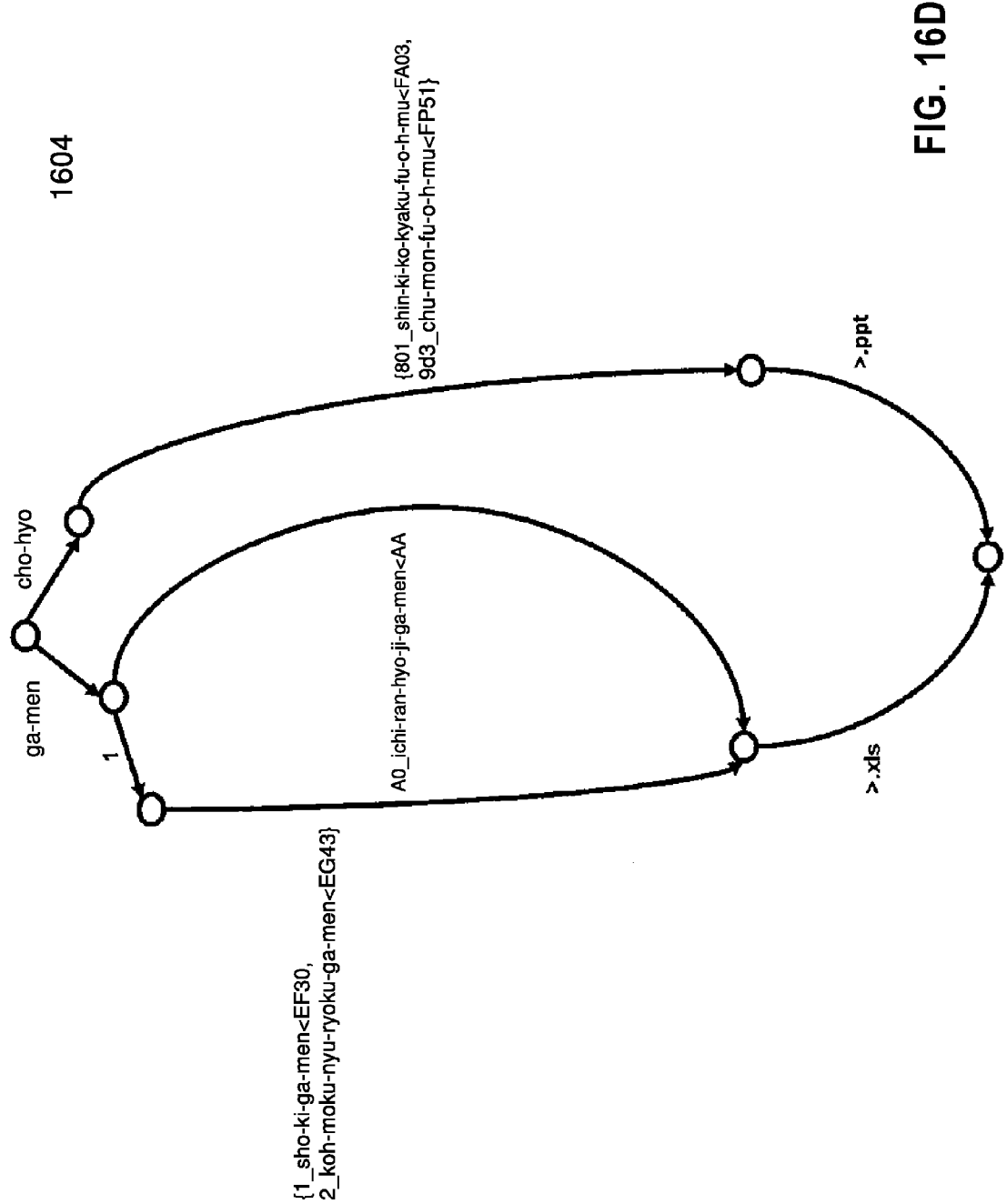
FIG. 16D shows Embodiment 2 which is the embodiment of the present invention, and shows the finite state automaton generated by the abstraction processing in FIG. 15C.

Upon receipt of the instruction for starting the operation-T abstraction processing, the second generator (202-2) performs the operation-T abstraction processing on the finite state automaton (1602). In the operation-T abstraction processing, the second generator (202-2) removes states in the finite state automaton (1602) shown in FIG. 16B, and merges edges to generate a reduced finite state automaton in the memory (103) (the processing in Step 4). FIG. 16C shows a finite state automaton (1603) in the course of generating a finite state automaton (1604 in FIG. 16D) by the processing in Step 4. FIG. 16D shows the finite state automaton (1604) generated in the (first) processing in Step 4.

FIG. 15D exemplifies a screen showing an operation for determining, to acquire a regular expression candidate from the finite state automaton (1604) generated in the operation-T abstraction processing shown in FIG. 15C, approximate pattern expressions applicable to parts <1> and <2>, respectively, in variation patterns generated from the finite state automaton (1604). After the operation T shown in FIG. 15C is completed, the display unit (206) displays, in the window (1501), the sets of input strings (1502) as well as the number of the sets of input strings (1502) which is "5", the states (1503) in the processing of transforming sets of input strings into an approximate pattern expression stepwise, and the regular expression candidates (1504). In addition to these, the display unit (206) displays variation patterns (1505) and default approximate pattern expressions (1506) each applicable to a corresponding part <k> in the variation patterns (1505).

The user clicks a button for selecting an approximate pattern expression with the mouse to start the processing of determining, in accordance with the flowchart shown in FIG. 9A, an approximate pattern expression applicable to the part <k> in the variation patterns (1505) when the part <k> is focused. FIG. 15D shows that the variation patterns (1505) have the parts <1> and <2>. For each of the parts <1> and <2>, <prim> designated as a default approximate pattern expression is firstly displayed. Here, prim is (the name of) a regular expression inference function, and <prim> is an approximate pattern expression.

The user clicks the Select button associated with the part <1> with the mouse to start the processing of determining an approximate pattern expression applicable to the part <1>. In response to the click on the Select button, the approximate pattern expression determination program runs, so that a subwindow (1523) shown in FIG. 15F appears.

FIG. 15D also shows the variation patterns (1505) of the finite state automaton (1604) shown in FIG. 16D as well as the regular expression candidates (1504) at present. The regular expression candidates (1504) at present indicate regular expression candidates acquired by inference by using the approximate pattern expressions <prim> and <prim> (1506) applicable to the respective parts <1> and <2> in the variation patterns (1505) shown in FIG. 15D when the part <1> or <2> is focused.

Figure 15E:
FIG. 15E shows Embodiment 2 which is the embodiment of the present invention, and shows one of the variation patterns shown in FIG. 15D.

FIG. 15E shows: a variation pattern (1541) in the case of focusing the part <1> among the variation patterns (1505) shown in FIG. 15D; and the approximate pattern expressions <prim> and <choice> currently existing in the approximate pattern expression store (1542). When the part <1> in the variation pattern (1541) is focused, the processing of determining an approximate pattern expression applicable to the part <1> is performed in the following manner.

Step 1: The expression generator (203) sets as candidates approximate pattern expressions <prim> (1542-1) and <choice> (1542-2) in the approximate pattern expression store (1542). Since the approximate pattern expression store (1542) does not store any approximate pattern expression matching every sub-string in a set of sub-strings grouped by the part <1>, no approximate pattern expression other than the above expressions is set as a candidate at this time.

Step 2: The expression generator (203) assigns, to reg_v, a regular expression which is Sc(.*)>.xls acquired by replacing the part <1> with (.*).

Step 3: The expression generator (203) performs matching of the regular expression reg_v with each of the approximate pattern expressions (1542-1 and 1542-2) corresponding to the basic functions currently existing in the approximate pattern expression store (1542). However, neither of the approximate pattern expressions matches the regular expression Sc(.*)>.xls. Thus, the approximate pattern expressions applicable to the part <1> are <prim> and <choice> only. Accordingly, the display unit (206) displays the two approximate pattern expressions <prim> and <choice> only as the approximate pattern expression candidates for the part <1> (see FIG. 15F).

Figure 15F:
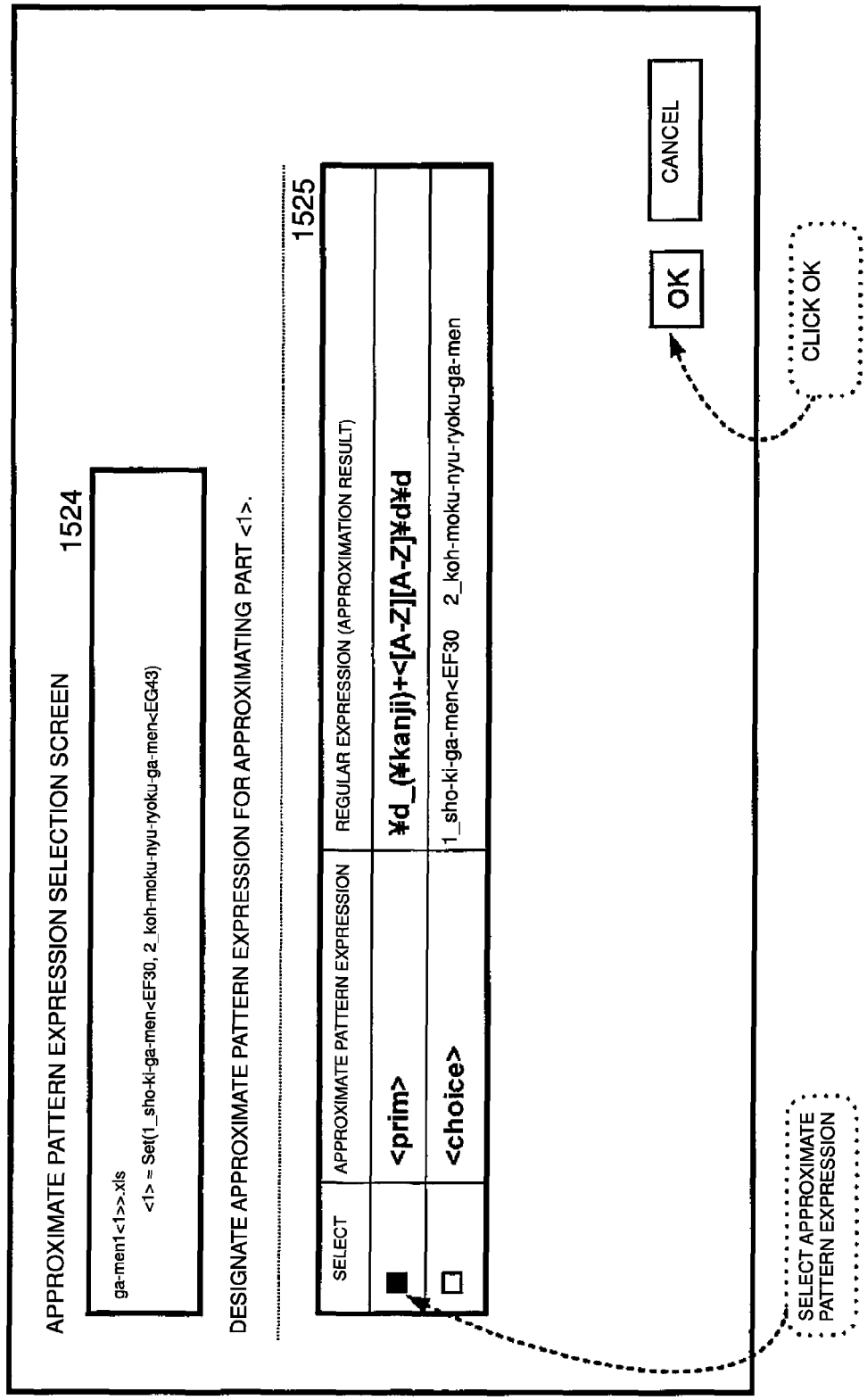
FIG. 15F shows Embodiment 2 which is the embodiment of the present invention, and exemplifies a screen showing processing of enabling a user to select an approximate pattern expression among approximate pattern expressions determined to be applicable when the approximation target part of the variation pattern shown in FIG. 15E is focused.

FIG. 15F exemplifies a screen showing processing for enabling the user to select an approximate pattern expression among approximate pattern expressions determined to be applicable to the part <1> when the part <1> of the variation pattern (1505) shown in FIG. 15E is focused. Specifically, FIG. 15F shows that the approximate pattern expressions applicable to the part <1> are <prim> and <choice> (1525). FIG. 15F also shows regular expressions (i.e., approximation results) matching the respective approximate pattern expressions applicable to the part <1>. The user can select one of the approximate pattern expressions (1525) applicable to the part <1>. When wishing to select the approximate pattern expression <prim>, the user clicks the Select button on the left side of the approximate pattern expression <prim> and then the OK button. In response to the click on the OK button, a regular expression candidate (1504) including a regular expression matching the selected approximate pattern expression <prim> is displayed in the window (1501) as shown in FIG. 15G.

The user also selects <prim> for the part <2> as an approximate pattern expression applicable to the part <2> (not shown). In response to the selection, the window (1501) shows a regular expression candidate (1504) including a regular expression acquired by inferring the part <2> by using a regular expression inference function using the approximate pattern expression <prim>.

Figure 15G:
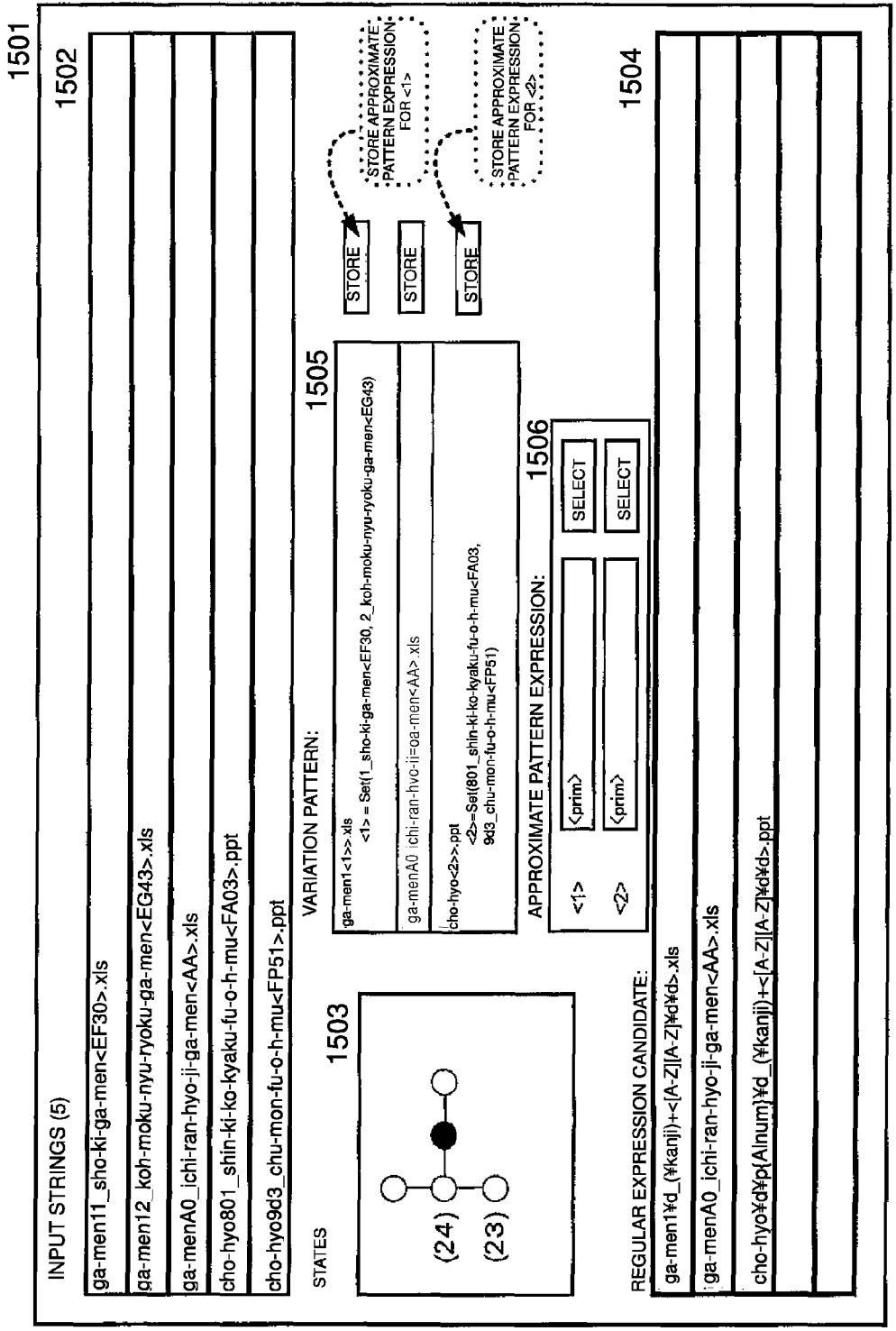
FIG. 15G shows Embodiment 2 which is the embodiment of the present invention, and exemplifies a screen showing processing for storing, in the approximate pattern expression store, an approximate pattern expression generated from a finite state automaton generated in the processing shown in FIG. 15C.

FIG. 15G exemplifies a screen showing processing for storing, in the approximate pattern expression store (1542), the approximate pattern expressions generated from the finite state automaton generated in the processing shown in FIG. 15C. Specifically, FIG. 15G shows that the approximate pattern expressions (1506) acquired by applying the approximate pattern expression <prim> to each of the parts <1> and <2> (<1>=<prim> and <2>=<prim>) in the variation patterns (1505) are stored in the approximate pattern expression store (1542), the variation patterns (1505) being acquired from the finite state automaton generated by performing the operation S (k=24) (FIG. 15B) and the (first) operation T (FIG. 15C).

When wishing to store, in the approximate pattern expression store (1542), the approximate pattern expression which is Sc1<prim>>.xls acquired by applying the approximate pattern expression <prim> to the part <1>, the user clicks a Store button with the mouse. In response to the click on the Store button, a sub-window (1526) shown in FIG. 15H appears.

In addition, when wishing to store, in the approximate pattern expression store (1542), an approximate pattern expression which is Rp<prim>>.ppt acquired by applying the approximate pattern expression <choice> to the part <2>, the user clicks the Store button with the mouse. In response to the click on the Store button, the sub-window (1526) shown in FIG. 15H appears.

Figure 15H:
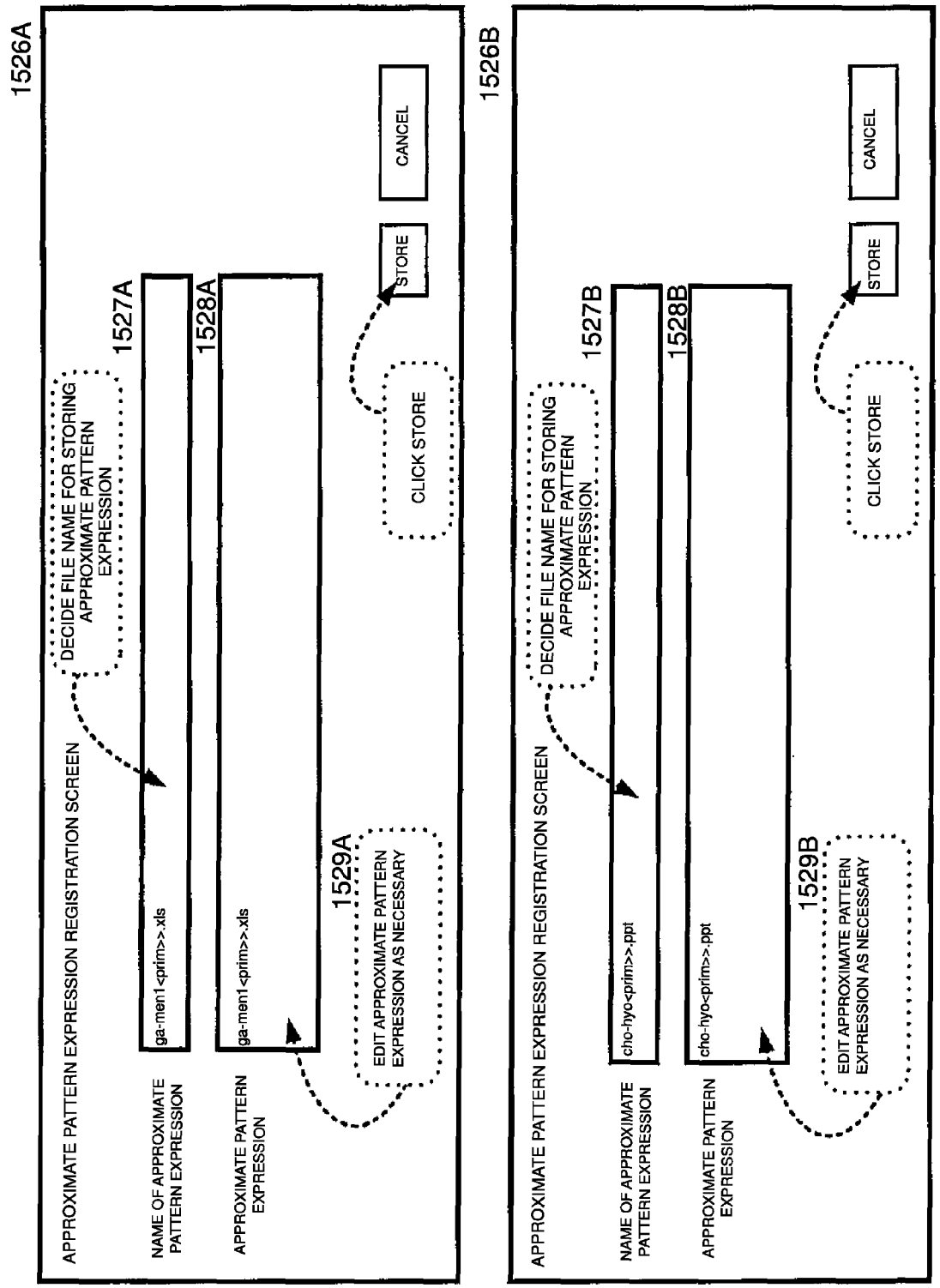
FIG. 15H shows Embodiment 2 which is the embodiment of the present invention, and exemplifies screens showing processing for storing the approximate pattern expression in FIG. 15F in the approximate pattern expression store and processing for editing the approximate pattern expression.

FIG. 15H exemplifies screens each showing processing for storing the selected approximate pattern expression in FIG. 15F in the approximate pattern expression store (1542) and processing for editing the approximate pattern expression.

A sub-window (1526A) shows an example of storing the approximate pattern expression Sc1<prim>>.xls in FIG. 15G in the approximate pattern expression store (1542). To store the approximate pattern expression Sc1<prim>>.xls as a file, the user types a file name for the approximate pattern expression. Alternatively, the computer (201) can display in advance a file name for the approximate pattern expression automatically acquired from the approximate pattern expression. In addition, the user can edit the approximate pattern expression Sc1<prim>>.xls (1529A). After the editing, the user can store the edited approximate pattern expression in the approximate pattern expression store (1542). When storing the approximate pattern expression, the user can click the Store button with the mouse. In response to the click on the Store button, the approximate pattern expression Sc1<prim>>.xls is stored in the approximate pattern expression store (1542).

A sub-window (1526B) shows an example of storing the approximate pattern expression Rp<prim>>.ppt in FIG. 15G in the approximate pattern expression store (1542). To store the approximate pattern expression Rp<prim>>.ppt as a file, the user types a file name for the approximate pattern expression. Alternatively, the computer (201) can display in advance a file name for the approximate pattern expression automatically acquired from the approximate pattern expression. In addition, the user can edit the approximate pattern expression Rp<prim>>.ppt (1529B). After the editing, the user can store the edited approximate pattern expression in the approximate pattern expression store (1542). When storing the approximate pattern expression, the user can click the Store button with the mouse. In response to the click on the Store button, the approximate pattern expression Rp<prim>>.ppt is stored in the approximate pattern expression store (1542).

Figure 15J:
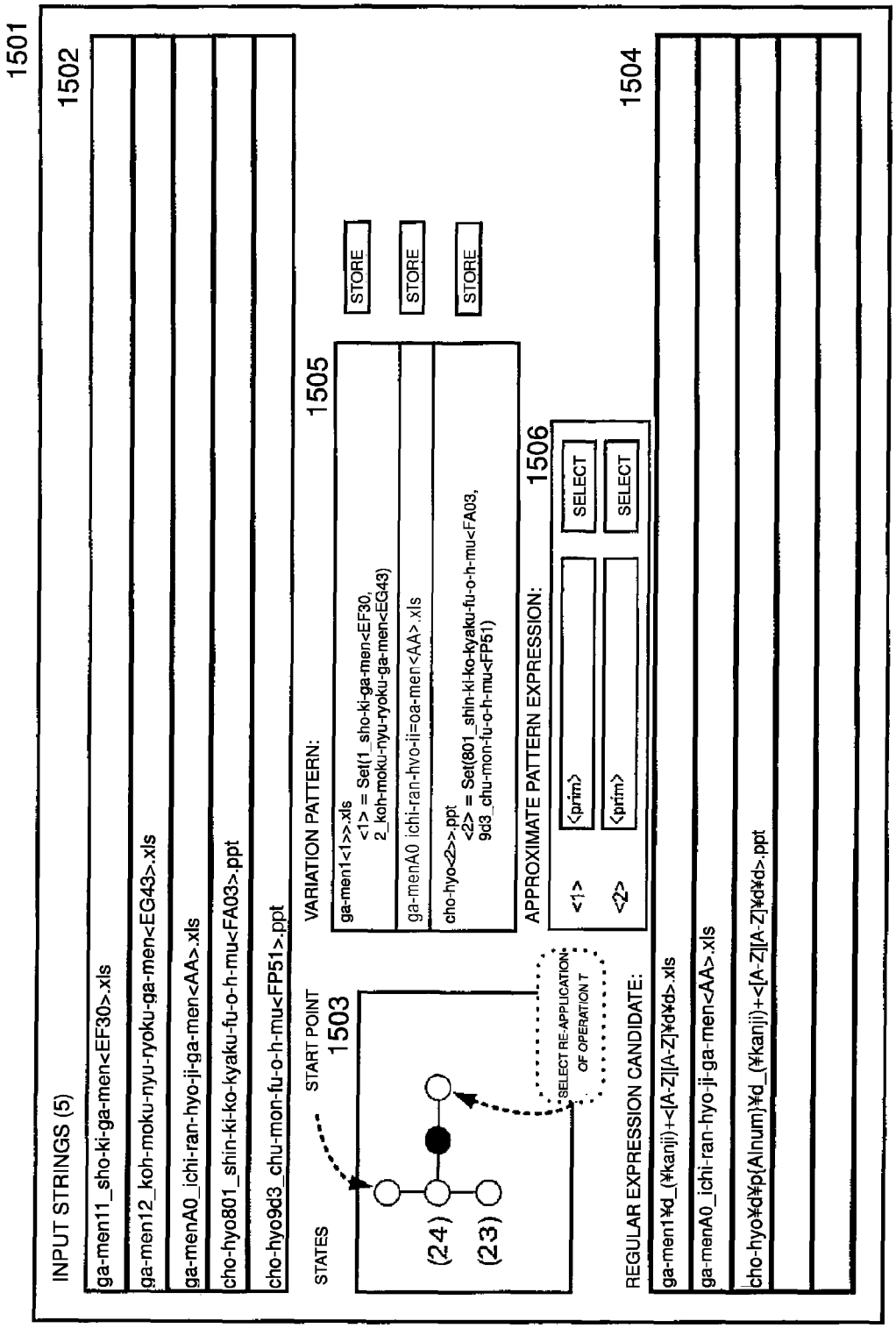
FIG. 15J shows Embodiment 2 which is the embodiment of the present invention, and exemplifies a screen showing an operation for starting the (second) operation-T abstraction processing on the finite state automaton which is generated by the abstraction processing in FIG. 15C and is shown in FIG. 16D to be described below.

FIG. 15J exemplifies a screen showing the operation for starting the (second) operation-T abstraction processing on the finite state automaton (1604) shown in FIG. 16D. The black circle in the states (1503) shows the location of the operation-T abstraction processing (Step 4) which is the abstraction processing completed immediately before the abstraction processing to be started. FIG. 15J shows that the operation S has been applied to the first finite state automaton and then the operation T (the black circle) has been applied thereto. The white circle on the right side of the black circle shows that the operation-T abstraction processing can be performed on the current finite state automaton.

When wishing to apply the operation-T abstraction processing to the finite state automaton (1604), the user clicks the white circle on the right side of the black circle in the states (1503) with the mouse to instruct the computer (201) to start the operation-T abstraction processing on the finite state automaton (1604).

Figure 16E:
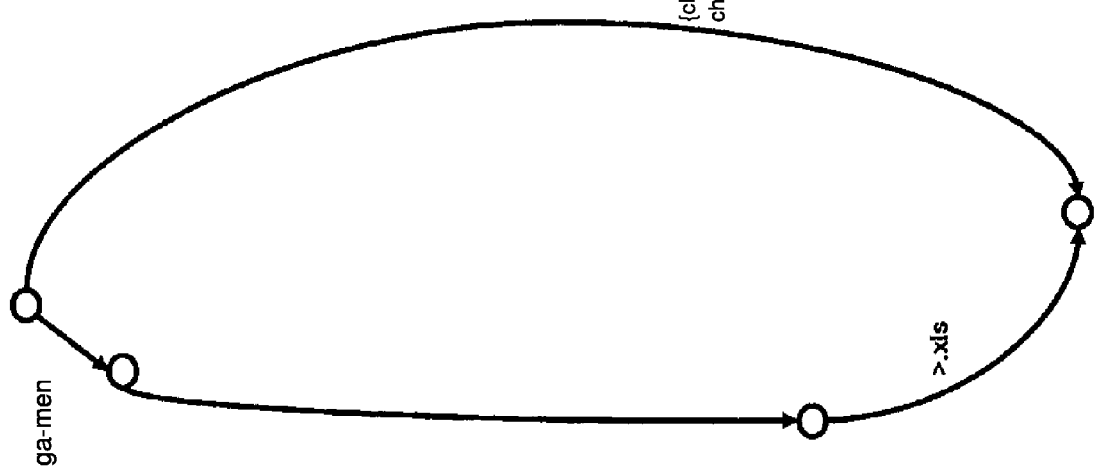
FIG. 16E shows Embodiment 2 which is the embodiment of the present invention, and shows an example of the reduced finite state automaton generated by the abstraction processing in FIG. 15J.

Upon receipt of the instruction for starting the operation-T abstraction processing, the second generator (202-2) performs the operation-T abstraction processing on the finite state automaton (1604). In the operation-T abstraction processing, the second generator (202-2) removes states in the finite state automaton (1604) shown in FIG. 16D, and merges edges to generate a reduced finite state automaton in the memory (103) (the processing in Step 4). FIG. 16E shows a finite state automaton (1605) generated in the processing in Step 4 executed for the second time.

Figure 15K:
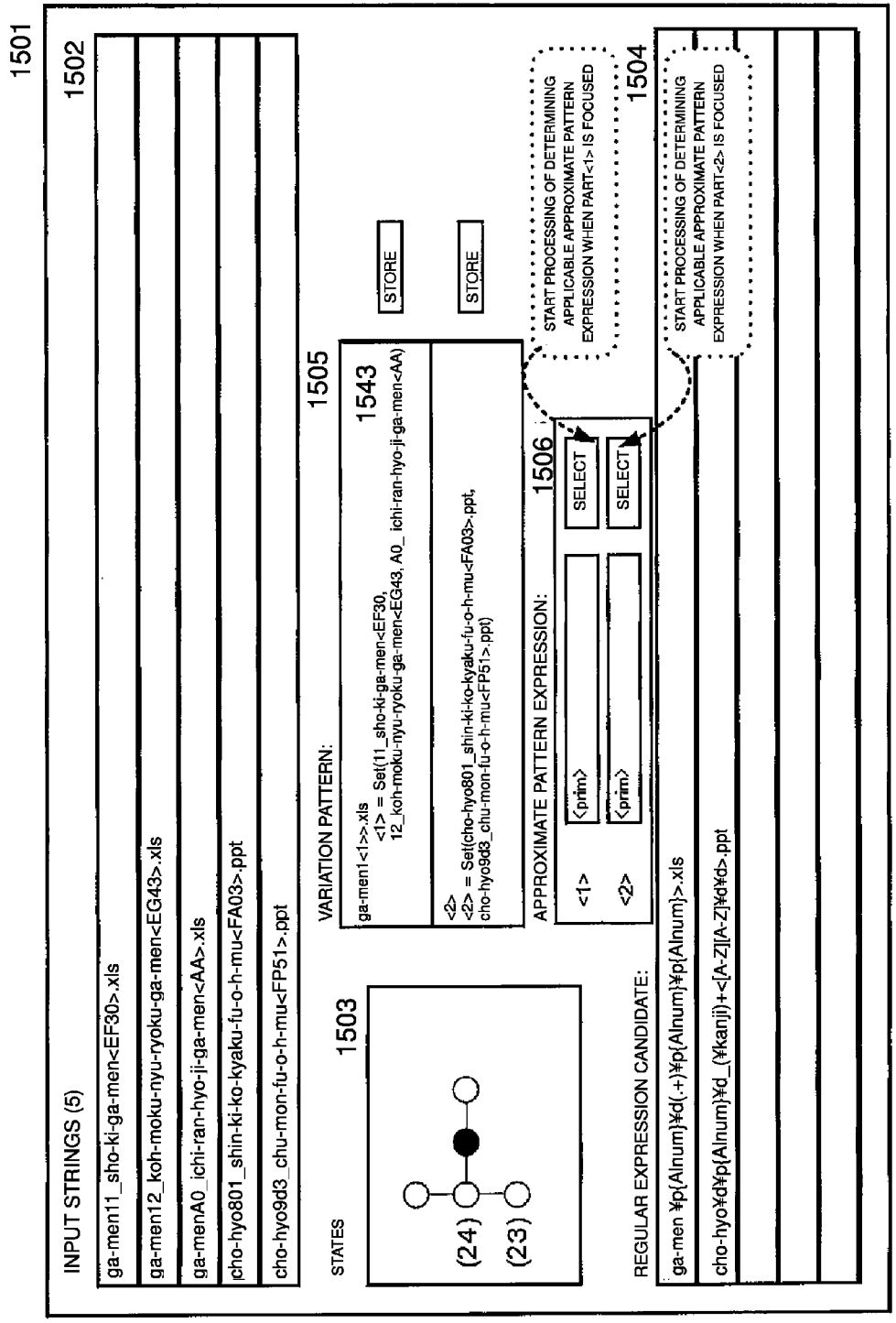
FIG. 15K shows Embodiment 2 which is the embodiment of the present invention, and exemplifies a screen showing an operation for determining, to acquire a regular expression candidate from a finite state automaton generated by the operation-T abstraction processing shown in FIG. 15J, an approximate pattern expression applicable to an approximation target part in variation patterns generated from the finite state automaton.

FIG. 15K exemplifies a screen showing the operation for determining, to acquire a regular expression candidate from the finite state automaton (1605) generated in the operation-T abstraction processing shown in FIG. 15J, approximate pattern expressions applicable to parts <1> and <2>, respectively, in variation patterns (1505) generated from the finite state automaton (1605). The user clicks with the mouse the button for selecting an approximate pattern expression to start the processing of determining, in accordance with the flowchart shown in FIG. 9A, an approximate pattern expression applicable to the part <k> in the variation patterns (1505) when the part <k> is focused. FIG. 15K shows that the variation patterns (1505) have the parts <1> and <2>. For each of the parts <1> and <2>, <prim> designated as the default approximate pattern expression is displayed.

The user clicks the Select button associated with the part <1> with the mouse to start the processing of determining an approximate pattern expression applicable to the part <1>. In response to the click on the Select button, the approximate pattern expression determination program runs, so that a sub-window (1530) shown in FIG. 15M appears.

FIG. 15K also shows variation patterns (1505) of the finite state automaton (1605) shown in FIG. 16E and regular expression candidates (1504) at present. The regular expression candidates (1504) at present indicate regular expression candidates acquired by inference by using the approximate pattern expressions <prim> and <prim> (1506) applicable to the respective parts <1> and <2> in the variation patterns (1505) shown in FIG. 15K when the part <1> or <2> is focused.

FIG. 15L shows: a variation pattern (1543) in the case of focusing the part <1> among the variation patterns (1505) shown in FIG. 15K; and approximate pattern expressions currently existing in the approximate pattern expression store (1544). When the part <1> in the variation pattern (1543) is focused, the processing of determining an approximate pattern expression applicable to the part <1> is performed in the following manner.

Step 1: The expression generator (203) sets as candidates approximate pattern expressions <prim> (1544-1) and <choice> (1544-2) in the approximate pattern expression store (1544). Here, the approximate pattern expression store (1544) includes the approximate pattern expression Sc1<prim>>.xls and the approximate pattern expression Rp<prim>>.ppt which are added to the approximate pattern expression store (1542) shown in FIG. 15E in the processing shown in FIG. 15H.

Step 2: The expression generator (203) assigns, to reg_v, the regular expression which is Sc1(.*)>.xls acquired by replacing the part <1> with (.*).

Step 3: The expression generator (203) performs matching of the regular expression reg_v with each of approximate pattern expressions (1544-3 and 1544-4) which do not correspond to the basic functions currently existing in the approximate pattern expression store (1544). As the result, of the two approximate pattern expressions (1544-3 and 1544-4) stored in the approximate pattern expression store (1542) in the storing operation shown in FIG. 15G, Sc1<prim>>.xls (1544-3) matches the regular expression reg_v.

Step 4: In the approximate pattern expression Sc1<prim>>.xls (Pi) successfully matched with reg_v, the expression generator (203) assigns, to Psub_i, a pattern 1<prim> of a part captured by the part (.*) of reg_v corresponding to the part <1>.

Step 5: Since the approximate pattern expression 1<prim> does not match A0_LiDiSc<AA but matches 11_InSc<EF30 and 12_ItIpSc<EG43, the expression generator (203) determines that the approximate pattern expression 1<prim>|<choice> is applicable. Accordingly, as approximate pattern expression candidates for the part <1>, the display unit (206) displays on the screen the three approximate pattern expressions which are <prim>, <choice>, and 1<prim>|<choice> (see FIG. 15M).

Figure 15M:
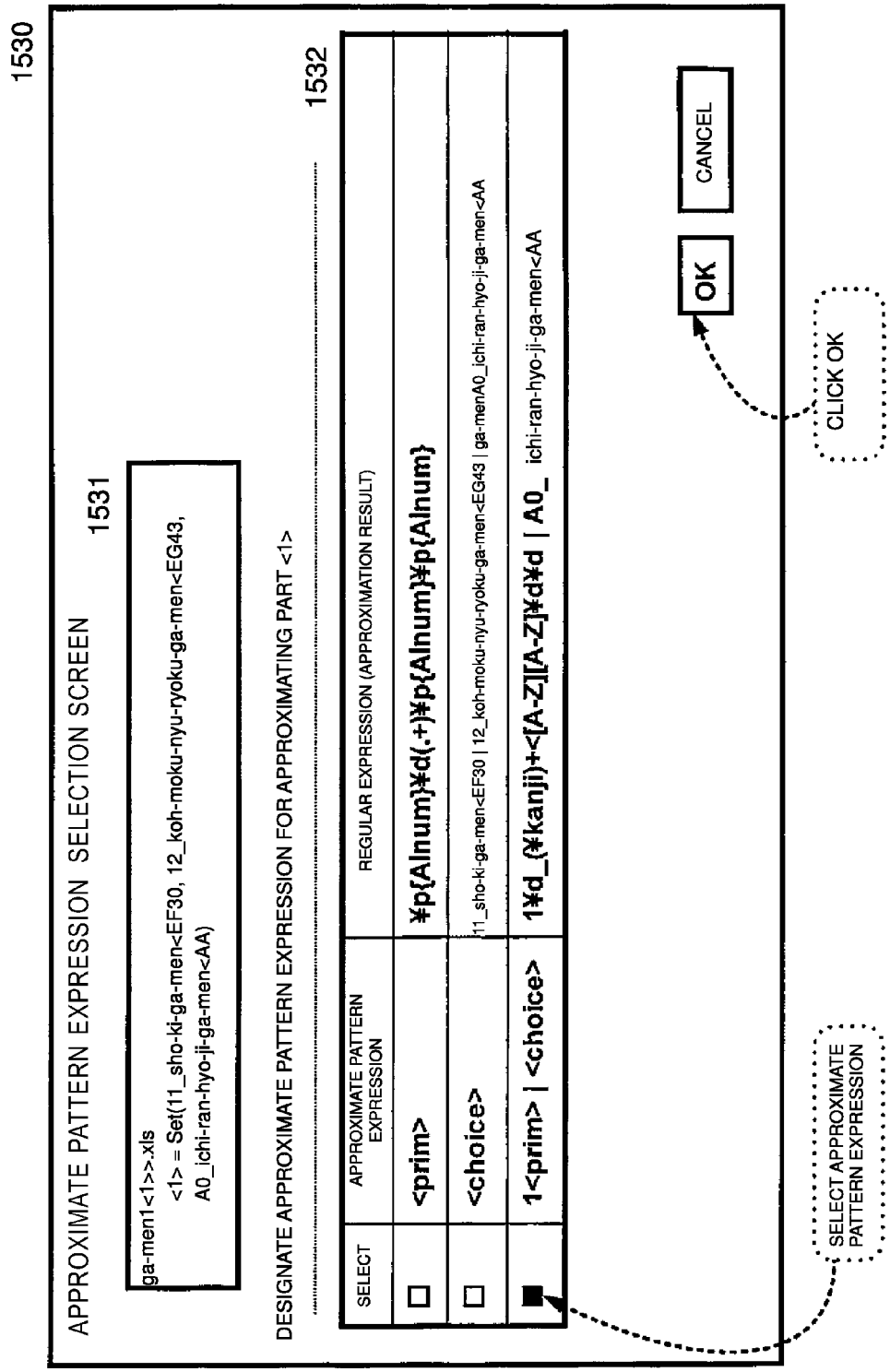
FIG. 15M shows Embodiment 2 which is the embodiment of the present invention, and exemplifies a screen showing processing for enabling the user to select an approximate pattern expression among approximate pattern expressions determined to be applicable to the approximation target part of the variation pattern shown in FIG. 15L when the approximation target part is focused.

FIG. 15M exemplifies a screen showing processing for enabling the user to select an approximate pattern expression among approximate pattern expressions determined to be applicable to the part <1> of the variation pattern (1505) shown in FIG. 15L when the part <1> is focused. Specifically, FIG. 15M shows that the three approximate pattern expressions applicable to the part <1> are <prim>, <choice>, and 1<prim>|<choice> (1532). FIG. 15M also shows regular expressions (i.e., approximation results) matching the respective approximate pattern expressions applicable to the part <1>. The user can select one of the approximate pattern expressions (1532) applicable to the part <1>.

When wishing to select the approximate pattern expression 1<prim>|<choice>, the user clicks with the mouse the Select button on the left side of the approximate pattern expression 1<prim>|<choice> and then the OK button. In response to the click on the OK button, a regular expression candidate (1504) including a regular expression matching the selected approximate pattern expression 1<prim>|<choice> is displayed in the window (1501).

The user also selects <prim> for the part <2> as an approximate pattern expression applicable to the part <2> in the same way as the above (not shown). In response to the selection, the window (1501) shows a regular expression candidate (1504) including a regular expression acquired by inferring the part <2> by using a regular expression inference function using the approximate pattern expression <prim>.

Figure 15N:
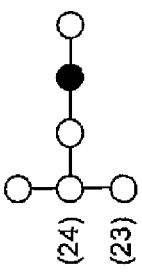
FIG. 15N shows Embodiment 2 which is the embodiment of the present invention, and exemplifies a screen showing processing for storing, in the approximate pattern expression store, an approximate pattern expression generated from a finite state automaton generated by the processing shown in FIG. 15J.

FIG. 15N exemplifies a screen showing processing for storing, in the approximate pattern expression store (1544), the approximate pattern expressions generated from the finite state automaton generated in the processing shown in FIG. 15J. Specifically, FIG. 15N shows that the approximate pattern expressions (1506) acquired by applying the approximate pattern expression 1<prim>|<choice> to the part <1> (<1>=1<prim><choice>) in the variation patterns (1505) are stored in the approximate pattern expression store (1544), the variation patterns (1505) being acquired from the finite state automaton generated by performing the operation S (k=24) (FIG. 15B), the (first) operation T (FIG. 15C), and the (second) operation T (FIG. 15J).

When wishing to store, in the approximate pattern expression store (1544), the approximate pattern expression Sc(1<prim>|<choice>)>.xls acquired by applying the approximate pattern expression 1<prim>|<choice> to the part <1>, the user clicks the Store button with the mouse. In response to the click on the Store button, the same sub-window (not shown) as the sub-window (1526) shown in FIG. 15H appears on the display unit (206). In storing the approximate pattern expression, the user clicks the Store button (not shown) with the mouse. In response to the click on the Store button, the approximate pattern expression Sc(1<prim>|<choice>)>.xls is stored as an approximate pattern expression in the approximate pattern expression store (1544). In addition, the user can edit the approximate pattern expression Sc(1<prim>|<choice>)>.xls. After the editing, the user can store the edited approximate pattern expression in the approximate pattern expression store (1544).

FIG. 15P exemplifies a screen showing the operation for starting the (third) operation-T abstraction processing on the finite state automaton (1605) shown in FIG. 16E. The black circle in the states (1503) shows the location of the operation-T abstraction processing (Step 4) which is the abstraction processing completed immediately before the abstraction processing to be started. FIG. 15P shows that the operation S has been applied to the first finite state automaton, and then the operation T (the white circle) and further the operation T (the black circle) have been applied thereto. The white circle on the right side of the black circle shows that the operation-T abstraction processing can be performed on the current finite state automaton.

When wishing to apply the operation-T abstraction processing to the finite state automaton (1605), the user clicks the white circle on the right side of the black circle in the states (1503) with the mouse to instruct the computer (201) to start the operation-T abstraction processing on the finite state automaton (1605).

Figure 16F:
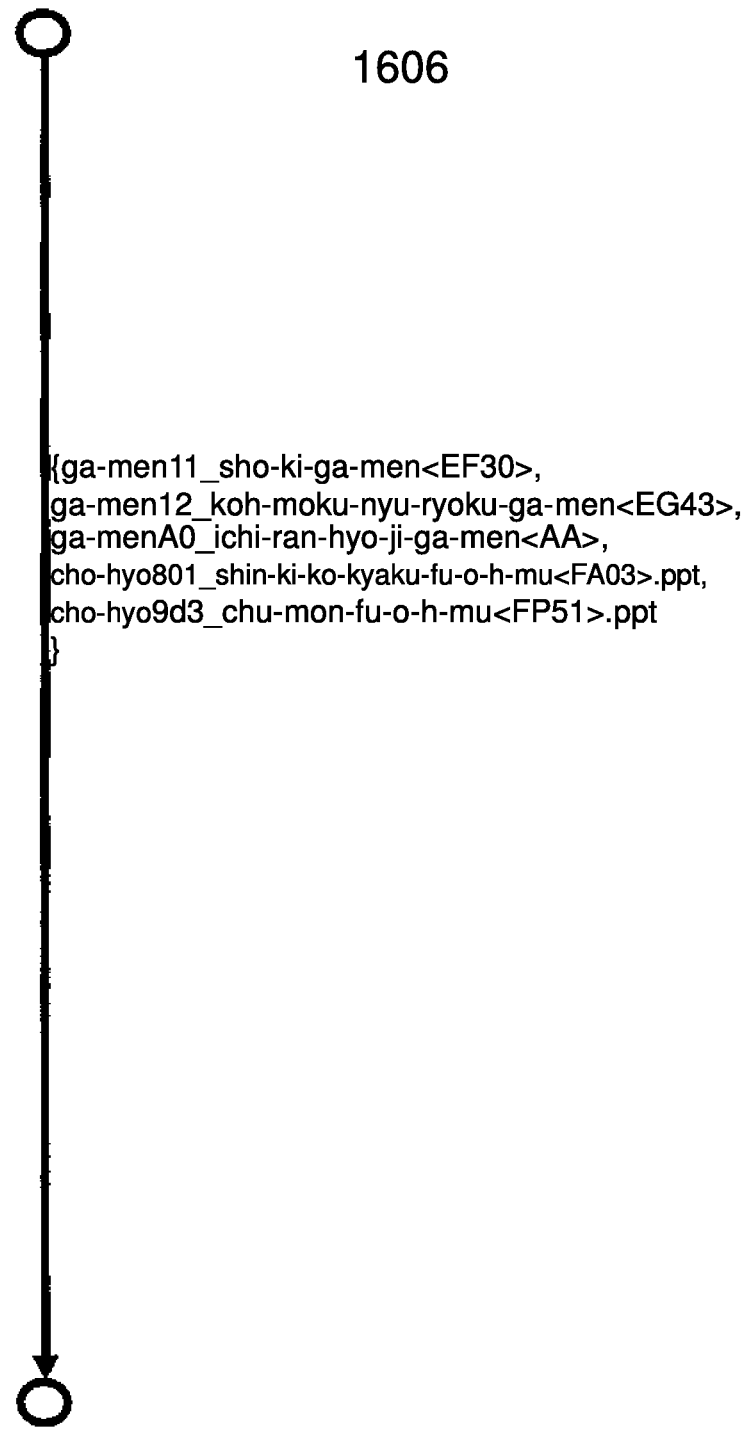
FIG. 16F shows Embodiment 2 which is the embodiment of the present invention, and shows the reduced finite state automaton generated by the abstraction processing in FIG. 15P.

Upon receipt of the instruction for starting the operation-T abstraction processing, the second generator (202-2) performs the operation-T abstraction processing on the finite state automaton (1605). In the operation-T abstraction processing, the second generator (202-2) removes states in the finite state automaton (1605) shown in FIG. 16E, and merges edges to generate a reduced finite state automaton in the memory (103) (the processing in Step 4). FIG. 16F shows a finite state automaton (1606) generated in the processing in Step 4 executed for the third time.

Figure 15Q:
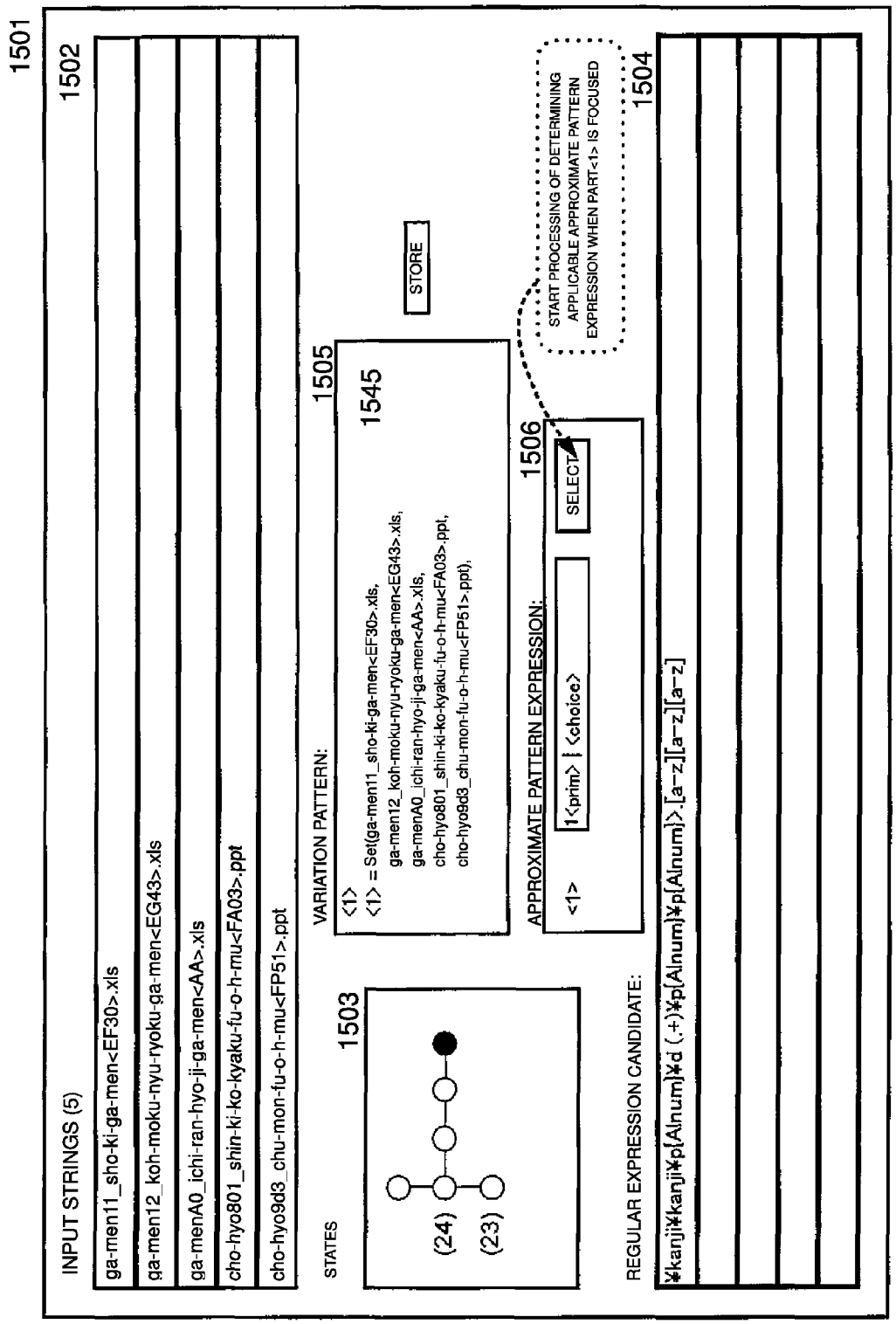
FIG. 15Q shows Embodiment 2 which is the embodiment of the present invention, and exemplifies a screen showing an operation for determining, to acquire a regular expression candidate from a finite state automaton generated by the operation-T abstraction processing shown in FIG. 15P, an approximate pattern expression applicable to an approximation target part in a variation pattern generated from the finite state automaton.

FIG. 15Q exemplifies a screen showing the operation for determining, to acquire a regular expression candidate from the finite state automaton (1605) generated in the operation-T abstraction processing shown in FIG. 15P, an approximate pattern expression applicable to a part <1> in a variation pattern (1505) generated from the finite state automaton (1605). The user clicks the button for selecting an approximate pattern expression with the mouse to start the processing of determining, in accordance with the flowchart shown in FIG. 9A, an approximate pattern expression applicable to the part <k> in the variation pattern (1505) when the part <k> is focused. FIG. 15Q shows that the variation pattern (1505) has the part <1>, and the approximate pattern expression 1<prim>|<choice> is displayed for the part <1>.

The user clicks the Select button associated with the part <1> with the mouse to start the processing of determining an approximate pattern expression applicable to the part <1>. In response to the click on the Select button, the approximate pattern expression determination program runs, so that a sub-window (1534) shown in FIG. 15S appears.

FIG. 15Q shows the variation pattern (1505) of the finite state automaton (1606) shown in FIG. 16F and a regular expression candidate (1504) at present.

FIG. 15R shows: a variation pattern (1545) of the variation pattern (1505) shown in FIG. 15Q in the case of focusing the part <1>; and approximate pattern expressions currently existing in the approximate pattern expression store (1546). When the part <1> in the variation pattern (1545) is focused, the processing of determining an approximate pattern expression applicable to the focused part <1> is performed in the following manner.

Step 1: The expression generator (203) sets as candidates the basic functions <prim> (1546-1) and <choice> (1546-2) in the approximate pattern expression store (1546). Here, the approximate pattern expression store (1546) includes the approximate pattern expression Sc(1<prim>|<choice>).xls which is added to the approximate pattern expression store (1544) shown in FIG. 15L in the processing shown in FIG. 15N.

Step 2: The expression generator (203) assigns, to reg_v, the regular expression (.*) acquired by replacing the part <1> in Var-Pattern with (.*).

Step 3: The expression generator (203) performs matching of the regular expression reg_v with each of approximate pattern expressions (1546-1, 1546-2, 1546-3, 1546-4, and 1546-5) currently existing in the approximate pattern expression store (1546). As the result, each of the three approximate pattern expressions (1546-3, 1546-4, and 1546-5) stored in the storing operations shown in FIGS. 15G and 15N matches the regular expression reg_v.

Step 4: In the approximate pattern expressions Sc1<prim>>.xls, Rp<prim>>.ppt, and Sc(1<prim>|<choice>)>.xls which are successfully matched with reg_v, the expression generator (203) assigns, to Psub_i, each of patterns Sc1<prim>>.xls, Rp<prim>>.ppt, and Sc(1<prim>|<choice>).xls of parts captured by the part (.*) of reg_v corresponding to the part <1>.

Step 5: Since the aforementioned Psub_i matches a part of a set of sub-strings having Sc11_InSc<EF30>.xls, Sc12_ItIpSc<EG43>.xls, ScA0_LiDiSc<AA>.xls, Rp801_NwClForm<FA03>.ppt, and Rp9d3_OrForm<FP51>.ppt but does not match the others, the expression generator (203) determines that the approximate pattern expressions Sc1<prim>>.xls|<choice>, Rp<prim>>.ppt|<choice>, and Sc(1<prim>|<choice>)>.xls are applicable. For example, Sc1<prim>>.xls matches the first two sub-strings but does not match the remaining three sub-strings. Since Psub_i does not match at least one sub-string in the set of sub-strings, <choice> is added to the approximate pattern expressions. Accordingly, as the approximate pattern expression candidates for the part <1>, the display unit (206) displays on the screen five approximate pattern expressions <prim> and <choice> as well as Sc1<prim>>.xls|<choice>, Rp<prim>>.ppt|<choice>, and Sc(1<prim>|<choice>)>.xls|<choice> (see FIG. 15S).

Figure 15S:
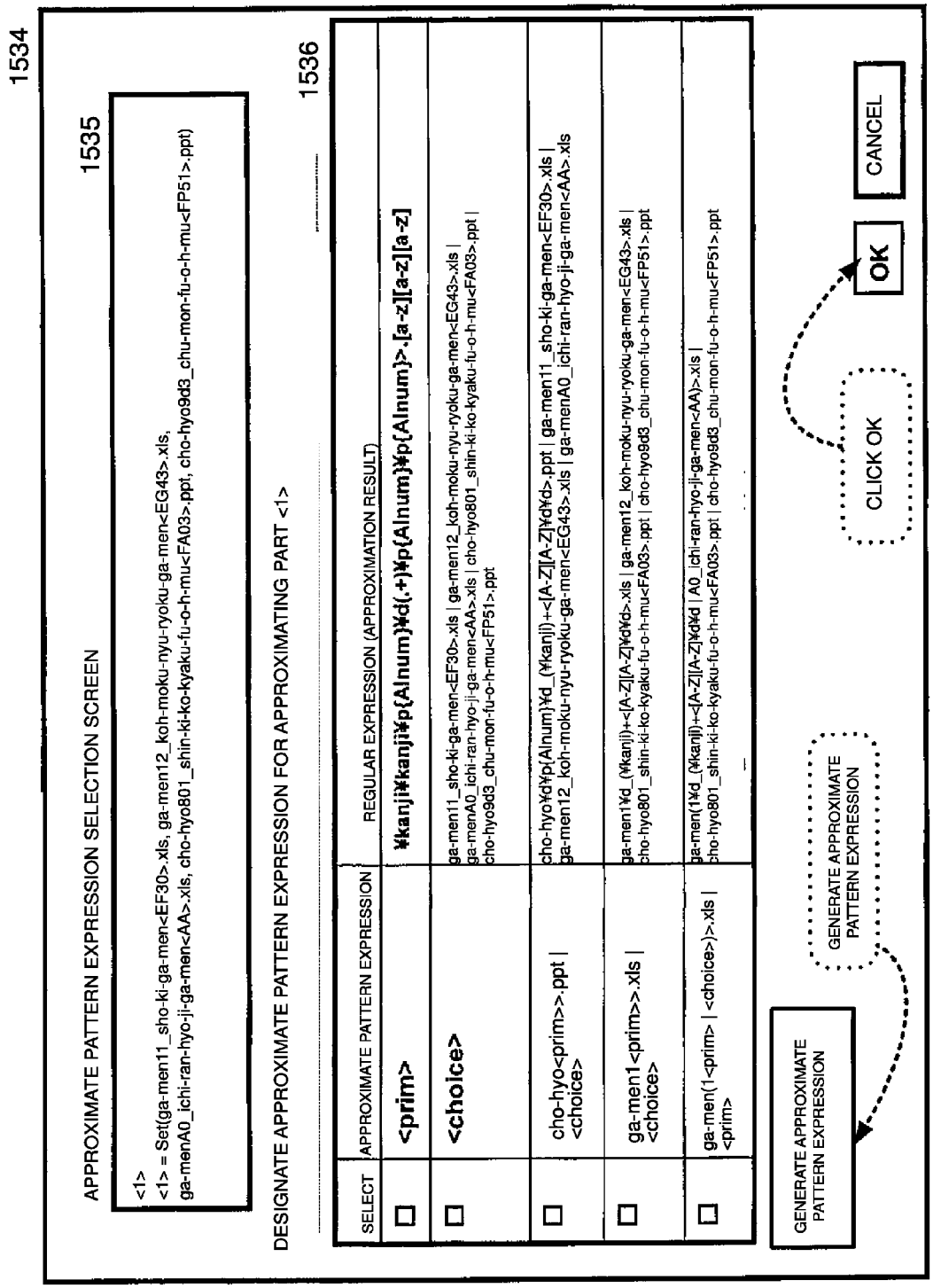
FIG. 15S shows Embodiment 2 which is the embodiment of the present invention, and exemplifies a screen showing processing for enabling the user to select an approximate pattern expression among approximate pattern expressions determined to be applicable to the approximation target part in the variation pattern shown in FIG. 15R when the approximation target part is focused.

FIG. 15S exemplifies a screen showing processing for enabling the user to select an approximate pattern expression among approximate pattern expressions determined to be applicable to the part <1> of the variation pattern (1545) shown in FIG. 15R when the part <1> is focused. Specifically, FIG. 15S shows that the approximate pattern expressions applicable to the part <1> are <prim>, <choice>, Rp<prim>>.ppt|<choice>, Sc1<prim>>.xls|<choice>, and Sc(1<prim>|<choice>)>.xls|<choice> (1536). FIG. 15S also shows regular expressions (i.e., approximation results) matching the respective approximate pattern expressions applicable to the part <1>. The user can select one of the approximate pattern expressions (1536) applicable to the part <1>.

However, suppose a case where the five approximate pattern expressions do not include any approximate pattern expression desirable to the user. In this case, the user clicks with the mouse a button "Create Approximate Pattern Expression" in the sub-window (1534) and then the OK button. Upon clicking the OK button, the user can manually type and add an approximate pattern expression (illustration of a screen therefor is omitted). In addition, the user can delete an unnecessary approximate pattern expression as necessary (illustration of a screen therefor is omitted).

FIG. 15T shows an example of the approximate pattern expressions applicable to the part <1> in the variation pattern (1505) shown in FIG. 15R when the part <1> is focused, and illustrates a screen showing that an added approximate pattern expression desired by the user is selectable. FIG. 15T shows an approximate pattern expression Sc(1<prim>|<choice>)>.xls|<prim> added by the user to the approximate pattern expressions shown in FIG. 15S.

Here, when wishing to select the approximate pattern expression Sc(1<prim>|<choice>)>.xls|<prim>, the user clicks with the mouse the Select button on the left side of the approximate pattern expression Sc(1<prim>|<choice>)>.xls|<prim> and then the OK button. In response to the click on the OK button, the window (1501) displays a regular expression candidate (1504) including a regular expression matching the selected approximate pattern expression Sc(1<prim>|<choice>)>.xls|<prim>, as shown in FIG. 15U.

Figure 15U:
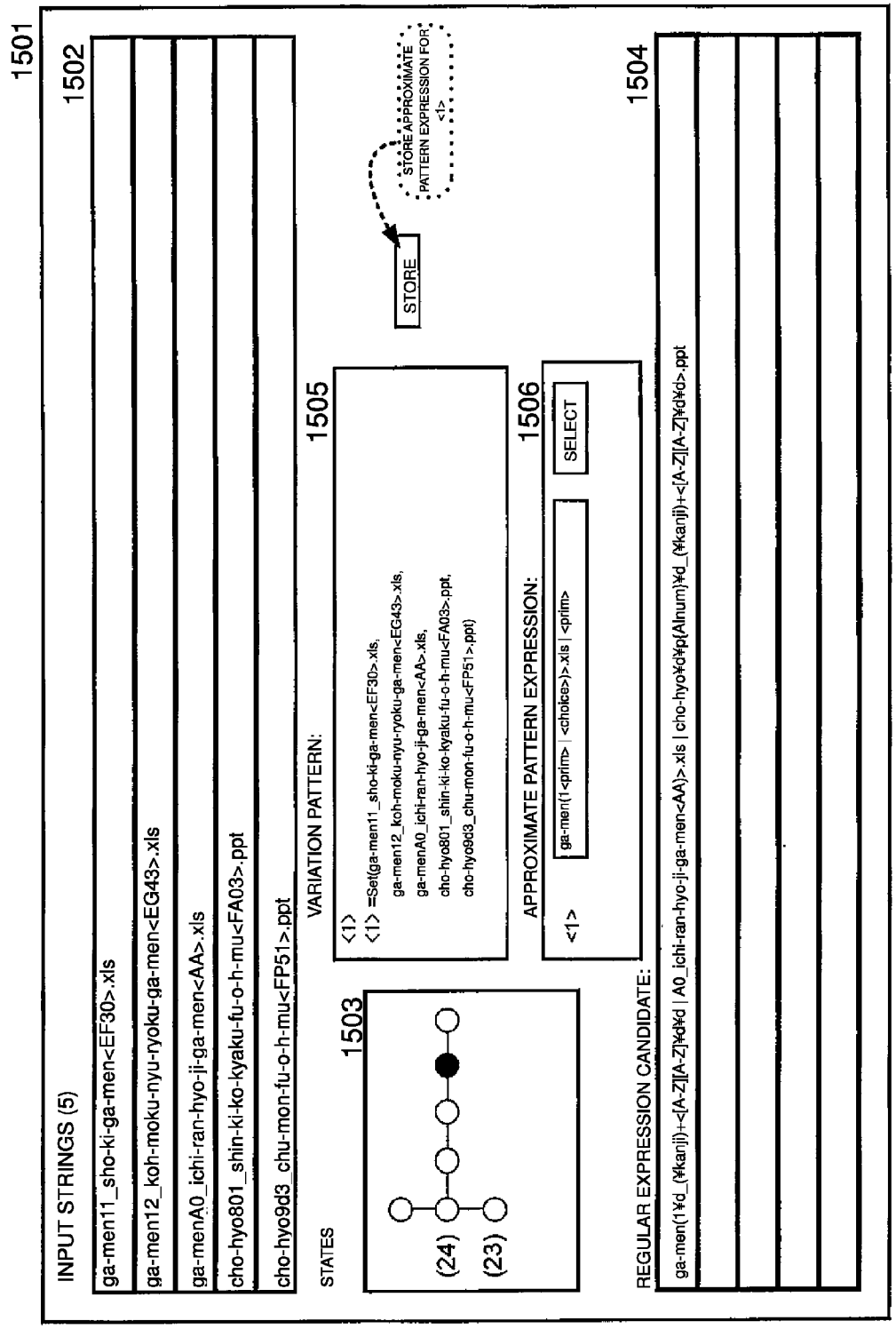
FIG. 15U shows Embodiment 2 which is the embodiment of the present invention, and exemplifies a screen showing processing for storing, in the approximate pattern expression store, an approximate pattern expression generated from a finite state automaton generated by the processing shown in FIG. 15P.
Figure 15V:
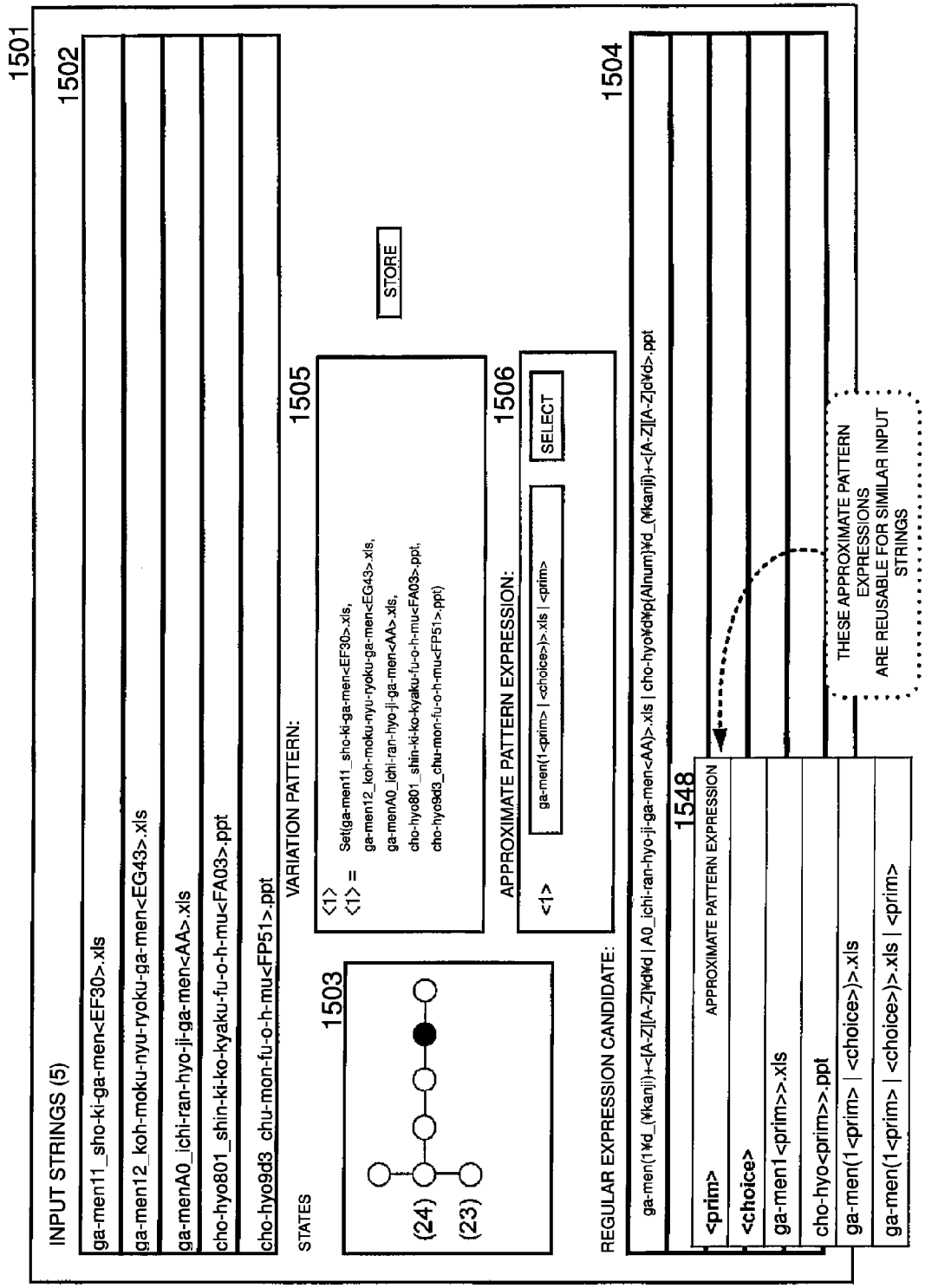
FIG. 15V shows an embodiment of the present invention, and exemplifies a screen showing that the approximate pattern expression generated by the abstraction processing in Embodiment 2 shown in FIGS. 15A to 15U and stored in the approximate pattern expression store is reusable in processing of transforming sets of input strings into an approximate pattern expression step by step in a case other than in Embodiment 2.

FIG. 15U exemplifies a screen showing processing for storing, in the approximate pattern expression store (1546), the approximate pattern expressions generated from the finite state automaton generated in processing shown in FIG. 15P. Specifically, FIG. 15U shows that the approximate pattern expression (1506) acquired by applying the approximate pattern expression Sc(1<prim>|<choice>)>.xls|<prim> to the part <1> in the variation pattern (1505) (<1>=<Sc (1<prim>|<choice>)>.xls|<prim>) is stored in the approximate pattern expression store (1546), the variation pattern (1505) being acquired from the finite state automaton generated by performing the operation S (k=24) (FIG. 15B), the (first) operation T (FIG. 15C), the (second) operation T (FIG. 15J), and the (third) operation T (FIG. 15P).

When wishing to store the approximate pattern expression (1506) in the approximate pattern expression store (1546), the user clicks the Store button with the mouse. In response to the click on the Store button, the same sub-window (not shown) as the sub-window (1526) shown in FIG. 15H appears on the display unit (206). In storing the approximate pattern expression, the user can click the Store button (not shown) with the mouse. In response to the click on the Store button, the approximate pattern expression Sc(1<prim>|<choice>) >.xls|<prim> can be stored in the approximate pattern expression store (1546) (see reference numeral 1548 in FIG. 15V). Here, since the approximate pattern expression Sc(1<prim>|<choice>)>.xls|<prim> has been stored in the approximate pattern expression store (1546) in the processing of adding the approximate pattern expression shown in FIG. 15T by the user, the computer (201) can display, for example, an error message indicating that the same approximate pattern expression is already present in the approximate pattern expression store (1546) or a confirming message indicating that a file having the same approximate pattern expression in the approximate pattern expression store (1546) is to be overwritten.

FIG. 15V exemplifies a screen showing that the approximate pattern expression generated by the abstraction processing in Embodiment 1 and currently stored in the approximate pattern expression store (1548) is reusable also in processing of transforming sets of input strings into an approximate pattern expression step by step in a case other than in Embodiment 2. As the result of the abstraction processing in Embodiment 2, the approximate pattern expressions other than <prim> and <choice> which are the approximate pattern expressions corresponding to the basic functions are added to the approximate pattern expression store (1548). The added approximate pattern expressions are reusable also in processing of transforming sets of input strings into an approximate pattern expression stepwise in a case other than in Embodiment 2.

FIG. 17 shows regular expressions generated according to Embodiment 2 which is an embodiment of the present invention, when sets of input strings are processed interactively in such a manner as to be changed from a concrete regular expression to an abstract regular expression step by step. A screen (1701) shows sets of input strings. The sets of input strings are the same as the sets of input strings shown in the sub-window (1522) in FIG. 15A. A screen (1702) shows: variation patterns [Var-Pattern] acquired by abstracting sets of strings in the operation S and then the operation T according to the embodiment of the present invention; and regular expressions [Reg-Exp] acquired by applying the approximate pattern expression <prim> to each approximation target part in each of the variation patterns [Var-Pattern]. The regular expressions shown on the screen (1702) are provided for processing to be performed in such a manner that strings which begin with Sc<number(s)>, Sc<English character(s)>, and Rp are discriminated from each other. A screen (1703) shows: variation patterns acquired by abstracting the sets of strings to a one-level higher level in the operation T according to the embodiment of the present invention; and regular expressions [Reg-Exp] acquired by applying an approximate pattern expression to each approximation target part in each of the variation patterns. It should be noted that the variation patterns shown on the screen (1703) exemplify abstraction by using a different method (using a different approximate pattern expression) from the operation-T abstraction processing in Embodiment 2. The regular expressions shown on the screen (1703) can be provided for, for example, processing to be performed in such a manner that files in a folder are sorted based on the strings "Sc" and "Rp". A screen (1704) shows an approximate pattern expression representing the regular expression inference method implemented on the screen (1703) according to the embodiment of the present invention. The approximate pattern expression on the screen (1704) builds up an approximate pattern expression (i.e., a regular expression inference function) expressing the method for inferring the regular expressions shown as [Reg-Exp] on the screen (1703) from the sets of strings shown on the screen (1701). The approximate pattern expression is reusable in abstracting sets of input strings other than the sets of input strings shown on the screen (1701).

What is claimed is:

1. A method for extracting a transformation pattern as an approximate pattern expression in the process of transforming sets of input strings to at least one pattern expression that is a string expressing the sets of input strings, the transformation pattern being for transforming the sets of input strings to the pattern expression, the method comprising the steps, executed by a computer, of:

preparing one structure including a plurality of nodes each representing a state and a plurality of edges each representing a transition, the edges each having as a label a set of sub-strings (hereinafter, referred to as an "edge-owned string set") in the sets of input strings;

generating a first reduced structure by removing at least one state in the one structure from the one structure and by merging at least two edges including an edge associated with the removed state in the one structure, (A) based on a state removal score indicating an evaluated value of a change level of a sub-structure in the one structure, the sub-structure associated with at least two edges which are to be merged with a removal of at least one state in the one structure;

(B) based on an inclusion relations between the sub-structure and another sub-structure or the one structure; or (C) based on a combination of the state removal score and the inclusion relationship;

generating a first approximate pattern expression based on the first reduced structure; and presenting the first approximate pattern expression.

2. The method according to claim 1, wherein the state removal score for a certain state in the one structure is obtained from: the number of times of merging edges with a removal of the certain state; and the number of input strings which reach states associated with the edges to be merged with the removal of the certain state.

3. The method according to claim 1, wherein the state removal score for a certain state (N) is obtained in accordance with the following expression:

the number of input edges of the certain state (IN)·the number of output edges of the certain state (OUT)+the number of edges directly connecting states immediately before and after the certain state in transition steps (COM).

4. The method according to claim 3, wherein the state removal score is obtained in accordance with one of the following functions, F:

$$F(N, \text{IN·OUT+COM}) = N(\text{IN·OUT+COM}); \quad (1)$$

$$F(N, \text{IN·OUT+COM}) = N \cdot \log(\text{IN·OUT+COM}); \text{ and} \quad (2)$$

$$F(N, \text{IN·OUT}) = N \cdot \log(\text{IN·OUT}) \text{ in which COM is ignored in the function } F \text{ in (2) above,} \quad (3)$$

where N is the number of sets of input strings.

5. The method according to claim 1, wherein the one state is removed based on the state removal score in such a manner that a state having the smallest state removal score is identified among the states in one structure and then the identified state is removed from one structure.

6. The method according to claim 1, wherein the state removal score is metrics defined for a state having the smallest number of sets of input strings (N) which reach the state among the states in one structure, in a case where a portion of the one structure from any state from which edges branch to a state at which the edges meet (hereinafter, referred to as an "abstraction unit") does not properly include any other abstraction unit in the one structure.

7. The method according to claim 1, wherein the state removal score is metrics defined for a state having the smallest number of sets of input strings (N) which reach the state among the states in one structure, in a case where a set of paths of a common context including a state s as one of end points in the one structure does not properly include a set of paths of another common context in the finite state automaton, wherein:

the set of paths of the common context including the state s as one of the end points in one structure is a set of paths from state s to a state s' or from state s' to state s when two or more paths from state s meet at state s' or when two or more paths from state s' meet at state s.

8. The method according to claim 1, wherein the computer repeats the removal of the state and executes the presenting step every time the removal is performed.

9. The method according to claim 7, further comprising a step, executed by the computer, of storing the first approximate pattern expression as a pattern expression inference function in a storage unit, the pattern expression inference function being usable for generating the first approximate pattern expression.

10. The method according to claim 9, wherein the step of generating the first approximate pattern expression includes a step of applying, to the first degenerated structure, an approximate pattern expression selected from the approximate pattern expressions which are stored in the storage unit and include the first approximate pattern expression.

11. The method according to claim 1, wherein the first degenerated structure has, as a label of a unified edge resulting from the removal of the state, a set of strings obtained by unifying the edge-owned string sets associated with the removed state.

12. The method according to claim 1, further comprising the steps, executed by the computer, of, for at least any two states in the one structure, in a case where paths within k transition steps (k is an integer of 1 or larger) after the at least two states have the same sets of label strings, or in a case where sets of label strings of a path within m transition steps (m is an integer of 1 or larger) after one of the at least two states include sets of label strings of a path within n transition steps (n is an integer of 1 or larger) after the other one of the two states:

merging sets of transitions having either the same sets of label strings or the included sets of label strings and sets of states included in the sets of transitions, and thereby generating a second degenerated structure having the merged transitions and states;

generating a second approximate pattern expression based on the second degenerated structure; and presenting the second approximate pattern expression.

13. The method according to claim 12, wherein the computer repeats the merging of the sets of transitions and the sets of states and executes the presenting step every time the merging is performed.

14. The method according to claim 12, wherein the second degenerated structure has, as a label of a unified edge resulting from the merging of the states, a set of sub-strings obtained by unifying sets of sub-strings of labels of edges (hereinafter, referred to as "edge labels") associated with the merged states.

15. The method according to claim 1, wherein the approximate pattern expression is a pattern having a pattern expression description including zero or more symbols representing inference functions.

16. The method according to claim 1, wherein in the preparing step, the one structure is one structure generated from the input strings or a structure acquired by degenerating one structure generated from the input strings.

17. A method executed by a computer for transforming sets of input strings into at least one pattern expression that is a strung expressing the sets of input strings, the method comprising the steps of:

generating, at least once, a first approximate pattern expression, wherein the step of generating the first approximate pattern expression comprises:

preparing one structure including a plurality of nodes each representing a state and a plurality of edges each representing a transition, the edges each having as a label a set of sub-strings (hereinafter, referred to as an "edge-owned string set") in the sets of input strings;

generating a first reduced structure by removing at least one state in the one structure from the one structure and by merging at least two edges including an edge associated with the removed state in the one structure, (A) based on a state removal score indicating an evaluated value of a change level of a sub-structure in the one structure, the sub-structure associated with at least two edges which are to be merged with a removal of at least one state in the one structure;

(B) based on an inclusion relations between the sub-structure and another sub-structure or the one structure; or (C) based on a combination of the state removal score and the inclusion relationship;

generating a first approximate pattern expression based on the first reduced structure;

presenting the first approximate pattern expression every time the first approximate pattern expression is generated; and presenting a pattern expression matching the first approximate pattern expression.

18. The method according to claim 17, further comprising the steps of:

generating, at least once, a second approximate pattern expression;

presenting the second approximate pattern expression every time the second approximate pattern expression is generated; and presenting a pattern expression matching the second approximate pattern expression.

19. A computer configured to extract a transformation pattern as an approximate pattern expression in the process of transforming sets of input strings to at least one pattern expression that is a string expressing the sets of input strings, the transformation pattern being for transforming the sets of input strings to the pattern expression, the computer comprising:

a first generation unit configured to prepare one structure including a plurality of nodes each representing a state and a plurality of edges each representing a transition, the edges each having as a label a set of sub-strings (hereinafter, referred to as an "edge-owned string set") in the sets of input strings;

a second generation unit configured to prepare a first degenerated structure by removing at least one state in one structure from one structure and by merging at least two edges including an edge associated with the removed state in the one structure, (A) based on a state removal score indicating an evaluated value of a change level of a sub-structure in the one structure, the sub-structure associated with at least two edges which are to be merged with a removal of at least one state in one structure;

(B) based on an inclusion relationship between the sub-structure and another sub-structure or the one structure; or (C) based on a combination of the state removal score and the inclusion relationship;

an expression generation unit configured to generate a first approximate pattern expression based on the degenerated first structure; and a presentation unit configured to present the first approximate pattern expression.

20. A computer program of extracting a transformation pattern as an approximate pattern expression in the process of transforming sets of input strings to at least one pattern expression that is a string expressing the sets of input strings, the transformation pattern being for transforming the sets of input strings to the pattern expression, the computer program causing a computer to execute the steps according to claim 1.

* * * * *